(12) United States Patent
Barr et al.

(10) Patent No.: US 11,395,501 B2
(45) Date of Patent: Jul. 26, 2022

(54) STACKABLE INFUSION FILTRATION AND STORAGE SYSTEMS AND METHODS OF USING THE SAME

(71) Applicants: Rashieka Barr, Raleigh, NC (US); Robert Shanks, Raleigh, NC (US); Fredrik Perman, Raleigh, NC (US); Aly Khalifa, Raleigh, NC (US)

(72) Inventors: Rashieka Barr, Raleigh, NC (US); Robert Shanks, Raleigh, NC (US); Fredrik Perman, Raleigh, NC (US); Aly Khalifa, Raleigh, NC (US)

( * ) Notice: Subject to any disclaimer, the term of this patent is extended or adjusted under 35 U.S.C. 154(b) by 154 days.

(21) Appl. No.: 16/532,761

(22) Filed: Aug. 6, 2019

(65) Prior Publication Data

US 2020/0045986 A1 Feb. 13, 2020

Related U.S. Application Data

(60) Provisional application No. 62/715,542, filed on Aug. 7, 2018.

(51) Int. Cl.
*A23C 7/00* (2006.01)
*A23C 15/12* (2006.01)
(Continued)

(52) U.S. Cl.
CPC .............. *A23C 7/00* (2013.01); *A23C 15/12* (2013.01); *A47G 19/16* (2013.01);
(Continued)

(58) Field of Classification Search
CPC .... B65D 21/00; B65D 77/24; B65D 77/0486; B65D 77/0493; B65D 77/04;
(Continued)

(56) References Cited

U.S. PATENT DOCUMENTS 2,093,980 A * 9/1937 Linger ................. A47G 19/14
99/285
3,657,994 A * 4/1972 Post ....................... A47J 31/20
99/323

(Continued)

FOREIGN PATENT DOCUMENTS

CN 106458338 2/2017
WO 2018006165 1/2018

OTHER PUBLICATIONS

Website: Buttercup™ Butter Maker—Marigold/Meringue, http://www.chefn.com/buttercuptm-butter-maker-marigold-meringue.html?gclid=EAlalQo (1 page).
(Continued)

*Primary Examiner* — Ericson M Lachica
(74) *Attorney, Agent, or Firm* — Myers Bigel, P.A.

(57) ABSTRACT

Stackable infusion filtration and storage systems are described herein. Components of the systems may include a first container, a second container, and a cooperating third container. The stackable systems may further include a sleeve component and one or more lids. The stackable systems can concurrently capture liquid as the liquid separates from an infused butter mixture and solidify butter in separate cooperating stackable containers. Methods of use are also described.

18 Claims, 52 Drawing Sheets

(51) Int. Cl.
  *B65D 77/04* (2006.01)
  *B65D 77/24* (2006.01)
  *A47G 19/16* (2006.01)

(52) U.S. Cl.
  CPC ......... *B65D 77/0486* (2013.01); *B65D 77/24* (2013.01); *A23V 2002/00* (2013.01)

(58) Field of Classification Search
  CPC .............. B65D 77/048; B65D 21/0209; B65D 21/0211; A47G 19/16; A23C 15/12; A23C 7/00
  See application file for complete search history.

(56) References Cited

U.S. PATENT DOCUMENTS

| | | | | |
|---|---|---|---|---|
| 5,623,865 | A * | 4/1997 | Sidiropoulos | A47G 21/004 99/323 |
| 6,276,262 | B1 * | 8/2001 | Chen | A23F 3/18 426/435 |
| 2002/0092790 | A1 * | 7/2002 | Stucke | B65D 51/249 206/516 |
| 2006/0065127 | A1 | 3/2006 | Dalton | |
| 2007/0259074 | A1 | 11/2007 | Searchilli | |
| 2009/0178573 | A1 * | 7/2009 | Pan | A47J 31/20 99/323 |
| 2012/0067765 | A1 * | 3/2012 | Iseki | B65B 51/14 206/524.6 |
| 2012/0225176 | A1 * | 9/2012 | DiStefano | A47J 31/18 426/435 |
| 2012/0241352 | A1 * | 9/2012 | Pramanik | B32B 27/08 206/524.1 |
| 2013/0011526 | A1 * | 1/2013 | Pawlick | B65D 81/3453 426/113 |
| 2015/0017297 | A1 | 1/2015 | Vastardis | |
| 2015/0253055 | A1 * | 9/2015 | Tsui | B62B 5/066 62/62 |
| 2015/0359386 | A1 * | 12/2015 | Pfeifer | A01J 15/10 426/429 |
| 2016/0114946 | A1 * | 4/2016 | Strominger | B65D 21/0228 220/212 |
| 2016/0135635 | A1 * | 5/2016 | Boniello | A47J 27/004 99/403 |
| 2016/0296464 | A1 * | 10/2016 | Lindsay | A61K 9/009 |
| 2017/0280926 | A1 * | 10/2017 | Khalifa | B65D 85/72 |
| 2018/0242775 | A1 * | 8/2018 | Lin | A47J 31/0636 |
| 2018/0370684 | A1 * | 12/2018 | Brodwick | A47G 21/18 |
| 2019/0062033 | A1 * | 2/2019 | Fleischman | B65D 81/3211 |
| 2019/0297910 | A1 * | 10/2019 | Tuttle | A23F 5/04 |

OTHER PUBLICATIONS

Website: Mighty Fast Herbal Infuser: Kitchen & Dining, https://www.amazon.com/Mighty-Fast-Herbal-Infuser-2148/dp/B01102KC3E/ref=sr_1_1_ (1 page).

Website: Amazon.com: Easy Butter Maker Magic Butter Maker for "Medicinal" Butter, Compound, https://www.amazon.com/easy-butter-maker-medicinal-compound/dp/b078rpjwlc (1 page).

Website: How to Make Cannabis Infused Butter (Cannabutter), https://www.medicaljane.com/2016/05/13/cannabis-infused-butter-cannabutter/ (3 pages).

Website: Food Chemistry: What's the difference between ghee and butter:—Quora, https://www.quora.com/Food-Chemistry-Whats-the-difference-between-ghee-and-butter (8 pages).

Website: Clarified butter—Wikepedia, https://en.wikipedia.org/wiki/Clarified_butter (2 pages).

* cited by examiner

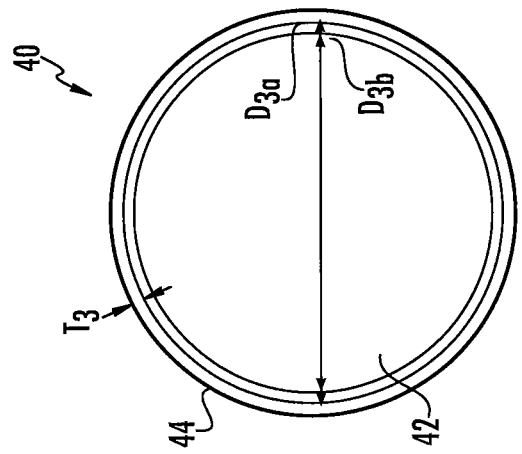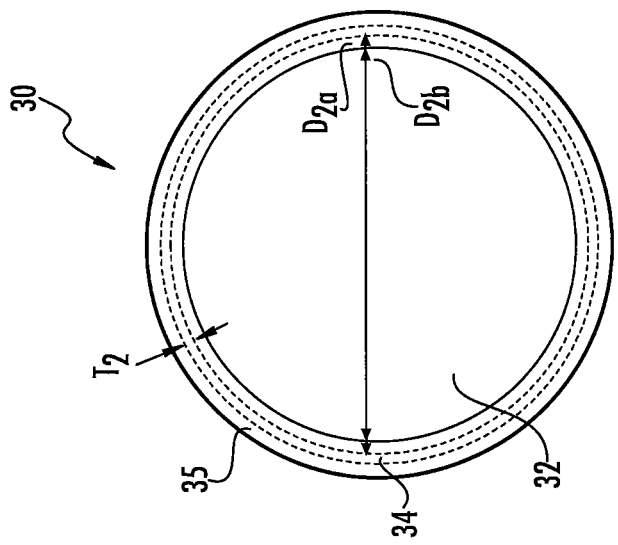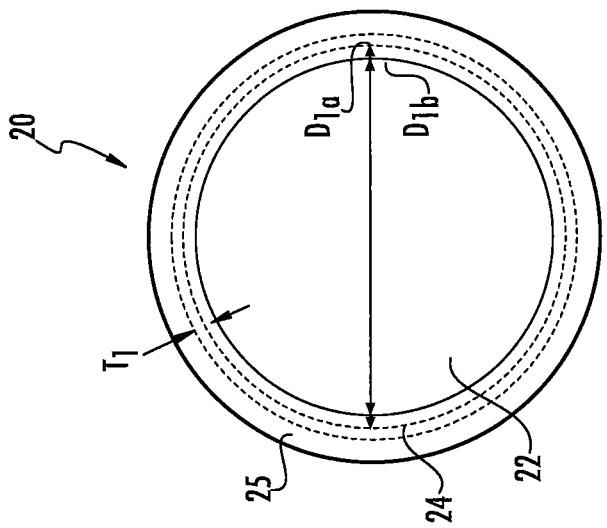

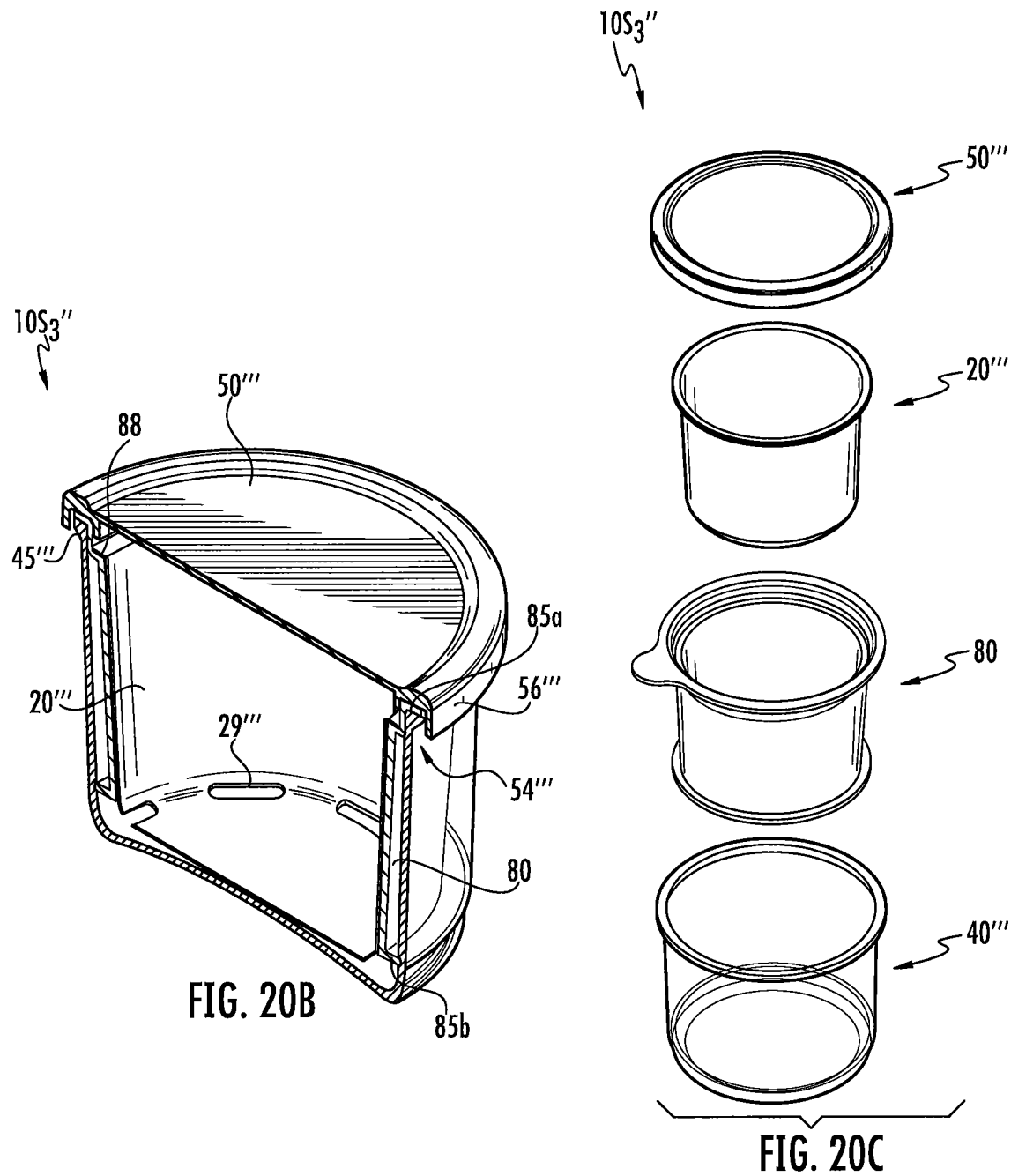

STACKABLE INFUSION FILTRATION AND STORAGE SYSTEMS AND METHODS OF USING THE SAME

STATEMENT OF PRIORITY

This application claims the benefit of and priority to U.S. Provisional Application Ser. No. 62/715,542 filed Aug. 7, 2018, the contents of which are hereby incorporated by reference as if recited in full herein.

FIELD OF THE INVENTION

The present invention relates generally to stackable container systems that may be particularly suitable for infused butter water removal and storage container systems.

BACKGROUND

Infusing butter with various types of herbs and spices is a popular practice. However, the process for doing so creates water as a byproduct which needs to be separated from the infused butter as the butter solidifies. This can be a messy endeavor. Thus, improved systems that can separate the water during processing are desired.

SUMMARY

It should be appreciated that this Summary is provided to introduce a selection of concepts in a simplified form, the concepts being further described below in the Detailed Description. This Summary is not intended to identify key features or essential features of this disclosure, nor is it intended to limit the scope of the invention.

Embodiments of the invention are directed to stackable infusion filtration and storage systems that can concurrently capture liquid from a liquid mixture and solidify butter in separate cooperating stackable containers.

In some embodiments, a stackable infusion filtration and storage system may comprise a first container and a second container. The first container may comprise a bottom, at least one sidewall, and an open interior chamber. At least one of the bottom or the at least one sidewall of the first container may comprise a plurality of apertures. The second container may be sized to receive the first container. The second container may comprise a bottom, at least one sidewall, and an open interior chamber. The bottom of the first container may sit within the open interior chamber of the second container a distance above the bottom of the second container when the first container and the second container are in a stacked and nested relationship.

In some embodiments, the system may further comprise a third container. The third container may comprise a bottom, at least one sidewall, and an open interior chamber, and may be sized to slidably receive the first container.

In some embodiments, the system may further comprise a sleeve between the first container and the second container. The sleeve may reside a distance above the bottom of the second container.

In some embodiments, the first container may have a height of about 2 inches (about 50 mm) to about 6 inches (about 150 mm). In some embodiments, the second container may have a height of about 6 inches (about 150 mm) to about 12 inches (about 300 mm). In some embodiments, the third container may have a height of about 2 inches (about 50 mm) to about 6 inches (about 150 mm).

In some embodiments, the height of the first container may be less than the height of the second container. In some embodiments, the height of the third container may be less than a height of the second container and about equal to a height of the first container. In some embodiments, the height of the first container may be about 10% to about 70% of a height of the second container.

In some embodiments, the bottom of the first container may be a distance of about 2 inches (about 50 mm) to about 7 inches (about 180 mm) above the bottom of the second container when the first container and the second container are in the stacked and nested relationship.

In some embodiments, the third container may be sized to fit within the open interior chamber of the second container.

In some embodiments, the first container may further comprise a flange extending outward from a top edge portion of the at least one sidewall of the first container. In some embodiments, the flange of the at least one sidewall of the first container may be configured to engage a top edge portion of the at least one sidewall of the second container, thereby allowing the first container to sit within the open interior chamber of the second container when the first container and the second container are in the stacked and nested relationship.

In some embodiments, the second container may further comprise a flange extending radially outwardly from the top edge portion of the at least one sidewall of the second container. The flange of the first container may be configured to engage the flange of the second container, thereby allowing the first container to sit within the open interior chamber of the second container a distance of about 2 inches (about 50 mm) to about 7 inches (about 180 mm) above the bottom of the second container when the first container and the second container are in the stacked and nested relationship.

In some embodiments, the system may further comprise a lid. The lid may be configured to engage the flange of the first container and sized to cover the open interior chamber of the first container.

In some embodiments, the first container and the second container may be concentric containers when in the stacked and nested relationship. In some embodiments, the first container and the second container may each comprise four sidewalls.

In some embodiments, the first container may have a volume capacity of about 8 ounces to about 16 ounces. In some embodiments, the second container may have a volume capacity of about 20 ounces to about 30 ounces.

In some embodiments, the first container, the second container, and/or the third container may be formed of a polymeric material or glass. In some embodiments, the first container, the second container, and/or the third container may comprise a monolithic, BPA-free polymeric material.

In some embodiments, the at least one sidewall of the first container may have a wall thickness of about 1 mm to about 10 mm. In some embodiments, the at least one sidewall of the second container may have a wall thickness of about 1 mm to about 10 mm. In some embodiments, the at least one sidewall of the third container may have a wall thickness of about 1 mm to about 10 mm.

In some embodiments, the plurality of apertures may comprise a pattern of apertures having a series of apertures in rows and columns and a laterally spaced apart polygonal-shaped aperture. In some embodiments, the plurality of apertures may comprise a plurality of laterally and/or circumferentially spaced apart elongate apertures located adjacent to the bottom of the first container. In some embodiments, the laterally and/or circumferentially spaced apart elongate apertures may be horizontally-oriented. In some embodiments, the bottom of the first container may have a contiguous closed surface and with the at least one sidewall encloses the open interior chamber.

In some embodiments, the system may further comprise a filter sized and configured to releasably engage the first container.

In some embodiments, the system may further comprise an infused butter mixture in the first container. In some embodiments, the infused butter mixture may comprise one or more infusion materials. In some embodiments, the one or more infusion materials may be selected from a group consisting of: tea leaves, cocoa, fruit, grains, herbs, spices, seasonings, botanicals, *cannabis*, vegetables, flavor additives, and/or sweeteners.

Other embodiments are directed to methods of using stackable infusion filtration and storage systems that can concurrently capture liquid from a liquid mixture and solidify butter in separate cooperating stackable containers.

In some embodiments, a method for making an infused butter using a stackable infusion filtration and storage system may comprise providing a stackable container set comprising a first container, the first container comprising a bottom, at least one sidewall, and an open interior chamber, at least one of the bottom or the at least one sidewall of the first container comprising a plurality of apertures and a second container sized to receive the first container, the second container comprising a bottom, at least one sidewall, and an open interior chamber, the at least one sidewall of the second container having a top edge portion; providing an infused butter mixture comprising one or more infusion materials and at least one liquid; placing the first container into the second container with the first container residing a distance in a range of about 2 inches (about 50 mm) to about 10 inches (about 250 mm) above the bottom of the second container, thereby allowing the first container to sit within the open interior chamber of the second container in a stacked and nested relationship; pouring the infused butter mixture into the first container while held by the second container; then flowing the at least one liquid of the infused butter mixture through the plurality of apertures in the first container while the first container remains held by the second container; and then collecting the at least one liquid in the open interior chamber of the second container while the first container remains held by the second container.

In some embodiments, the method may further comprise providing a third container comprising a bottom, at least one sidewall, and an open interior chamber; removing the first container from the second container after the infused butter has solidified; and placing the first container with the infused butter into the third container such that the first container sits within the open interior chamber of the third container.

In some embodiments, the method may further comprise placing a separation filter over the first container prior to pouring the infused butter mixture into the first container.

In some embodiments, the method may further comprise cooling the stacked and nested first and second containers with the infused butter mixture until the infused butter mixture has solidified.

In some embodiments, the method may further comprise placing a lid on the first container prior to cooling the stacked and nested first and second containers with the infused butter mixture.

In some embodiments, the at least one infusion material may be selected from a group consisting of: tea leaves, cocoa, fruit, grains, herbs, spices, seasonings, botanicals, *cannabis*, vegetables, flavor additives, and/or sweeteners.

In some embodiments, the method may further comprise releasably affixing a flexible, semi-rigid or rigid filter having a plurality of apertures on top of the first container prior to pouring the infused butter mixture into the first container; then removing the filter and placing a lid on the first container.

In some embodiments, the system may further comprise a sleeve between the first container and the second container, the sleeve residing a distance above the bottom of the second container.

In some embodiments, the first container may be is configured to be received within the open interior chamber of the third container when the first container and the third container are assembled together in a stacked and nested relationship.

In some embodiments, the lid may comprise a recess configured to receive a protruding portion of the sidewall of the first container to secure the lid to the container system.

In some embodiments, the flange is an upper flange, and the first container may further comprise a lower flange extending outwardly from a bottom edge portion of the at least one sidewall of the first container.

In some embodiments, a stackable infusion filtration and storage system may comprise a first container. The first container may comprise a bottom portion, at least one sidewall having at least one outwardly extending flange, and an open interior chamber. The bottom portion of the first container may comprise a plurality of through apertures. The container system may further a sleeve sized to receive the first container. The sleeve may comprise at least one sidewall having an annular shoulder and an open interior. The container system may further comprise a second container sized to concurrently receive the sleeve and the first container. The second container may comprise a bottom, at least one sidewall, and an open interior chamber. The bottom of the first container sits within the open interior chamber of the second container a distance above the bottom of the second container when the first container, the sleeve, and the second container are in a stacked and nested relationship.

In some embodiments, the system may further comprise a third container. The third container may comprise a bottom, at least one sidewall, and an open interior chamber. The third container may be sized to slidably receive the first container and the sleeve.

In some embodiments, the system may further comprise a first lid and a clasping mechanism that is releasably coupled to the first lid and the second container.

In some embodiments, the system may further comprise a second lid, the second lid configured to engage a flange outwardly extending from the at least one sidewall of the third container. The second lid may be sized to cover and seal the open interior chamber of the third container.

In some embodiments, the at least one sidewall of the sleeve may further comprise an outwardly extending flange. The flange of the first container may be engaged by the annular shoulder of the sleeve and the flange of the sleeve may be engaged by an upper flange of the second container.

In some embodiments, the sleeve may have an outwardly extending tab on an upper end portion thereof and the sleeve surrounds the first container and has a bottom that terminates above and adjacent the bottom of the first container.

It is noted that aspects of the invention described with respect to one embodiment may be incorporated in a different embodiment although not specifically described relative thereto. That is, all embodiments and/or features of any embodiment can be combined in any way and/or combination. Applicant reserves the right to change any originally filed claim or file any new claim accordingly, including the right to be able to amend any originally filed claim to depend from and/or incorporate any feature of any other claim although not originally claimed in that manner. These and other objects and/or aspects of the present invention are explained in detail below.

BRIEF DESCRIPTION OF THE DRAWINGS

FIG. 2D is an illustrated top view of the first container (without a lid) of FIG. 2A.

FIG. 2E is an illustrated top view of the second container of FIG. 2B.

FIG. 2F is an illustrated top view of the third container of FIG. 2C.

FIG. 20B is a cross-sectional view of the second container assembly of FIG. 20A.

FIG. 20C is an exploded view of the components of the second container assembly of FIG. 20A.

DETAILED DESCRIPTION

Figure 1:
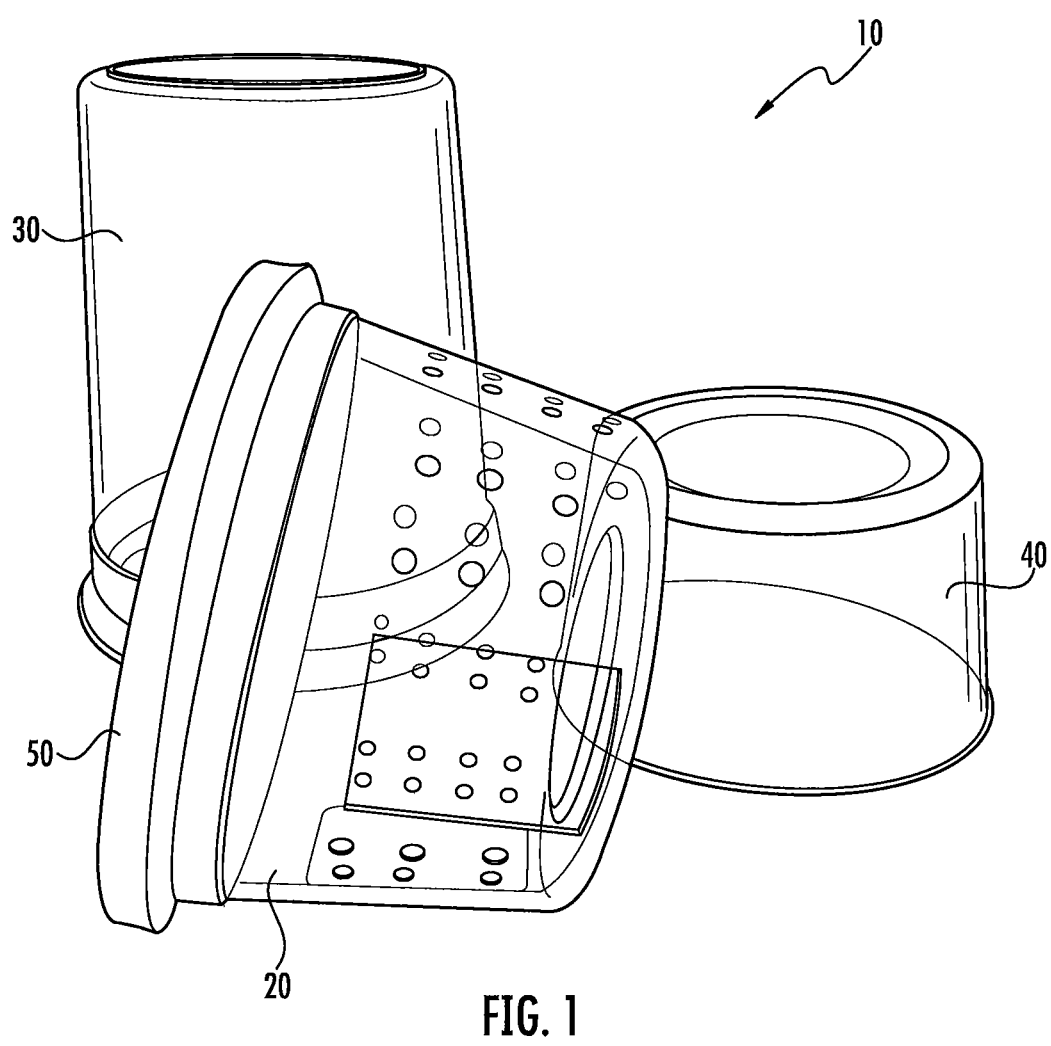
FIG. 1 is a front perspective view of an example stackable infusion filtration and storage system according to embodiments of the present invention.

The present invention now is described more fully hereinafter with reference to the accompanying drawings, in which some embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Like numbers refer to like elements throughout and different embodiments of like elements may be designated using a different number of superscript indicator apostrophes (e.g., 10, 10', 10"). In the figures, the thickness of certain lines, layers, components, elements or features may be exaggerated for clarity. The abbreviations "FIG." and "Fig." are used interchangeably with the word "Figure" to refer to the drawings.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. As used herein, the term "and/or" includes any and all combinations of one or more of the associated listed items.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

It will be understood that when an element is referred to as being "on", "attached" to, "connected" to, "coupled" with, "contacting", etc., another element, it can be directly on, attached to, connected to, coupled with or contacting the other element or intervening elements may also be present. In contrast, when an element is referred to as being, for example, "directly on", "directly attached" to, "directly connected" to, "directly coupled" with or "directly contacting" another element, there are no intervening elements present. It will also be appreciated by those of skill in the art that references to a structure or feature that is disposed "adjacent" another feature may have portions that overlap or underlie the adjacent feature.

Spatially relative terms, such as "under," "below," "lower," "over," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is inverted, elements described as "under" or "beneath" other elements or features would then be oriented "over" the other elements or features. Thus, the exemplary term "under" can encompass both an orientation of "over" and "under". The device may be otherwise oriented (rotated 90 degrees or at other orientations) and the spatially relative descriptors used herein interpreted accordingly. Similarly, the terms "upwardly," "downwardly," "vertical," "horizontal" and the like are used herein for the purpose of explanation only unless specifically indicated otherwise.

The term "about," as used herein with respect to a value or number, means that the value or number can vary by +/−twenty percent (20%).

The term "monolithic" means that the component (e.g., container) is formed of a single uniform material.

The term "semi-rigid" refers to devices that have sufficient rigidity to have a self-supporting fixed shape in the absence of applied forces but have sufficient flexibility to be able to bend or deflect without breaking in response to manually-applied forces seen during normal use, then return to its original self-supporting shape upon removal of the applied force(s).

The term "rigid" refers to devices that have a self-supporting fixed shape unable to bend or be forced out of the shape in response to manually-applied forces seen during normal use.

The terms "infusion material," "infusing material," "infused ingredient" and the like are used interchangeably herein, and refer to any substance at least a portion of which is extracted into or is permeated into a consumable substance during an infusion process. Examples of such a substance include, but are not limited to, one or more of: tea leaves, cocoa, fruit, grains, herbs, spices, seasonings, botanicals, *cannabis*, vegetables, flavor additives, sweeteners, such as glucose, other sugars, artificial sweeteners, or any other material(s) suitable for consumption that can be used to impart a flavor to a consumable substance. Furthermore, the infusion material of the present invention can be used fresh or dried (for instance, in the example of fruit, or another type of plant material, such as garlic, thyme, rosemary, or edible); ground or whole; or in general, can be processed or unprocessed prior to use in an infusion process. There are no limitations to the size of infusion material, in whole or particulate form, when used with the container systems of the present invention. In some embodiments, the infusion material can comprise a material that is readily dissolvable in the consumable substance to be infused, for example, salt or sugar, which are readily dissolvable in water or other liquids. Further, the infusion material can include non-solid materials. For example, the infusion material can comprise a liquid or syrup, such as "simple syrup," or any type of juice or liquid flavoring.

Embodiments of the present invention will now be described in further detail below with reference to the figures. FIG. 1 illustrates a stackable infusion filtration and storage system (also referred to herein as a "stackable container system," "stackable system," or "system") 10 according to embodiments of the present invention. The system 10 may comprise a plurality of stackable containers 20, 30, 40. For example, in some embodiments, a stackable infusion filtration and storage system 10 of the present invention can comprise a first container 20 and a second container 30. According to some embodiments, a stackable infusion filtration and storage system 10 of the present invention may further comprise a third container 40. In some embodiments, the second and third containers 30, 40 of the stackable system 10 can be interchangeably and serially stackable with the first container 20. In some embodiments, the first, second, and third containers 20, 30, 40 can be stacked together. According to some embodiments, a stackable infusion filtration and storage system 10 of the present invention may further comprise a lid (or cover) 50. In some embodiments, the lid 50 can be configured to sealably and releasably engage the first container 20.

Figure 2A:
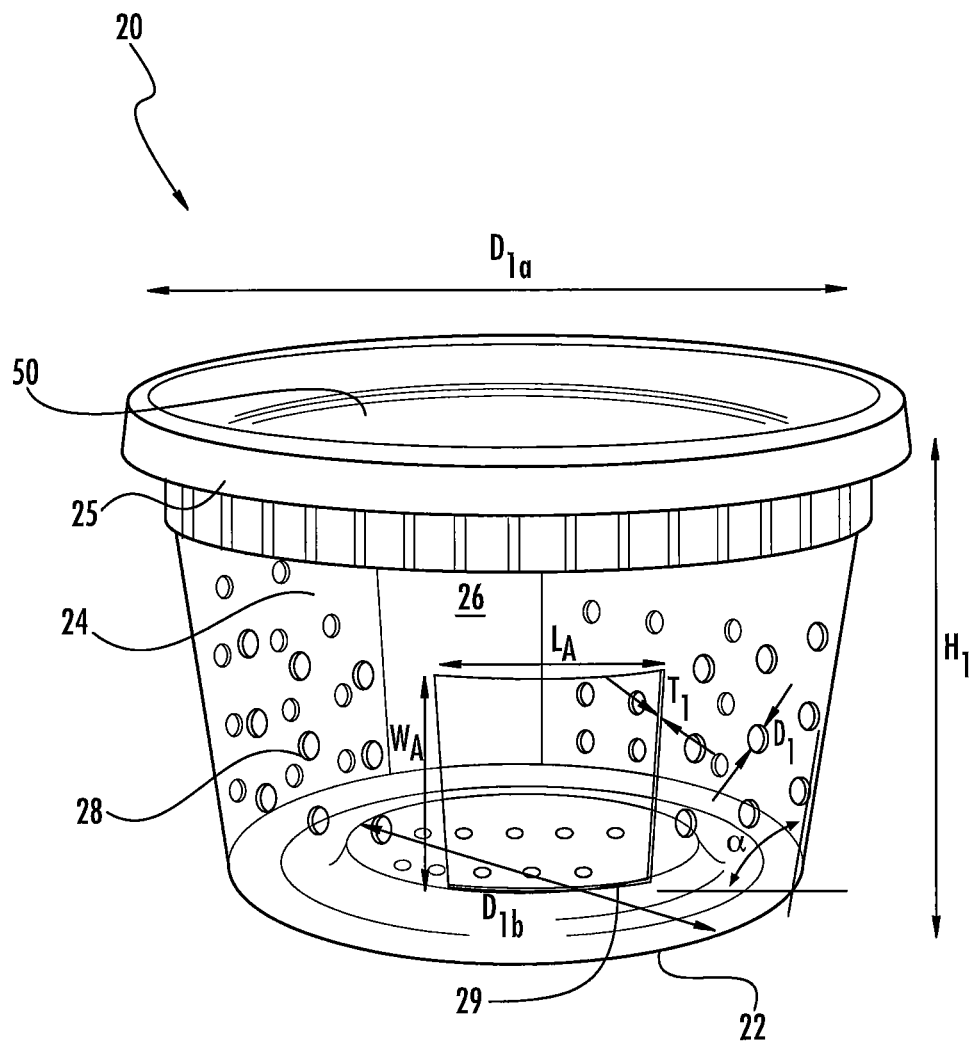
FIG. 2A is a front view of a first container of the system of FIG. 1.
Figure 9:
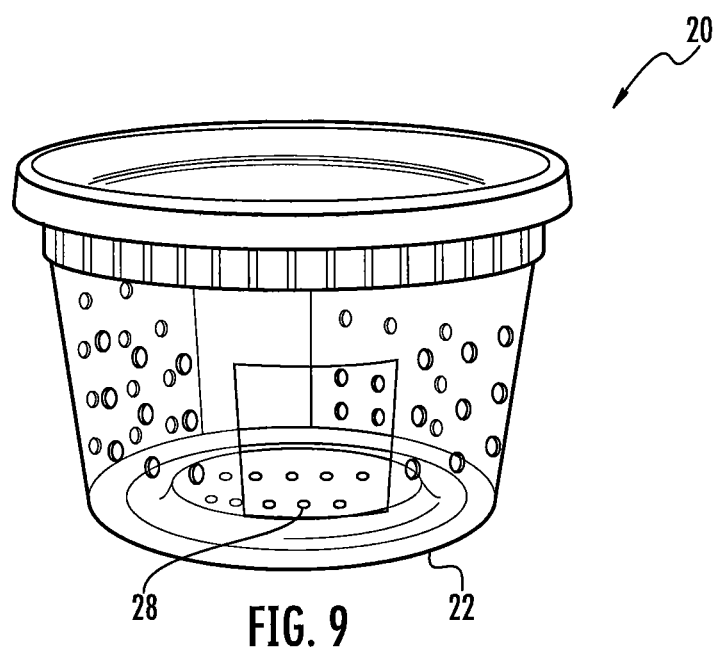
FIG. 9 is a front view of another embodiment of a first container for a stackable infusion filtration and storage system according to further embodiments of the present invention.
Figure 10A:
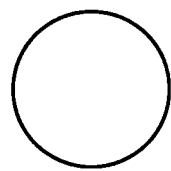
FIGS. 10A-10F illustrate alternative example shapes of apertures for a sidewall and/or a bottom of the first container shown in FIG. 2A according to embodiments of the present invention.
Figure 10B:
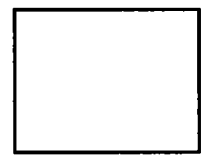
Figure 10C:
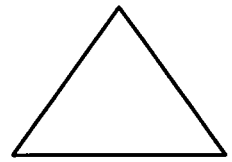
Figure 10D:
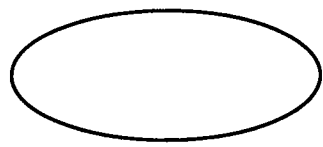
Figure 10E:
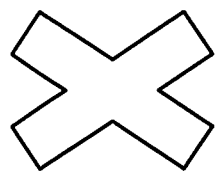
Figure 10F:
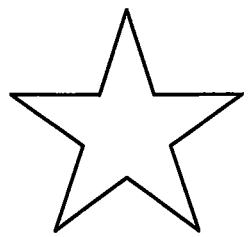

Referring to FIG. 2A, a first container 20 (e.g., an infused butter or ghee container) of the stackable system 10 of the present invention 10 may be a semi-rigid container. As shown in FIG. 2A, in some embodiments, the first container 20 may comprise a bottom 22, at least one sidewall 24, and an open interior chamber 26. In some embodiments, the bottom 22 of the first container 20 may be a solid bottom having a contiguous, closed bottom surface. In some embodiments, the bottom 22 of the first container 20 may comprise a plurality of apertures 27, 28, 29 (see, e.g., FIG. 9, see also, e.g., FIG. 15B, apertures 27"). The at least one sidewall 24 of the first container 20 extends upwardly from the bottom 22 of the first container 20. The sidewall 24 of the first container 20 has a height ($H_1$) and a thickness ($T_1$) (see also, e.g., FIG. 2D). In some embodiments, the sidewall 24 of the first container 20 may comprise an upper flange (or rim) 25 along a top edge portion of the sidewall 24.

In some embodiments, the sidewall 24 of the first container 20 may have a height ($H_1$) in a range of about 2 inches (about 51 mm) to about 6 inches (about 152 mm), such as, for example, a range of about 3 inches (about 76 mm) to about 5 inches (about 127 mm). In some embodiments, the sidewall 24 of the first container 20 may have a thickness ($T_1$) in a range of about 0.04 inches (about 1 mm) to about 0.4 inches (about 10 mm), such as, for example, a range of about 0.08 inches (about 2 mm) to about 0.2 inches (about 5 mm).

In some embodiments, the at least one sidewall 24 extends upwardly and at an angle ($\alpha$) radially outwardly from the bottom 22 of the first container 20 such that the bottom 22 of the first container 20 is smaller than the top of the open interior chamber 26, i.e., the sidewall 24 of the first container 20 can be tapered. In some embodiments, the sidewall 24 of the first container 20 may extend upwardly and radially outwardly at an angle ($\alpha$) of about 90 degrees to about 135 degrees relative to the bottom 22 of the first container 20, including about 95°, 100°, 105°, 110°, 115°, 120°, 125°, and 130°. Together, the bottom 22 and the at least one sidewall 24 of the first container 20 form the open interior chamber 26.

In some embodiments, the first container 20 may have a diameter ($D_1$) or width ($W_1$) (see also, e.g., FIG. 8A) in the range of about 4 inches (about 102 mm) to about 7 inches (about 178 mm), such as, for example, a range of about 5 inches (about 127 mm) to about 6 inches (about 152 mm). In some embodiments, the first container 20, 20' may have a top diameter/width ($D_{1a}/W_{1a}$) and a bottom diameter/width ($D_{1b}/W_{1b}$) In some embodiments, the bottom diameter/width ($D_{1b}/W_{1b}$) of the first container 20, 20' is about equal to or less than the top diameter/width ($D_{1a}/W_{1a}$) of the first container 20, 20' such as, for example, when the first container 20, 20' is tapered. In some embodiments, first container 20, 20' may have a top diameter/width ($D_{1a}/W_{1a}$) that is greater than the height ($H_1$) of the first container 20, 20'. In some embodiments, the first container 20, 20' may have a height:diameter or a height:width ratio of about 1:1 to about 1:1.5.

Figure 6A:
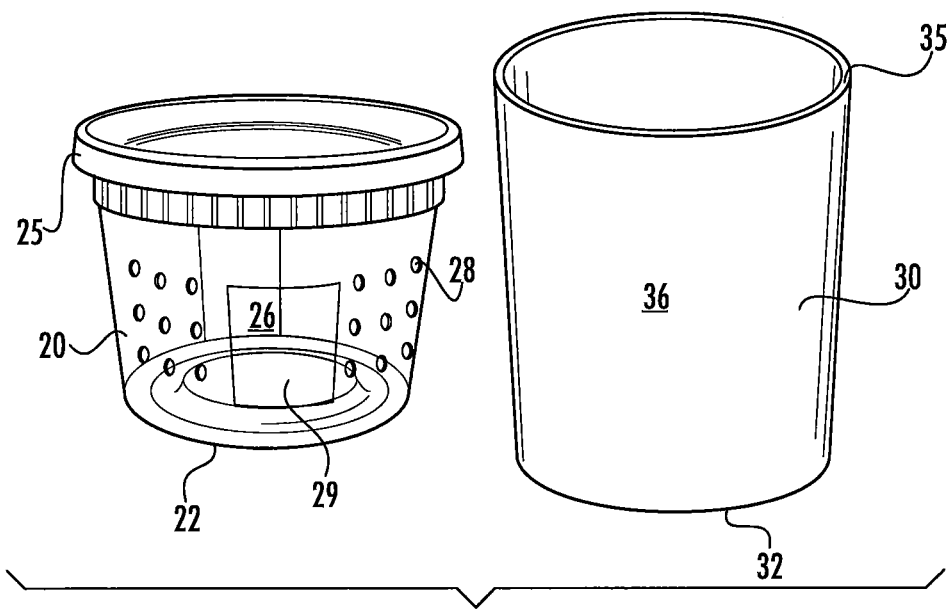
FIGS. 6A-6L illustrate a series of actions for an example method of using the stackable infusion filtration and storage system of FIG. 1 according to embodiments of the present invention.
Figure 6B:
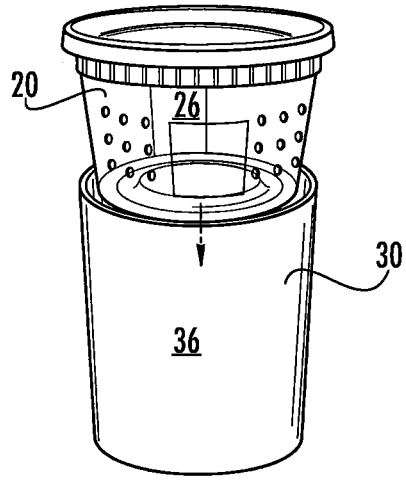
Figure 6C:
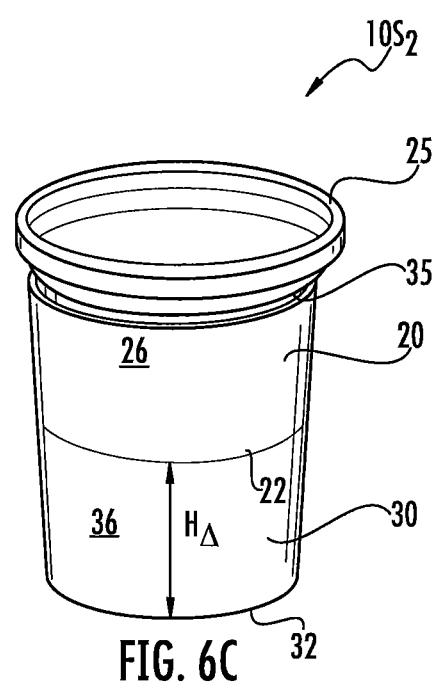
Figure 6D:
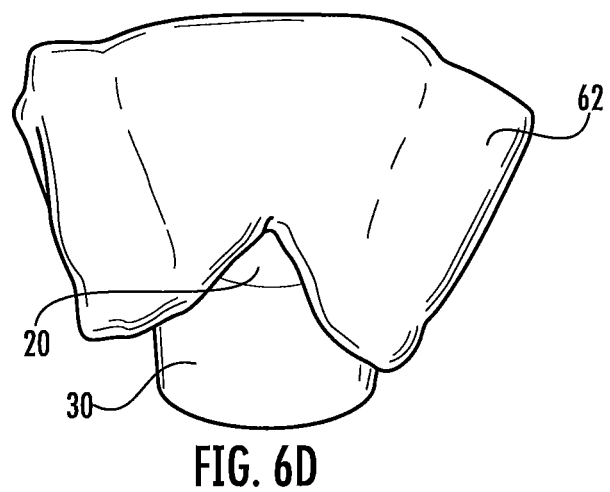
Figure 6E:
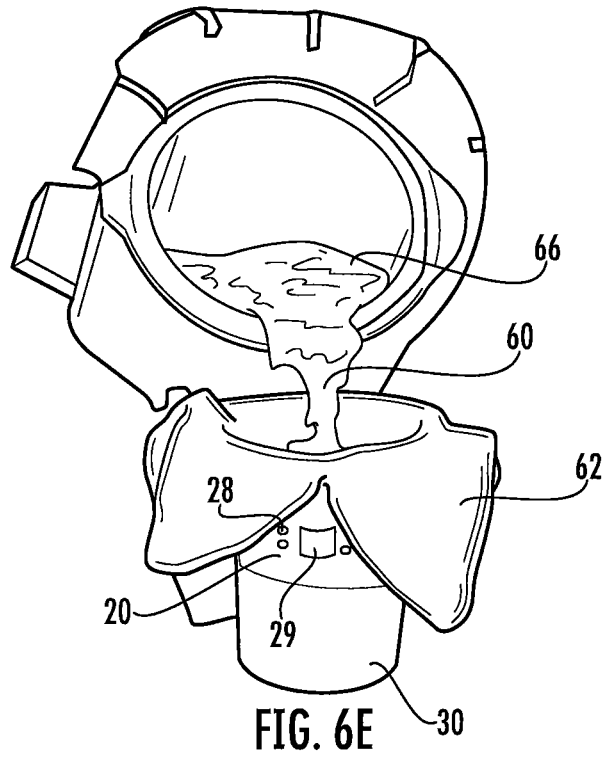
Figure 6H:
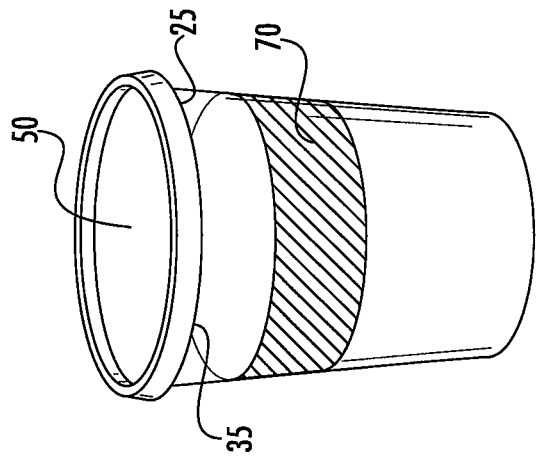
Figure 6G:
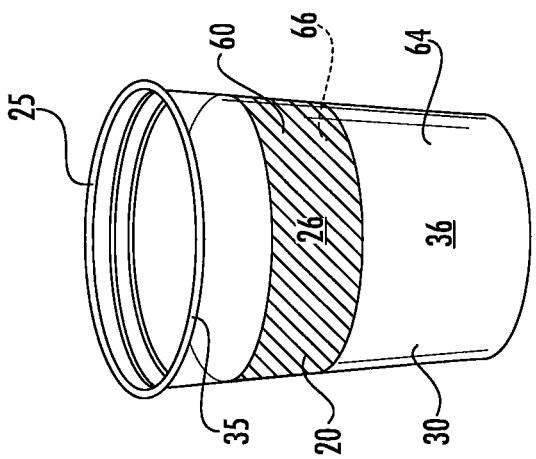
Figure 6F:
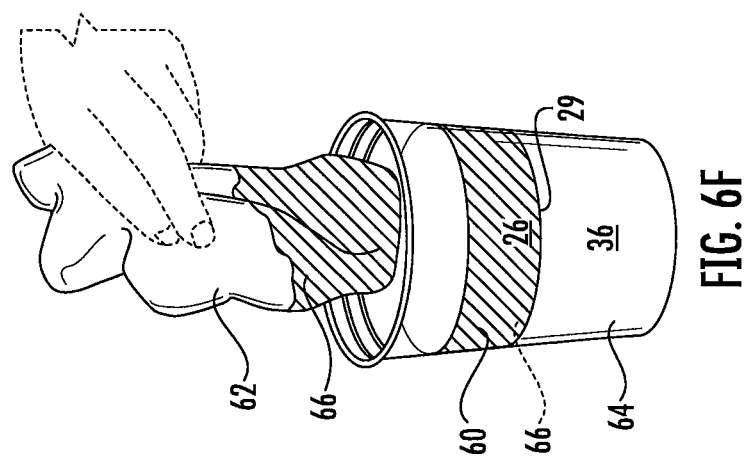

The open interior chamber 26 of the first container 20 may be particularly suitable to hold an infused butter (or ghee) mixture 60 (see, e.g., FIGS. 6F-6H). For example, as shown in FIG. 6E and FIG. 6F, in some embodiments, the first container 20 may hold an infused butter mixture 60 comprising an infusion material 66. As discussed above, exemplary types of infusion materials 66 that may be used in an infused butter (or ghee) mixture 60 include, but are not limited to, tea leaves, cocoa, fruit, grains, herbs, spices, seasonings, botanicals, *cannabis*, vegetables, flavor additives, and/or sweeteners (including, artificial sweeteners). In some embodiments, the infusion material 66 may comprise herbs, spices, seasonings, botanicals and/or *cannabis*.

Referring again to FIG. 2A, in some embodiments, the at least one sidewall 24 of the first container 20 may comprise a plurality of apertures 28, 29. The plurality of apertures 28, 29 may vary in shapes, sizes and patterns. For example, in some embodiments, the plurality of apertures 28, 29 may comprise one or more of circular apertures, polygonal apertures, triangular apertures, elliptical apertures, cross-shaped apertures, and/or star-shaped apertures (see, e.g., FIGS. 10A-10F). The shapes, sizes, and/or patterns of the apertures 28, 29 may be chosen based on the flow properties of the infused butter mixture 60 (e.g., based on the viscosity). For example, the shapes and locations of the apertures 28, 29 may be chosen to achieve a targeted viscosity for the infused butter mixture 60. In some embodiments, the apertures 28, 29 may be provided in a series of rows and columns of circular apertures 28 separated by a polygonal aperture 29. For example, as shown in FIG. 2A, the apertures 28, 29 are provided in a series of four rows and four columns of circular apertures 28, each circular aperture 28 having a diameter ($D_A$) in a range of about 0.1 inches (about 2.5 mm) to about 0.25 inches (about 6.5 mm), separated by a polygonal aperture 29 having a length ($L_A$) and a width ($W_A$). In some embodiments, the polygonal aperture 29 may have a length ($L_A$) in a range of about 1 inch (about 25 mm) to about 1.5 inches (about 38 mm). In some embodiments, the polygonal aperture 29 may have a width ($W_A$) of about 1.5 inches (about 38 mm) to about 2.5 inches (about 63 mm). The plurality of apertures 28, 29 may repeat this pattern, along the entire sidewall 24 of the first container 20. As shown in FIG. 12E, in some embodiments, the plurality of apertures 28 may be provided as a series of circular apertures 28 located adjacent to the bottom 22 of the first container 20. In some embodiments, the bottom of the at least some of the apertures 28 may be located a distance (S) from the bottom 22 of the first container 20 in the range of about 2 mm (about 0.1 inches) to about 30 mm (about 1 inch), including about 2.5 mm, 3 mm, 3.5 mm, 4 mm, 4.5 mm, 5 mm, 5.5 mm, 6 mm, 6.5 mm, 7 mm, 7.5 mm, 8 mm, 8.5 mm, 9 mm, 9.5 mm, 10 mm, 10.5 mm, 11 mm, 11.5 mm, 12 mm, 12.5 mm, 13 mm, 13.5 mm, 14 mm, 14.5 mm, 15 mm, 15.5 mm, 16 mm, 16.5 mm, 17 mm, 17.5 mm, 18 mm, 18.5 mm, 19 mm, 19.5 mm, 20 mm, 20.5 mm, 21 mm, 21.5 mm, 22 mm, 22.5 mm, 23 mm, 23.5 mm, 24 mm, 24.5 mm, 25 mm, 25.5 mm, 26 mm, 26.5 mm, 27 mm, 27.5 mm, 28 mm, 28.5 mm, 29 mm, and 29.5 mm.

Figure 12A:
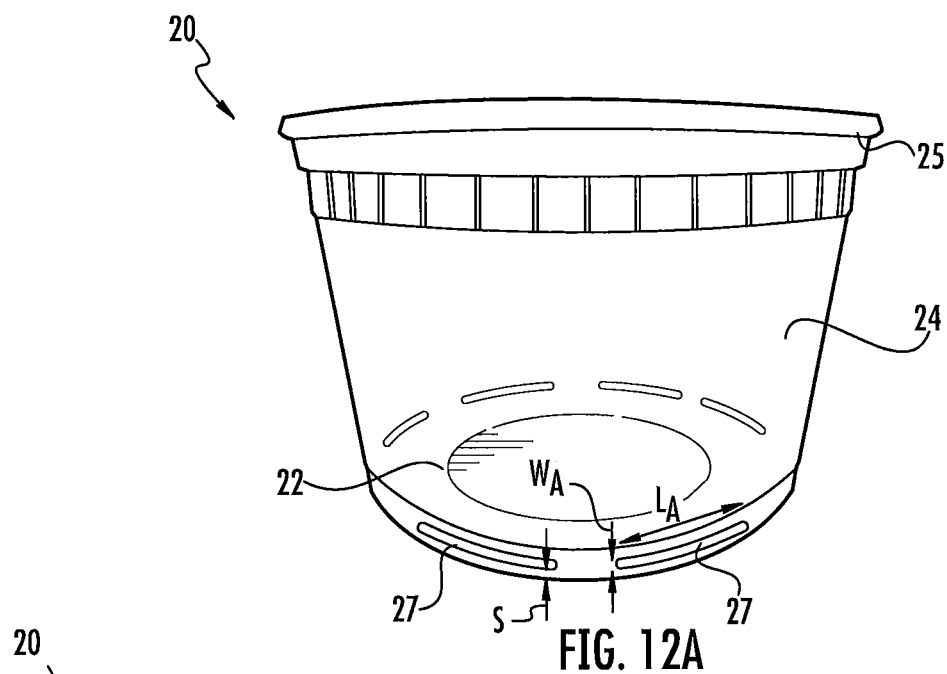
FIGS. 12A-12E are illustrated front views of a first container of the system having an alternative patterns of apertures according to embodiments of the present invention.
Figure 12B:
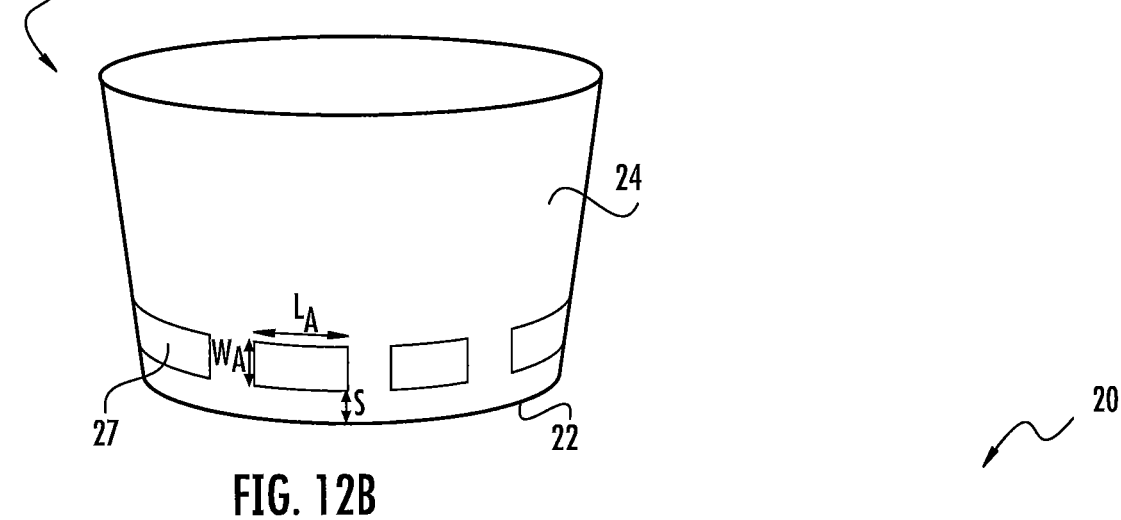
Figure 12C:
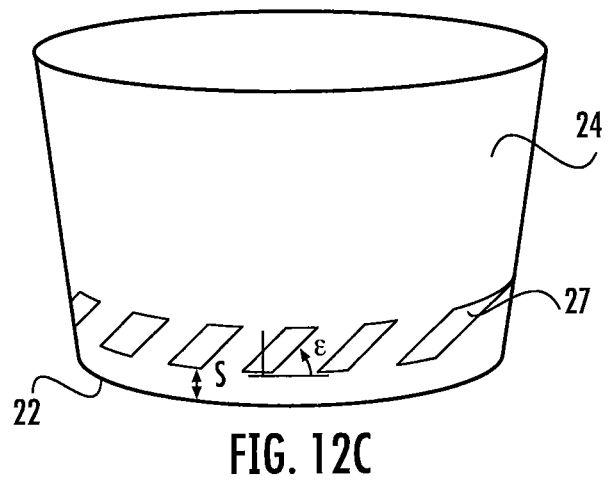
Figure 12D:
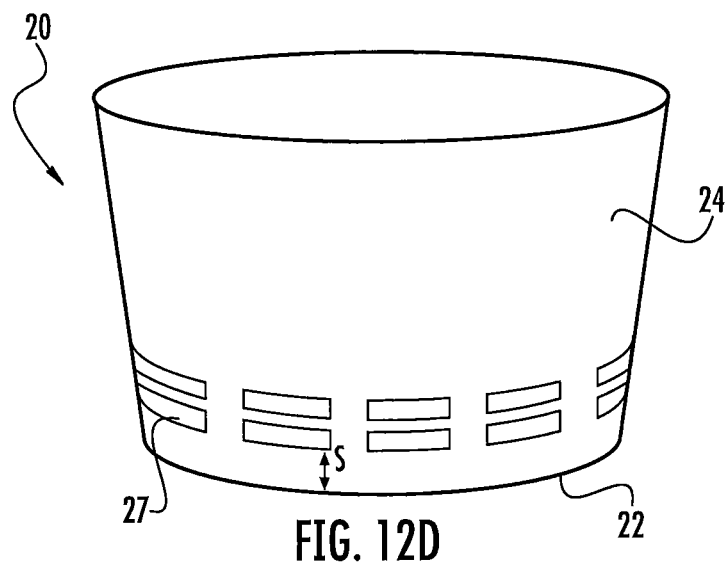
Figure 12E:
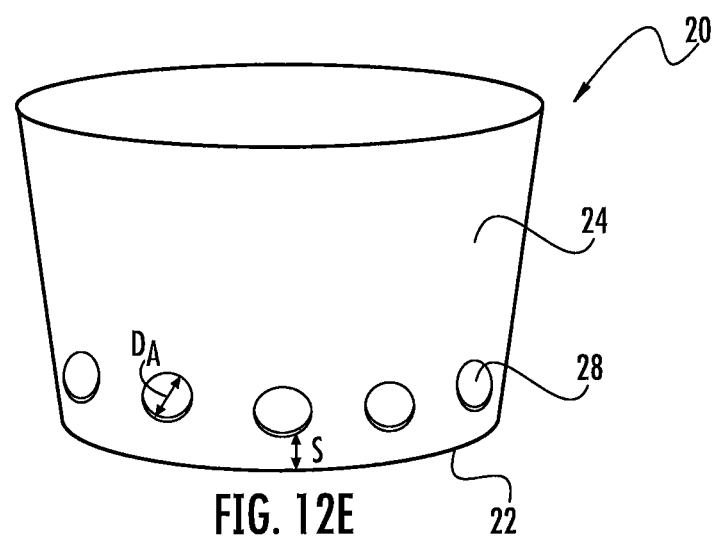

Referring to FIGS. 12A-12D, in some embodiments, the at least one sidewall 24 of the first container 20 may comprise a plurality of elongate apertures 27. The plurality of elongate apertures 27 may have a length ($L_A$) that is greater than the width ($W_A$). In some embodiments, the plurality of apertures 27 may have a length ($L_A$) of about 0.75 inches (about 19 mm) to about 1.25 inches (about 32 mm). In some embodiments, the plurality of apertures 27 may have a width ($W_A$) of about 0.1 inches (about 2.5 mm) to about 0.5 inches (about 12.5 mm). For example, in some embodiments, the elongate apertures 27 may have a length ($L_A$) of about 1 inch (about 25 mm) and a width ($W_A$) of about 0.25 inches (about 7 mm). The plurality of elongate apertures 27 may be provided as a series of laterally and/or circumferentially spaced apart horizontally-oriented elongate apertures 27 (FIGS. 12A-12B). As used herein, "horizontally-oriented" refers to a direction relative to the bottom 22 of the first container 20. For example, as shown in FIG. 12A, in some embodiments, the plurality of elongate apertures 27 are provided in a series of eight horizontally-oriented elongate apertures 27. In some embodiments, the apertures 27 may be provided as a series of a number of rows of horizontally-oriented elongate apertures 27, such as, for example, 1, 2, 3, 4 or 5 rows of horizontally-oriented elongate apertures 27. For example, as shown in FIG. 12D, in some embodiments, the plurality of elongate apertures 27 may be provided as a series of two rows of horizontally-oriented elongate apertures 27. The elongate apertures 27 may be located adjacent to the bottom 22 of the first container 20. The term "adjacent" as used herein with respect to the plurality of apertures 27, 28, 29 means residing closer to the bottom 22 of the first container 20 than the top of the first container 20. In some embodiments, the elongate apertures 27 may be located a distance (S) from the bottom 22 of the first container 20 in the range of about 0.1 inches (about 2.5 mm) to about 0.25 inches (about 7 mm). In some embodiments, elongate apertures 27" may be located in a bottom 22" of a first container 20" (see, e.g., FIG. 15B).

As shown in FIG. 12C, in some embodiments, the elongate apertures 27 may be provided as a series of laterally and/or circumferentially spaced apart elongate apertures 27 oriented at an angle (E) relative to the bottom 22 of the first container 20. In some embodiments, the elongate apertures 27 may be oriented at an angle (E) of about 0 degrees to about 90 degrees relative to the bottom 22 of the first container 20, including about 5°, 10°, 15°, 20°, 25°, 30°, 35°, 40°, 45°, 50°, 55°, 60°, 65°, 70°, 75°, 80°, and 85°.

Figure 8C:
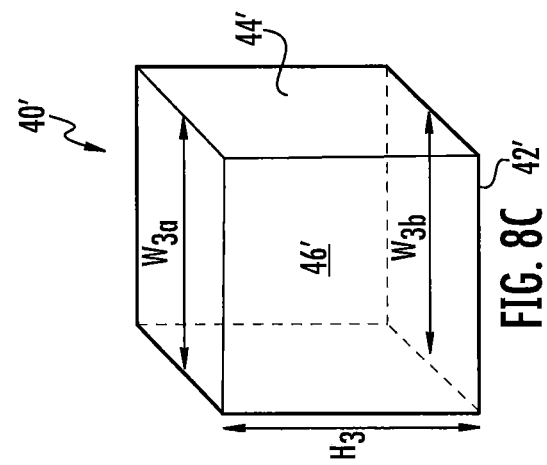
FIGS. 8A-8C are illustrated front perspective views of a first container, a second container, and a third container, respectively, of a stackable infusion filtration and storage system according to further embodiments of the present invention.

In some embodiments, the first container 20 may have more than one sidewall 24. In those embodiments, the plurality of apertures 27, 28, 29 on each sidewall 24 may be arranged in the same or different pattern. For example, as shown in FIG. 8A, the first container 20' has four sidewalls 24', each sidewall 24' having a plurality of rows and columns (shown as three rows and two columns) of circular apertures 28' separated by a polygonal aperture 29'. The shapes, sizes, and patterns for the plurality of apertures 27, 28, 28', 29, 29' shown in FIG. 2A, FIG. 8A and FIGS. 12A-12E, respectively, are illustrative and should not be understood or construed to be limited to only the shapes, sizes, and patterns of apertures 27, 28, 28', 29, 29' shown in the Figures, as the sidewall(s) 24, 24' of the first container 20, 20' of the stackable container system 10 of the present invention may comprise a variety of different combinations of shapes, sizes and/or patterns of apertures 27, 28, 28', 29, 29'. As discussed above, the shape, size, pattern, and location of the apertures 27, 28, 28', 29, 29' is determined based on the targeted viscosity of the infused mixture 60 being used with the system 10.

Figure 2B:
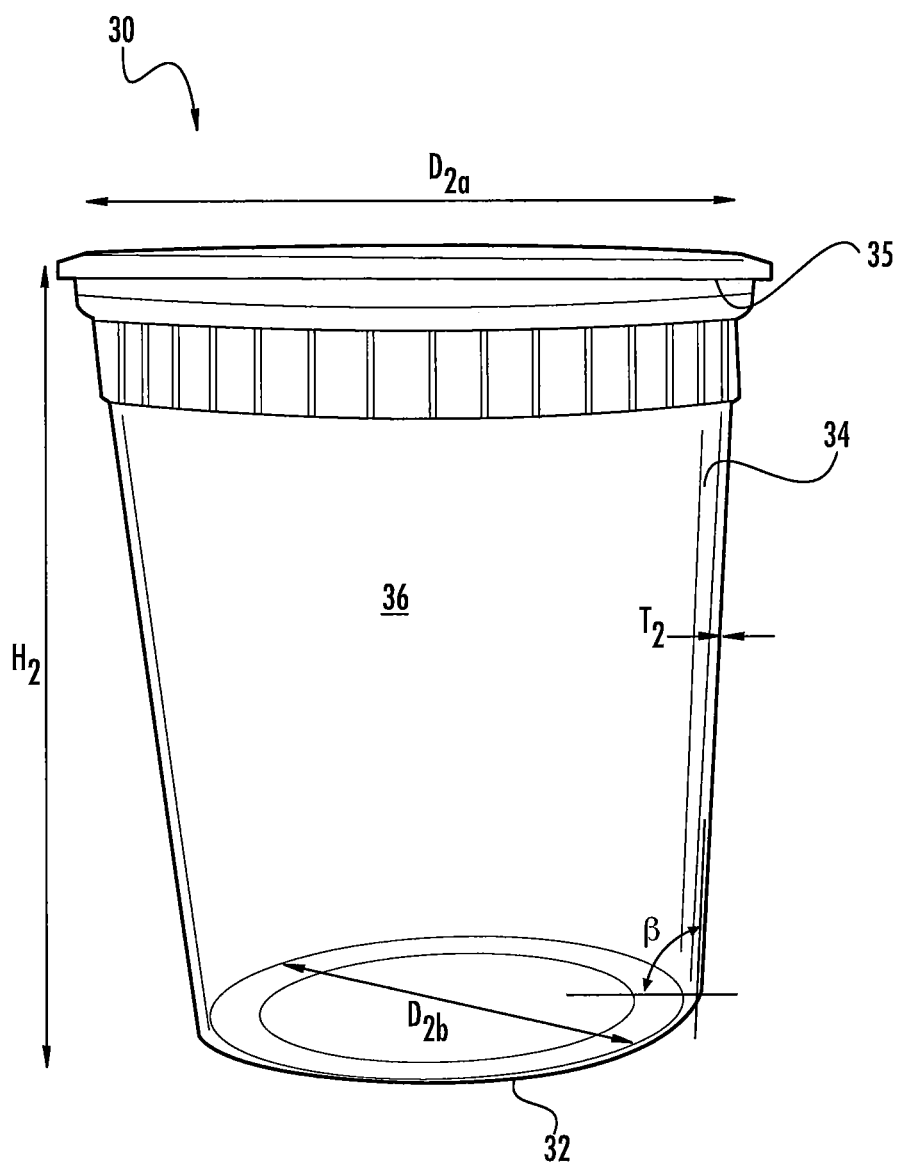
FIG. 2B is a front view of a second container of the system of FIG. 1.

Referring now to FIG. 2B, the second (or liquid collection) container 30 of the stackable system 10 may be a semi-rigid container. As shown in FIG. 2B, in some embodiments, the second container 30 may comprise a bottom 32, at least one sidewall 34, and an open interior chamber 36. Together, the bottom 32 and the at least one sidewall 34 of the second container 30 form an open interior chamber 36. The at least one sidewall 34 of the second container 30 extends upwardly from the bottom 32. The sidewall 34 of the second container 30 has a height ($H_2$) and a thickness ($T_2$) (see also, e.g., FIG. 2E). In some embodiments, the sidewall 34 of the second container 30 may comprise an upper flange (or rim) 35 along a top edge portion of the sidewall 34 of the second container 30. The height ($H_2$) of the second container 30 is greater than the height ($H_1$) of the first container 20, and typically two times ($2x$) to ten times ($10x$) greater than the height ($H_1$) of the first container 20. In some embodiments, the sidewall 34 of the second container 30 may have a height ($H_2$) in a range of about 6 inches (about 152 mm) to about 12 inches (about 305 mm), such as, for example, a range of about 7 inches (about 178 mm) to about 10 inches (about 254 mm). In some embodiments, the sidewall 34 of the second container 30 may have a thickness ($T_2$) in a range of about 0.04 inches (about 1 mm) to about 0.4 inches (about 10 mm), such as, for example, a range of about 0.08 inches (about 2 mm) to about 0.2 inches (about 5 mm).

In some embodiments, the at least one sidewall 34 extends upwardly and at an angle ($\beta$) radially outwardly from the bottom 32 of the second container 30 such that the bottom 32 of the second container 30 is smaller than the top of the open interior chamber 36, i.e., the sidewall 34 of the second container 30 is tapered. In some embodiments, the sidewall 34 of the second container 30 may extend upwardly and radially outwardly at an angle ($\beta$) of about 90 degrees to about 135 degrees relative to the bottom 32 of the second container 30, including about 95°, 100°, 105°, 110°, 115°, 120°, 125°, and 130°. The angle ($\beta$) of the sidewall 34 of the second container 30 is about equal to or greater than the angle ($\alpha$) of the sidewall 24 of the first container 20.

Figure 8B:
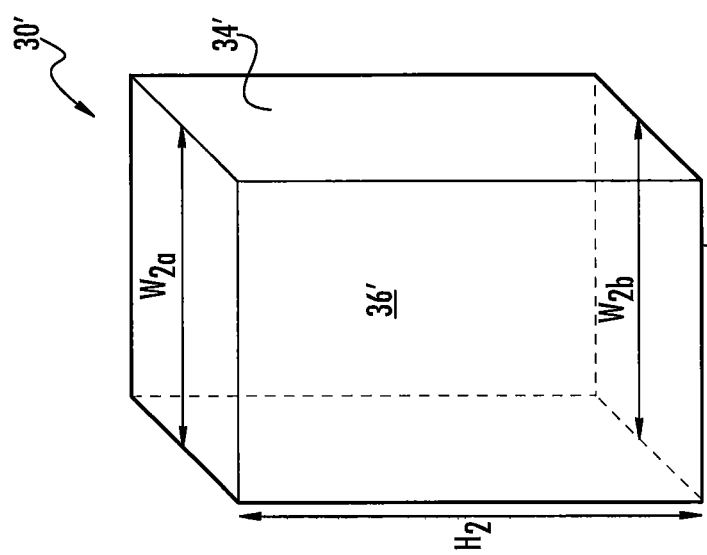
Figure 8A:
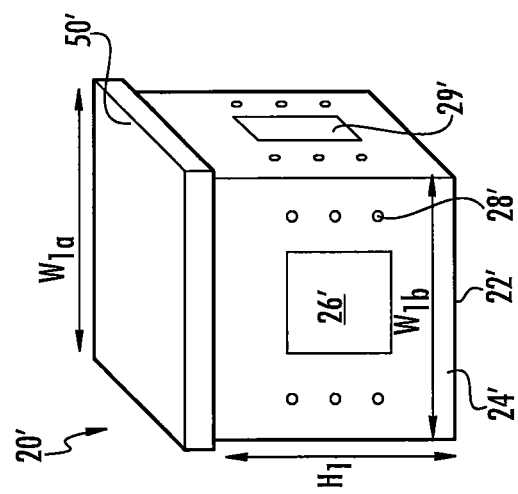

In some embodiments, the second container 30 may have a diameter ($D_2$) or width ($W_2$) see also, e.g., FIG. 8B) in the range of about 4 inches (about 102 mm) to about 7 inches (about 178 mm), such as, for example, a range of about 3 inches (about 76 mm) to about 5 inches (about 127 mm). In some embodiments, the second container 30, 30' may have a top diameter/width ($D_{2a}/W_{2a}$) and a bottom diameter/width ($D_{2b}/W_{2b}$) In some embodiments, the bottom diameter/width ($D_{2b}/W_{2b}$) of the second container 30, 30' is about equal to or less than the top diameter/width ($D_{2a}/W_{2a}$) of the first container 30, 30' such as, for example, when the second container 30, 30' is tapered. In some embodiments, the second container 30 may have a top diameter/width ($D_{2a}/W_{2a}$) that is less than the height ($H_2$) of the second container 30. In some embodiments, the second container 30 may have a height:diameter or a height:width ratio of about 2:1.

The open interior chamber 36 of the second container 30 may be particularly suitable to collect liquid (e.g., water) as it separates from the infused butter (or ghee) mixture 60 (see, e.g., FIGS. 6F-6H) as the infused butter solidifies. This will be discussed in further detail below. As used herein, the terms "solidifies", "solidified", and the like, when used in reference to an infused substance, means that the infused substance has transformed from a liquid state to a solid state and the infused substance has a water content of less than about twenty percent (20%) by weight of the respective infused substance.

Figure 2C:
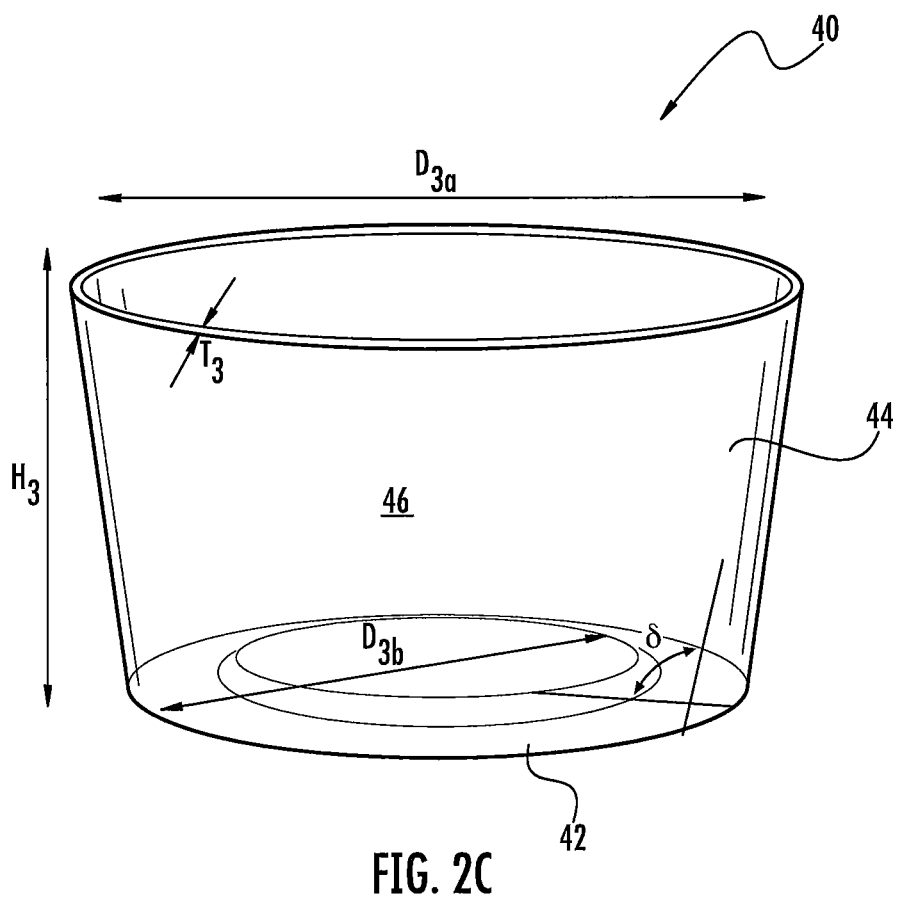
FIG. 2C is a front view of a third container of the system of FIG. 1.

Referring now to FIG. 2C, in some embodiments, a stackable container system 10 of the present invention may further comprise a third (or storage) container 40. The third container 40 may be a semi-rigid container that is sized to slidably receive the first container 20. As shown in FIG. 2C, in some embodiments, the third container 40 may comprise a bottom 42, at least one sidewall 44, and an open interior chamber 46. The sidewall 44 of the third container 40 extends upwardly from the bottom 42. The sidewall 44 of the third container 40 has a height ($H_3$) and a thickness ($T_3$) (see also, e.g., FIG. 2F). The height ($H_3$) of the third container 40 may be less than the height ($H_2$) of the second container 30 (e.g., about half the height ($H_2$) of the second container 30), and is typically about equal to the height ($H_1$) of the first container 20. In some embodiments, the sidewall 44 of the third container 40 may have a height ($H_3$) in the range of about 2 inches (about 51 mm) to about 6 inches (about 152 mm), such as, for example, a range of about 3 inches (about 76 mm) to about 5 inches (about 127 mm). In some embodiments, the sidewall 44 of the third container 40 may have a thickness ($T_3$) in a range of about 0.04 inches (about 1 mm) to about 0.4 inches (about 10 mm), such as, for example, in a range of about 0.08 inches (about 2 mm) to about 0.2 inches (about 5 mm). Together, the bottom 42 and the at least one sidewall 44 of the third container 40 may form an open interior chamber 46. The open interior chamber 46 of the third container 40 may be used to slidably receive and hold/store the first container 20 with an infused butter 70 (see, e.g., FIG. 6L).

Referring to FIG. 2C, in some embodiments, the at least one sidewall 44 extends upwardly and at an angle ($\gamma$) radially outwardly from the bottom 42 of the third container 40 such that the bottom 42 of the third container 40 is smaller than the top of the open interior chamber 46, i.e., the sidewall 44 of the third container 40 is tapered. In some embodiments, the sidewall 44 of the third container 40 may extend upwardly and radially outwardly at an angle ($\gamma$) of about 90 degrees to about 135 degrees relative to the bottom 42 of the third container 40, including about 95°, 100°, 105°, 110°, 115°, 120°, 125°, and 130°. The angle ($\gamma$) of the sidewall 44 of the third container 40 is about equal to or greater than the angle ($\alpha$) of the sidewall 24 of the first container 20 and is about equal to or less than the angle ($\beta$) of the sidewall 34 of the second container 30.

In some embodiments, the third container 40 may have a diameter ($D_3$) or width ($W_3$) (see also, e.g., FIG. 8C) in the range of about 4 inches (about 102 mm) to about 7 inches (about 178 mm), such as, for example, a range of about 3 inches (about 76 mm) to about 5 inches (about 127 mm). In some embodiments, the third container 40, 40' may have a top diameter/width ($D_{3a}/W_{3a}$) and a bottom diameter/width ($D_{3b}/W_{3b}$). In some embodiments, the bottom diameter/width ($D_{3b}/W_{3b}$) of the third container 40, 40' is about equal to or less than the top diameter/width ($D_{3a}/W_{3a}$) of the third container 40, 40' such as, for example, when the third container 40, 40' is tapered. In some embodiments, the third container 40 may have a top diameter/width ($D_{3a}/W_{3a}$) that is greater than the height ($H_3$) of the third container 40. In some embodiments, the third container 40 may have a height:diameter or a height:width ratio of about 1:1 to about 1:1.5.

Figure 3:
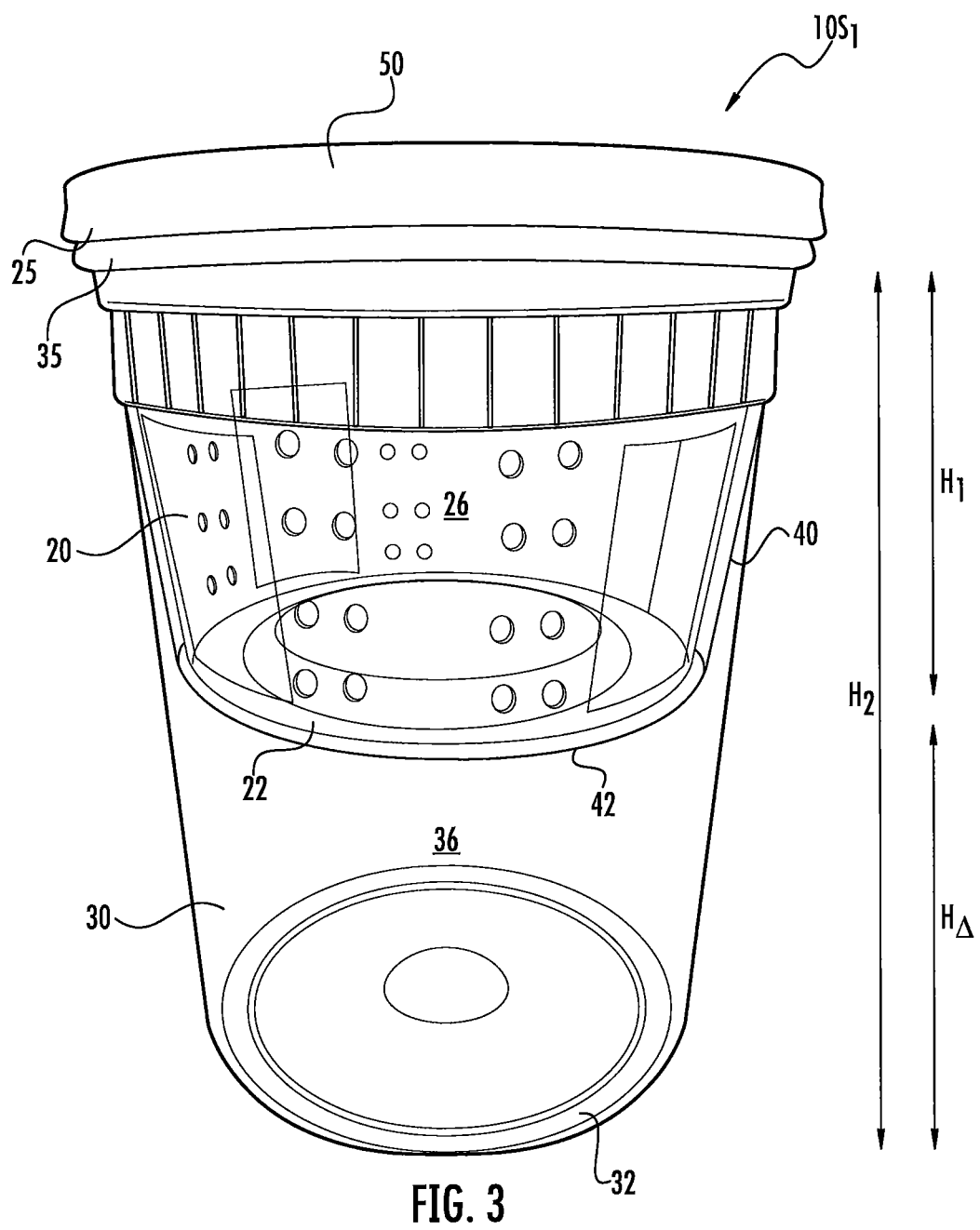
FIG. 3 is a front view of the first container of FIG. 2A, the second container of FIG. 2B, and the third container of FIG. 2C in a cooperating stacked and nested relationship according to embodiments of the present invention.

Referring now to FIG. 3, the first container 20, second container 30, and third container 40 may be stackable or assembled together to provide a nested, stacked set of containers $10s_1$. As shown in FIG. 3, in some embodiments, the second container 30 may be sized to concurrently receive the first container 20 and the third container 40. For example, in some embodiments, the first container 20 may be first stacked into the third container 40. The combined stack of the first container 20 and the third container 40 may then be stacked into the second container 30 such that the first container 20 and the third container 40 are within the open interior chamber 36 of the second container 30. This assembled together, stacked and nested relationship $10s_1$ of containers 20, 30, 40 may be used, such as, for example, during pre-use storage and/or packaging of the stackable system 10 for shipping purposes.

Figure 4:
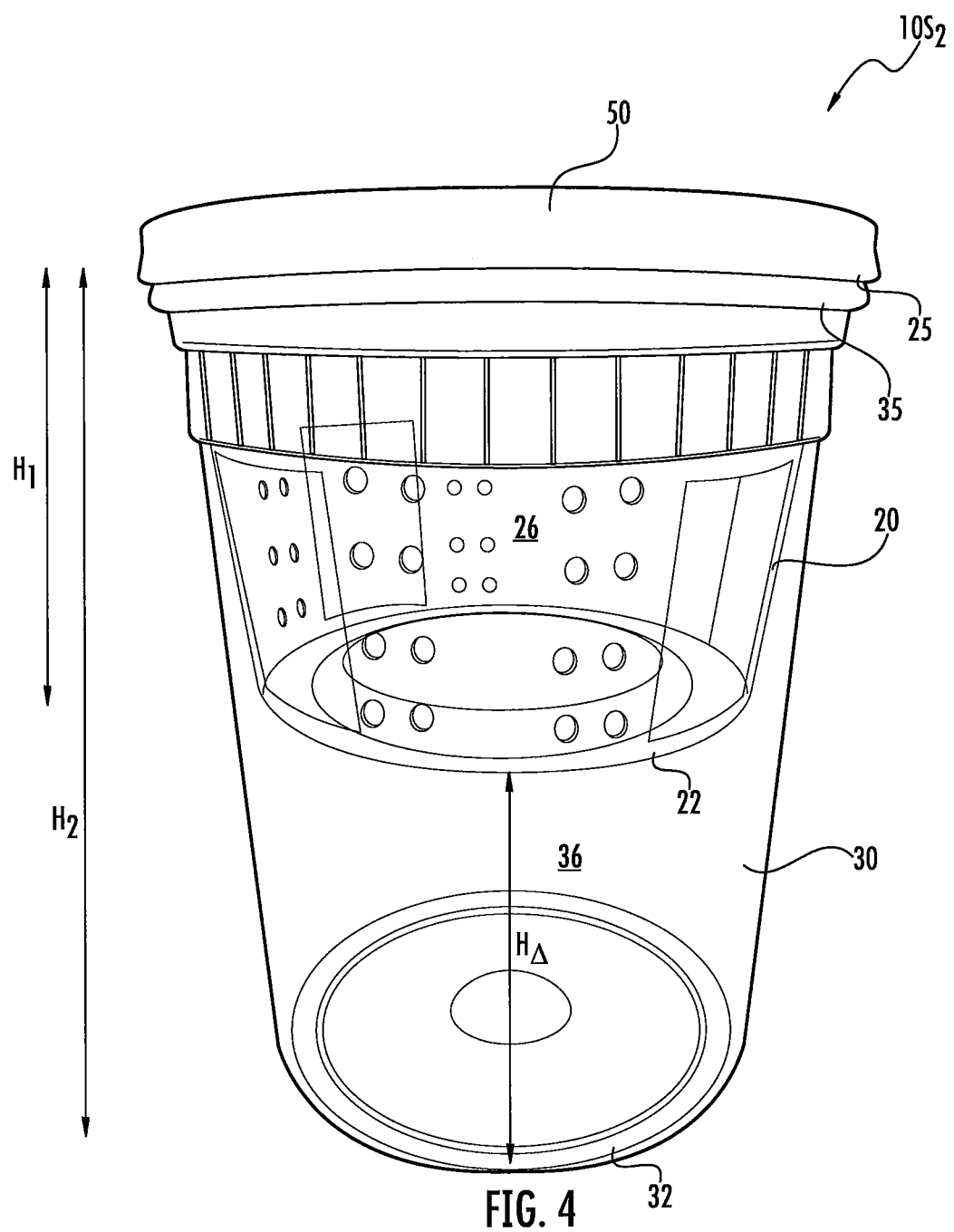
FIG. 4 is a front view of the first container of FIG. 2A and the second container of FIG. 2B in a cooperating stacked and nested relationship according to embodiments of the present invention.

As shown in FIG. 4, in some embodiments, the first container 20 may be received in the second container 30 without the third container 40 such that the first container 20 fits within the open interior chamber 36 of the second container 30 apart from the third container 40. This stacked and nested relationship $10s_2$ of containers 20, 30 may be used, such as, for example, during separation of the liquid 64 and solidification of an infused butter mixture 60 (see, e.g., FIG. 6F-6H).

Figure 5:
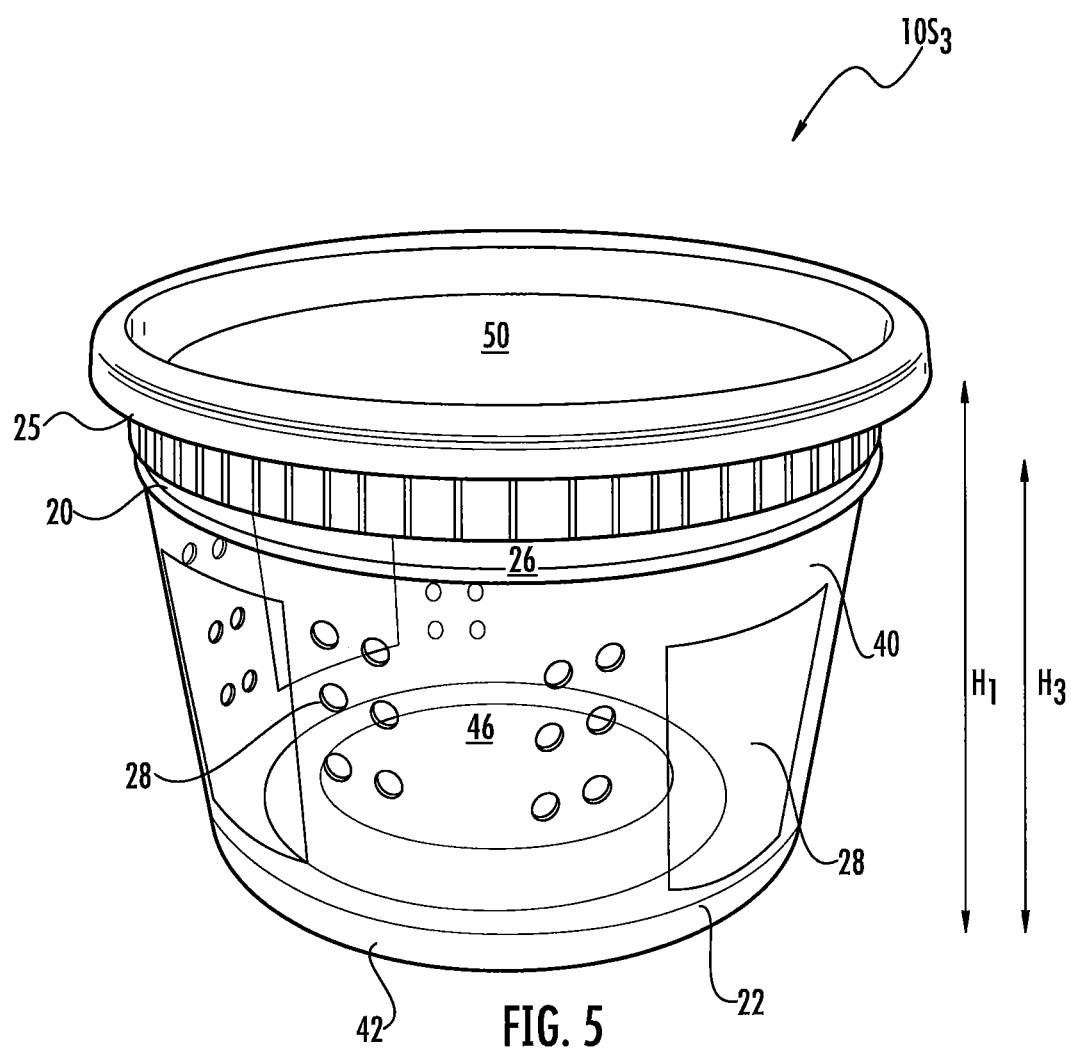
FIG. 5 is a front view of the first container of FIG. 2A and the third container of FIG. 2C in a cooperating stacked and nested relationship according to embodiments of the present invention.

As shown in FIG. 5, in some embodiments, the third container 40 may be sized to slidably receive the first container 20. For example, in some embodiments, the first container 20 may be slidably received into the third container 40 such that the first container 20 fits within the open interior chamber 46 of the third container 40 apart from the second container 30. This stacked and nested relationship $10s_3$ of containers 20, 40 may be used, such as, for example, during storage of an infused butter 70 (see, e.g., FIG. 6L).

Referring to FIG. 2A, FIG. 2D, FIG. 3, FIG. 4, and FIG. 6C, for example, in some embodiments, the flange 25 of the first container 20 may extend radially outwardly from the sidewall 24 of the first container 20 such that the flange 25 of the first container 20 engages (or sits on top of) the flange 35 (or a top edge portion of the sidewall 34) of the second container 30 when the first container 20 is stacked or nested in the second container 30. The flange 25 of the first container 20 may be configured to suspend the upper end of the first container 20 over the open interior chamber 36 of the second container 30 leaving the bottom 22 of the first container 20 a distance $H_A$ above the bottom 32 of the second container 30.

Referring to FIG. 4, when the first container 20 and the second container 30 are in a stacked and nested relationship $10s_2$, the top edge of the first container 20 is proximate the top edge of the second container 30 and the bottom 22 of the first container 20 may be held at a distance ($H_A$) above the bottom 32 of the second container 30. The distance ($H_A$) between the bottom 22 of the first container 20 and the bottom 32 of the second container 30 can be calculated by subtracting the height ($H_1$) of the first container 20 from the height ($H_2$) of the second container 30. In some embodiments, the height ($H_1$) of the first container 20 is about 10% to about 70% of the height ($H_2$) of the second container 30, including about 15%, 20%, 25%, 30%, 35%, 40%, 45%, 50%, 55%, 60%, and 65%. In some embodiments, the distance ($H_A$) between the bottom 22 of the first container 20 and the bottom 32 of the second containers 30 is in a range of about 2 inches (about 51 mm) to about 7 inches (about 178 mm). In addition, when the first container 20 and the second container 30 are assembled together in a stacked and nested relationship $10s_2$, the at least one sidewall 24 of the first container 20 is a sufficient distance away from the at least one sidewall 34 of the second container 30 to allow filtration of an infused butter mixture 60 contained in the first container 20 (e.g., when the plurality of apertures 27, 28, 28', 29, 29' reside in the sidewall 24 of the first container 20). This also allows the liquid 64 to flow through the plurality of apertures 27, 28, 28', 29, 29' of the first container 20 more easily as it separates from the infused butter mixture 60 and collects in the open interior chamber 36 of the second container 30 (see, e.g., FIGS. 6E-6H). In some embodiments, the proximity of the sidewalls 24, 34 can be determined by the difference in the bottom diameters ($D_{1b}$, $D_{2b}$) of the first and second containers 20, 30 (i.e., $D_{2b}$-$D_{1b}$).

FIG. 5 shows a first container 20 in a nested and stacked relationship $10s_3$ with a third container 40 according to some embodiments of the present invention. As shown in FIG. 5, the first container 20 is sized to be slidably received within the open interior chamber 46 of the third container 40. In some embodiments, the sidewall 44 of the third container 40 may have a height ($H_3$) that is less than the height ($H_1$) of the first container 20, but has a height ($H_3$) sufficient to cover all of the apertures 28, 29 in the sidewall 22 of the first container 20 when the bottom 22 of the first container 20 is placed within the open interior chamber 46 of the third container 40 (i.e., when the first container 20 and the third container 40 are in a stacked and nested relationship $10s_3$).

Figure 11:
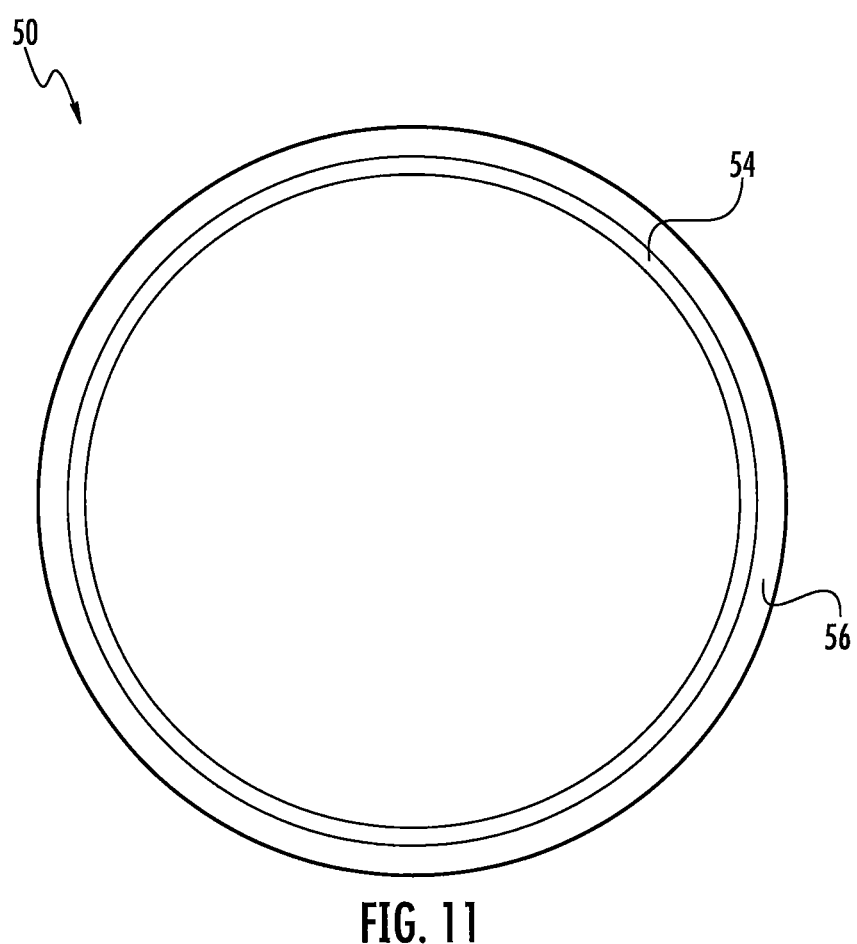
FIG. 11 is an illustrated bottom view of a lid of the system of FIG. 1 according to embodiments of the present invention.

Referring to FIG. 1, FIG. 2A and FIGS. 3-5, a stackable infusion filtration and storage system 10 of the present invention may comprise a lid 50. In some embodiments, the lid 50 may be sized to extend across and cover the open interior chamber 26 of the first container 20. In some embodiments, the lid 50 may have a solid, closed surface (see, e.g., FIG. 5). In some embodiments, the lid 50 may be configured to sealably engage the flange 25 of the first container 20, thereby securing the lid 50 to the first container 20. For example, the lid 50 may comprise an annular space 54 with an outer wall 56 (see, e.g., FIG. 11). The annular space 54 may be configured to receive the flange 25 of the first container 20 to form an airtight or suitable seal. In some embodiments, when the first container 20 is in a stacked and nested relationship $10s_3$ with the third container 40, the top edge of the third container 40 can reside under and adjacent to the lid 50 when the lid 50 is sealably engaged to the first container 20.

The containers 20, 30, 40 of the stackable infusion filtration and storage system 10 may be a variety of geometric shapes and sizes. For example, the containers 20, 30, 40 may all be cylindrical, cubic, polygonal, or frusto-conical in shape. The containers 20, 30, 40 may have varying heights, widths and/or diameters. In some embodiments, the containers 20, 30, 40 are concentric containers when in assembled together in a stacked and nested relationship $10s_1$, $10s_2$, $10s_3$ (see, e.g., FIGS. 3-5). In some embodiments, the containers 20, 30, 40 may have more than one sidewall 24, 34, 44. For example, as discussed above and shown in FIGS. 8A-8C, the containers 20', 30', 40' may each have four sidewalls 24', 34', 44' and have a polygonal shape.

The containers 20, 30, 40 of the stackable infusion filtration and storage system 10 may vary in volumetric capacity. For example, in some embodiments, the first container 20 may have a volume capacity of about 8 ounces to about 16 ounces. In some embodiments, the second container 30 may have a volume capacity of about 20 ounces to about 30 ounces. In some embodiments, the third container 40 may have a volume capacity of about 8 ounces to about 16 ounces.

The containers 20, 30, 40 of the stackable infusion filtration and storage system 10 may be formed of a variety of different materials such as, for example, a polymeric material, glass, ceramic or stainless steel. In some embodiments, the containers 20, 30, 40 may comprise a monolithic, BPA-free polymeric material. In some embodiments, the containers 20, 30, 40 can be visually transmissive.

Referring now to FIGS. 6A-6L, example methods of using the stackable infusion filtration and storage system 10 of the present invention are also provided herein. The methods described herein may use any of the stackable infusion filtration and storage systems 10, 10'', 10''' of the present invention. In some embodiments, the methods may comprise providing a stackable container set comprising a first container 20 and a second container 30 (FIG. 6A). The method may further comprise providing an infused butter (or ghee) mixture 60 that may comprise one or more infusion materials 66 (see, e.g., FIG. 6E and FIG. 6F).

As shown in FIG. 6B and FIG. 6C, the first container 20 may be stacked into the second container 30 which is sized to slidably receive the first container 20 such that the first container 20 is in a stacked and nested relationship $10s_2$ with the second container 30. The flange 25 of the first container 20 is configured to engage (or rest on top of) the flange 35 of the second container 30 (or the top edge portion of the sidewall 34 of the second container 30, if the second container 30 does not have flange 35) (FIG. 6C). When the first container 20 is in a stacked and nested relationship $10s_2$ with the second container 30, the bottom 22 of the first container 20 sits within the open interior chamber 36 of the second container 30 (FIG. 6C). As discussed above, and shown in FIG. 6C, the bottom 22 of the first container 20 is held (or suspended) a distance ($H_A$) above the bottom 32 of the second container 30. Suspending the bottom 22 of the first container 20 above the bottom 32 of the second container 30 can provide space within the open interior chamber 36 of the second container 30 which allows liquid (e.g., water) to collect in the open interior chamber 36 of the second container 30 (FIG. 6G) as it separates from the infused butter mixture 60.

As shown in FIG. 6D, while the first container 20 is in a stacked and nested relationship $10s_2$ and suspended within the open interior chamber 36 of the second container 30, a separation filter 62 (e.g., a cheese cloth, holes in a stainless container, perforated silicone or other type of filter or strainer) can optionally be placed over the top of the first container 20. The infused butter mixture 60 may then be poured into the first container 20 (or into the separation filter 62, if used) (FIG. 6E). If desired, the separation filter 62 can be used to prevent any infusion materials 66 within the infused butter mixture 60 from entering the first container 20 when the infused butter mixture 60 is poured into the first container 20 (FIG. 6F).

As shown in FIGS. 6E-6H, as the infused butter mixture 60 is poured into the first container 20 (and/or after the mixture 60 is poured), liquid 64 (e.g., water) within the infused butter mixture 60 may begin to separate from the infused butter mixture 60. As the liquid 64 separates from the infused butter mixture 60, the liquid 64 flows through the plurality of apertures 28, 29 in the sidewall 24 (and/or bottom 22) of the first container 20 and collects in the open interior chamber 36 of the second container 30. As shown in FIG. 6F, any solid or particulate infusion material 66 can be captured in the separation filter 62 and does not enter the first container 20. FIG. 6G shows the infused butter mixture 60 contained within the first container 20 and the liquid 64 (i.e., water) separated out and contained within the second container 30.

As shown in FIG. 6H, a lid 50 may be optionally placed on top of the first container 20 while the first container 20 is in a stacked and nested relationship $10s_2$ with the second container 30. In some embodiments, the lid 50 may be secured to the first container 20 by aligning the flange 25 of the first container 20 with the annular space 54 of the lid 50 and applying a downwardly force on the lid 50 until the lid 50 snaps or locks in place, thus forming a suitable seal. The stacked and nested containers 20, 30 containing the infused butter mixture 60 may then be refrigerated or otherwise cooled to allow the infused butter mixture 60 to solidify, thereby forming solidified infused butter 70 in the first container 20.

Figure 6I:
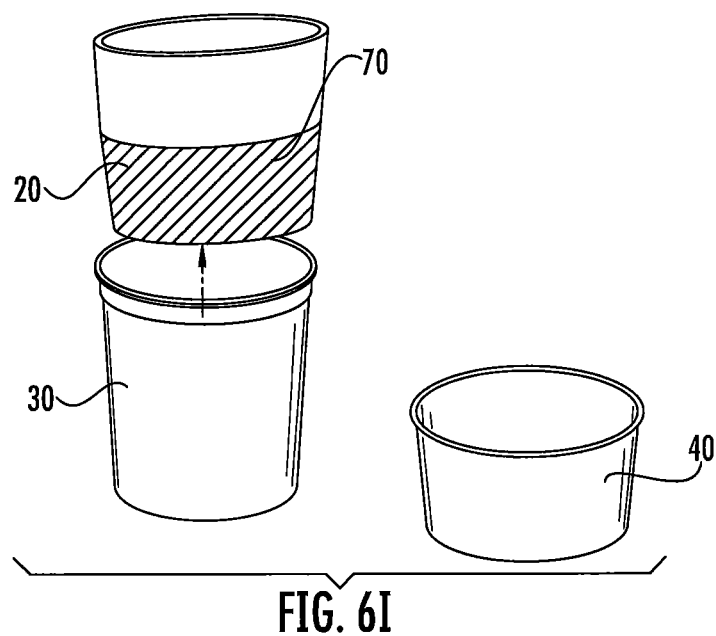
Figure 6J:
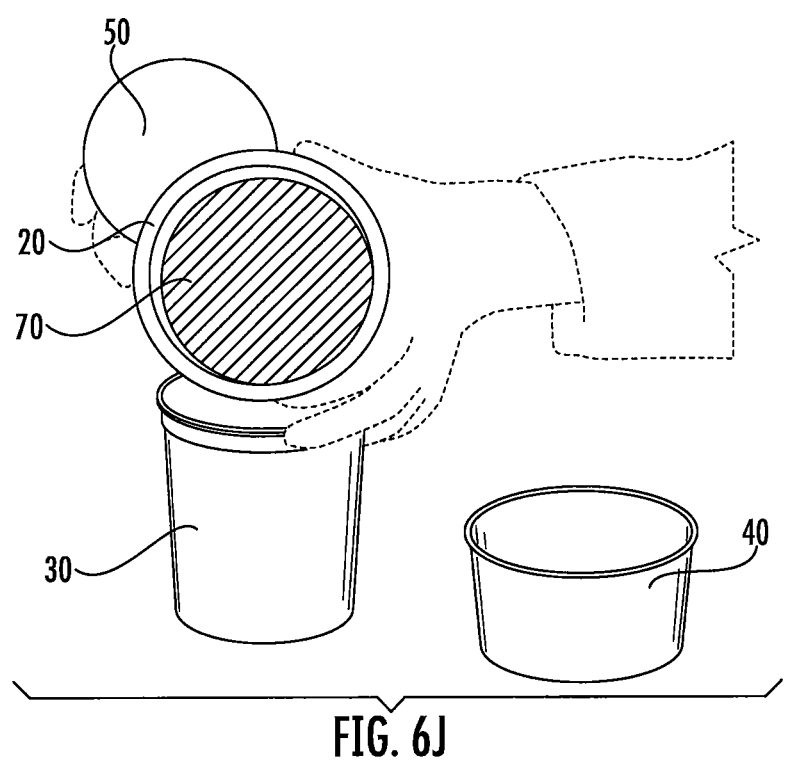
Figure 6K:
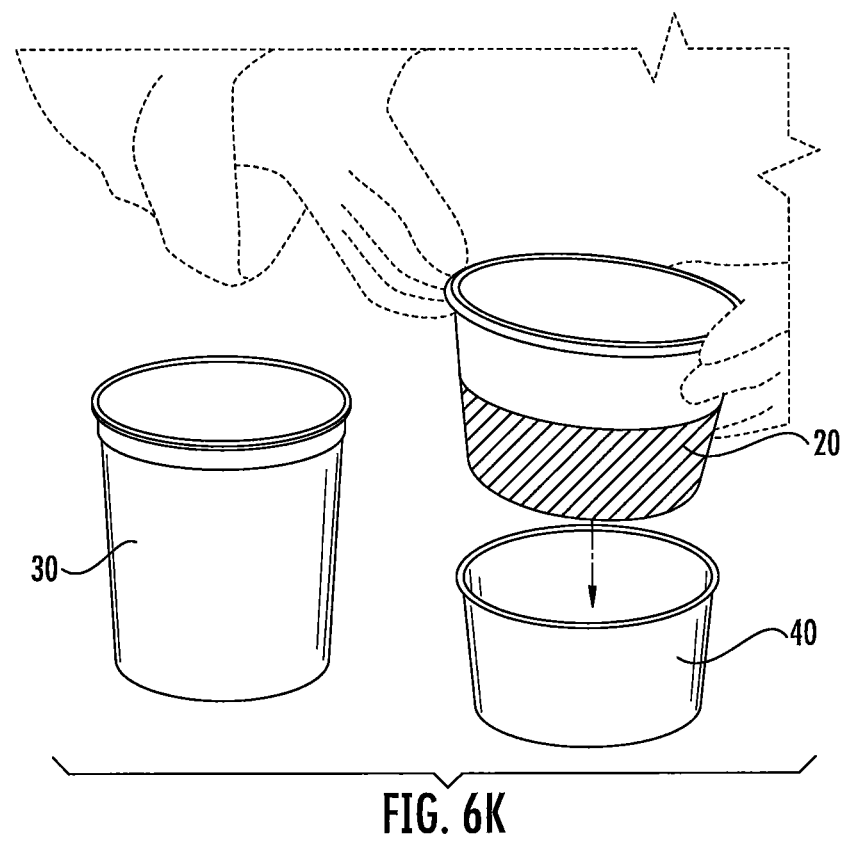
Figure 6L:
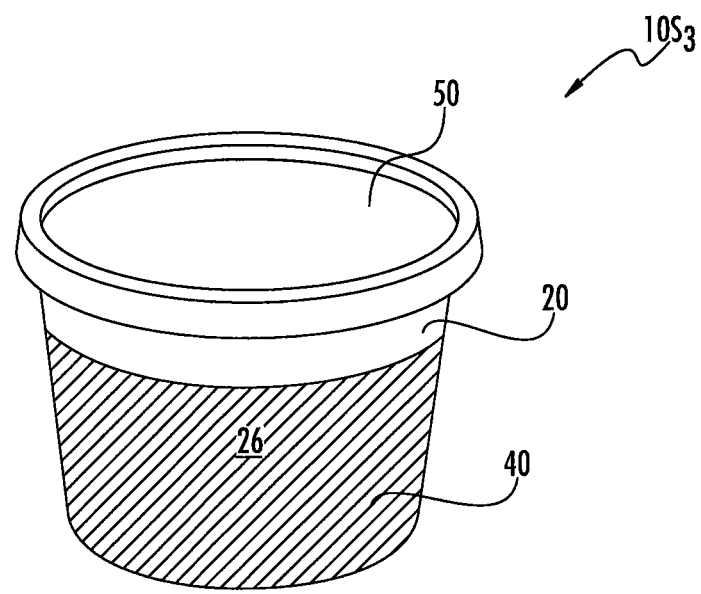

Referring now to FIGS. 6I-6L, after the infused butter mixture 60 has solidified and formed an infused butter 70, the first container 20 with the infused butter 70 can be removed from the second container 30 (FIGS. 6I and 6J). Once removed from the second container 30, the first container 20 may be stacked into the third container 40 (FIG. 6K and FIG. 6L). When assembled together in a stacked and nested relationship $10s_3$, the first container 20 sits within the open cavity 46 of the third container 40. As shown in FIG. 6L, the lid 50 may optionally be placed and secured back on top of the first container 20. The stacked and nested containers 20, 40 with the infused butter 70 can then be stored until use of the infused butter 70. In some embodiments, the lid 50 can remain on the first container 20 as it is removed from the second container 30 and placed into the third container 40 (not shown).

Figure 7B:
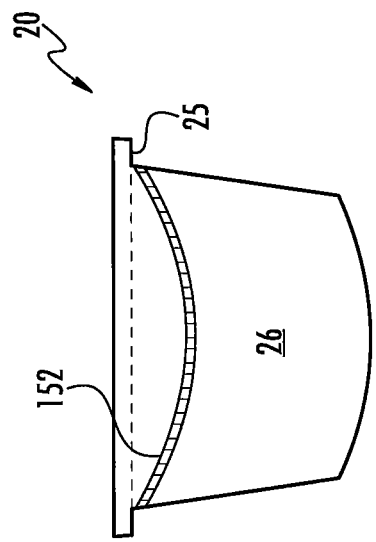
FIG. 7B is an illustrated front view of the first container of FIG. 2A having an alternative cooperating mesh screen according to some embodiments of the present invention.
Figure 7A:
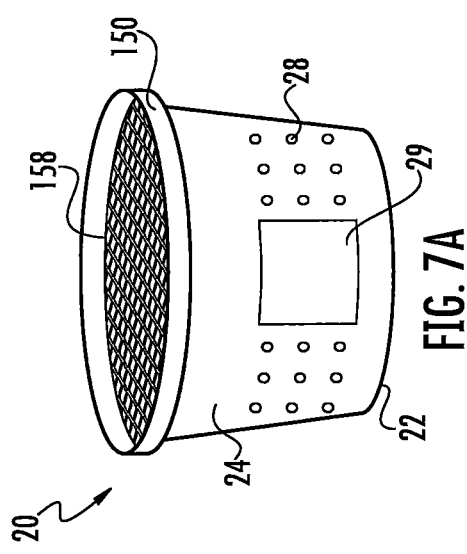
FIG. 7A is an illustrated front view of the first container of FIG. 2A having a cooperating mesh screen according to some embodiments of the present invention.

As shown in FIG. 7A, in some embodiments, a filter 150 with a plurality of apertures 158 can be provided. In some embodiments, the filter 150 may be rigid or semi-rigid. As shown in FIG. 7B, in some embodiments, the filter 150 can be a flexible or semi-rigid filter, such as comprising a mesh screen 152 may be used to capture solid infusion materials 66 within the infused butter mixture 60 to separate that material 66 and stop the material 66 from entering the first container 20 when the infused butter mixture is poured into the first container 20. In some embodiments, the filter 150 can be sized to be interchangeably held by the first container 20 in lieu of the lid 50. The filter 150 may be used in place of the cheese cloth 62 (or other strainer).

Referring now to FIGS. 13A-18E, another example stackable infusion filtration and storage system 10" according to embodiments of the present invention is illustrated. Properties and/or features of the system 10", such as, for example, height:diameter ratios, shapes/sizes of apertures, taper angles, volumetric capacity, and other dimensions, may be as described above in reference to corresponding containers in FIGS. 1-12E and duplicate discussion thereof may be omitted herein for the purposes of discussing FIGS. 13A-18E.

As shown in FIGS. 13A-13E, a stackable infusion filtration and storage system ("stackable container system," "stackable system," or "system") 10" of the present invention may comprise a first container assembly (or nested, stacked set of containers) $10s_2'$. The first container assembly $10s_2'$ of the stackable system 10" may comprise a plurality of stackable containers 20", 30". For example, in some embodiments, the first container assembly $10s_2'$ may comprise a first container 20" and a second container 30".

Figure 13A:
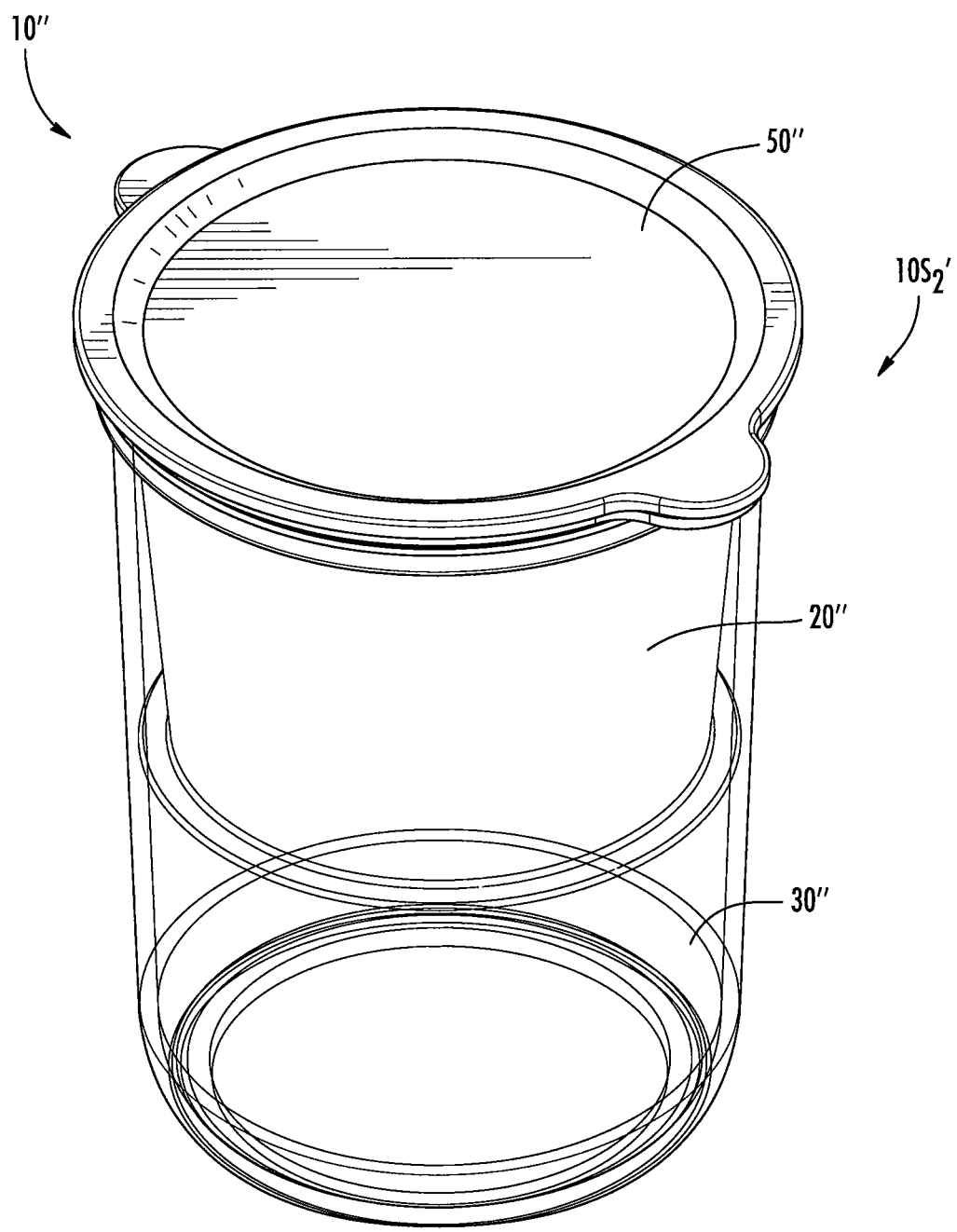
FIG. 13A is a perspective view of an example first container assembly of a stackable infusion filtration and storage system according to embodiments of the present invention.
Figure 13B:
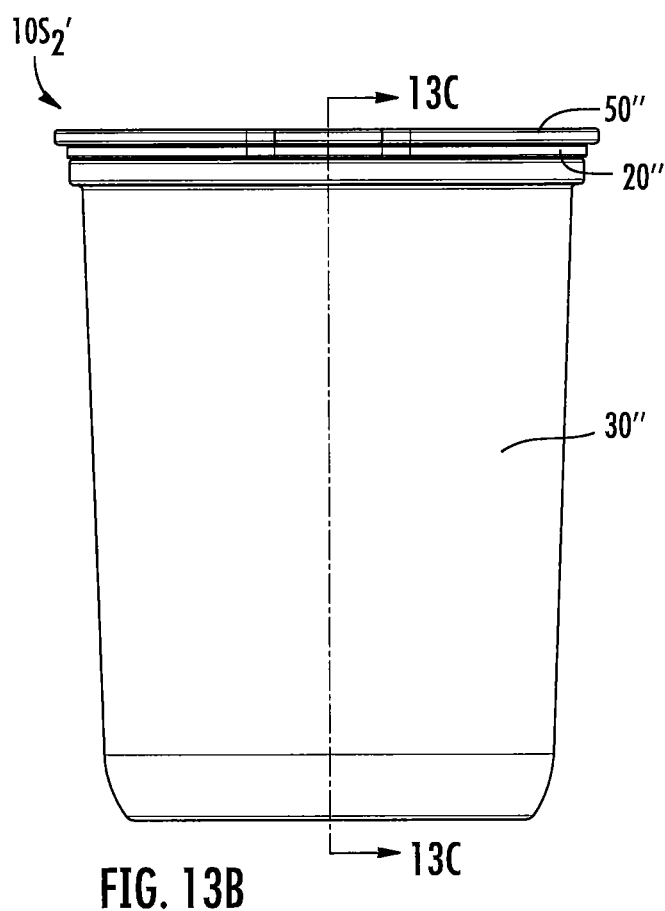
FIG. 13B is a side view of the first container assembly of FIG. 13A.
Figure 13C:
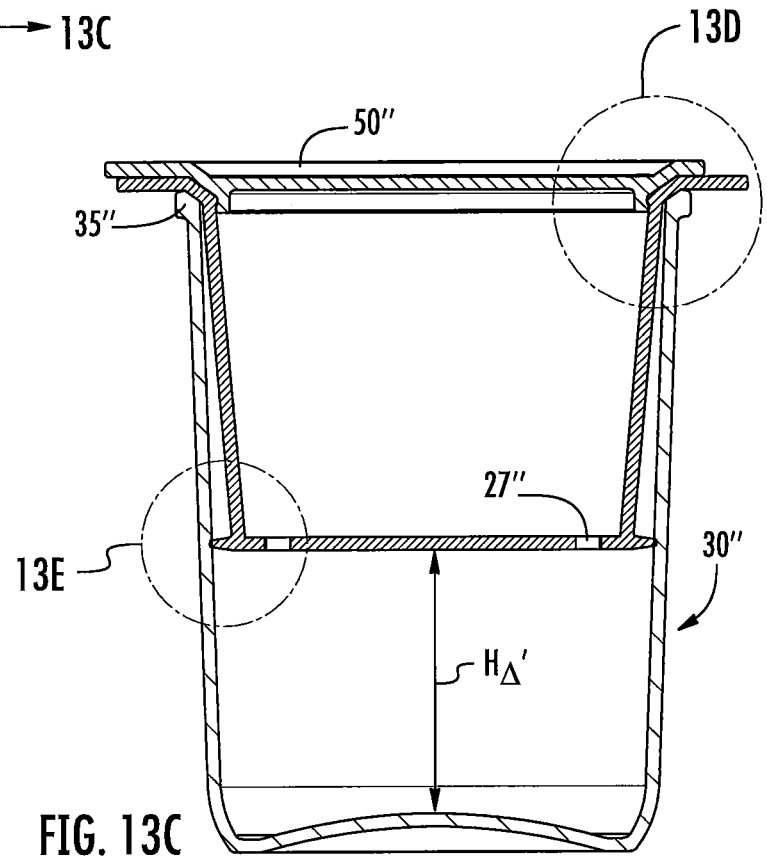
FIG. 13C is a cross-sectional view of the first container assembly of FIG. 13A taken on line 13C-13C in FIG. 13B.
Figure 13D:
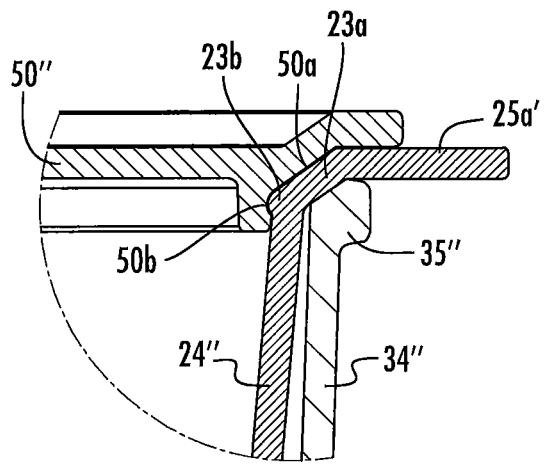
FIG. 13D is an enlarged view of the components of the first container assembly within circle 13D in FIG. 13C.
Figure 13E:
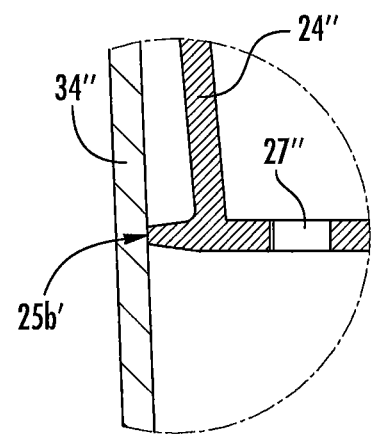
FIG. 13E is an enlarged view of the components of the first container assembly within circle 13E in FIG. 13C.

The second container 30" may be configured to slidably receive and hold the first container 20" (FIGS. 13A and 13C). As shown in FIG. 13C, and previously discussed above, a bottom 22" of the first container 20" may be held a distance ($H_A'$) above a bottom 32" of the second container 30". In some embodiments, as shown in FIGS. 13C and 13E, the first container 20" may comprise apertures 27" (see also, e.g., FIG. 15B). In some embodiments, the apertures 27" may be located in the bottom 22" of the first container 20" (see also, e.g., FIG. 15B).

According to some embodiments, the first container assembly $10s_2'$ of the stackable system 10" may further comprise a lid 50". As shown in FIGS. 13C and 13D, and discussed in further detail below, the lid 50" may be configured to releasably engage the first container 20" to seal the first container assembly $10s_2'$.

Figure 14A:
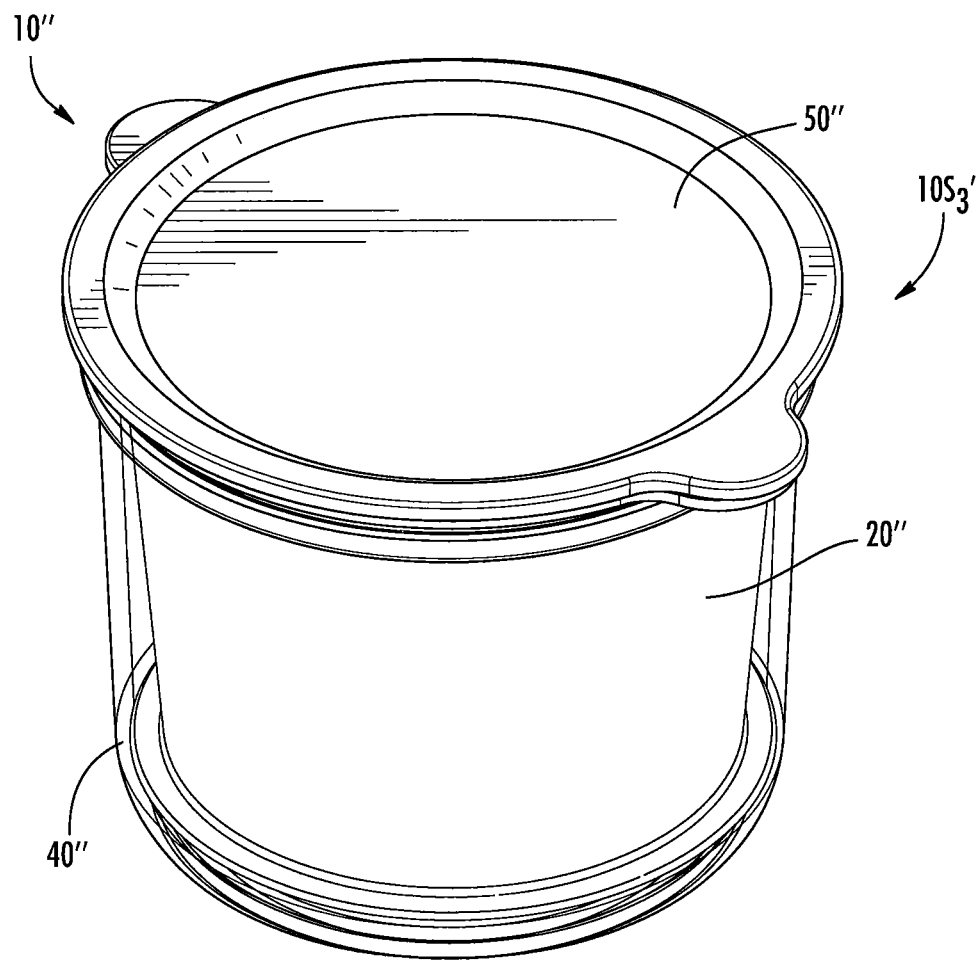
FIG. 14A is a perspective view of an example second container assembly of a stackable infusion filtration and storage system according to embodiments of the present invention.
Figure 14B:
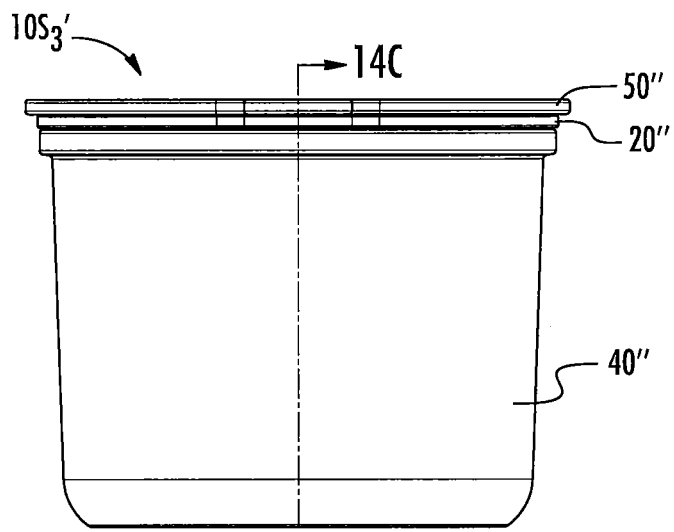
FIG. 14B is a side view of the second container assembly of FIG. 14A.
Figure 14C:
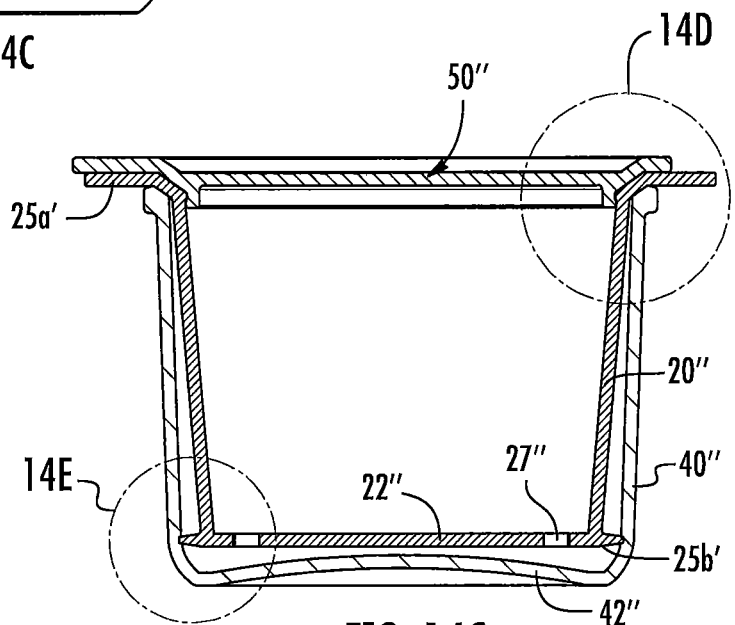
FIG. 14C is a cross-sectional view of the second container assembly of FIG. 14A taken on line 14C-14C in FIG. 14B.
Figure 14D:
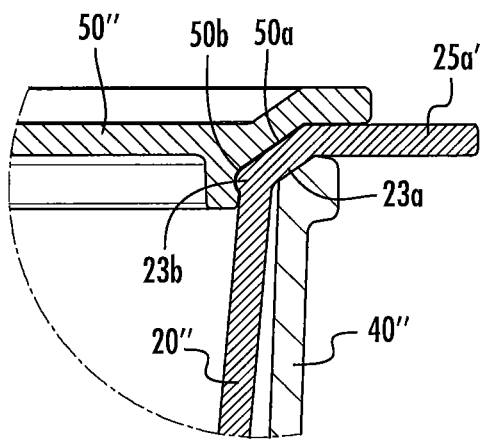
FIG. 14D is an enlarged view of the components of the second container assembly within circle 4D in FIG. 14C.

Referring to FIGS. 14A-14E, in some embodiments, the stackable infusion filtration and storage system 10" of the present invention may further comprise a second container assembly (or nested, stacked set of containers) $10s_3'$. The second container assembly $10s_3'$ of the stackable system 10" may comprise a plurality of stackable containers 20", 40". For example, in some embodiments the second container assembly $10s_3'$ may comprise the first container 20" and a third container 40" (and not the second container 30"). The third container 40" may be configured to slidably receive and hold the first container 20". As shown in FIGS. 14C and 14D, according to some embodiments, the lid 50" may also be used to seal the second container assembly $10s_3'$ (e.g., when the lid 50" is configured to releasably engage the first container 20").

Figure 15A:
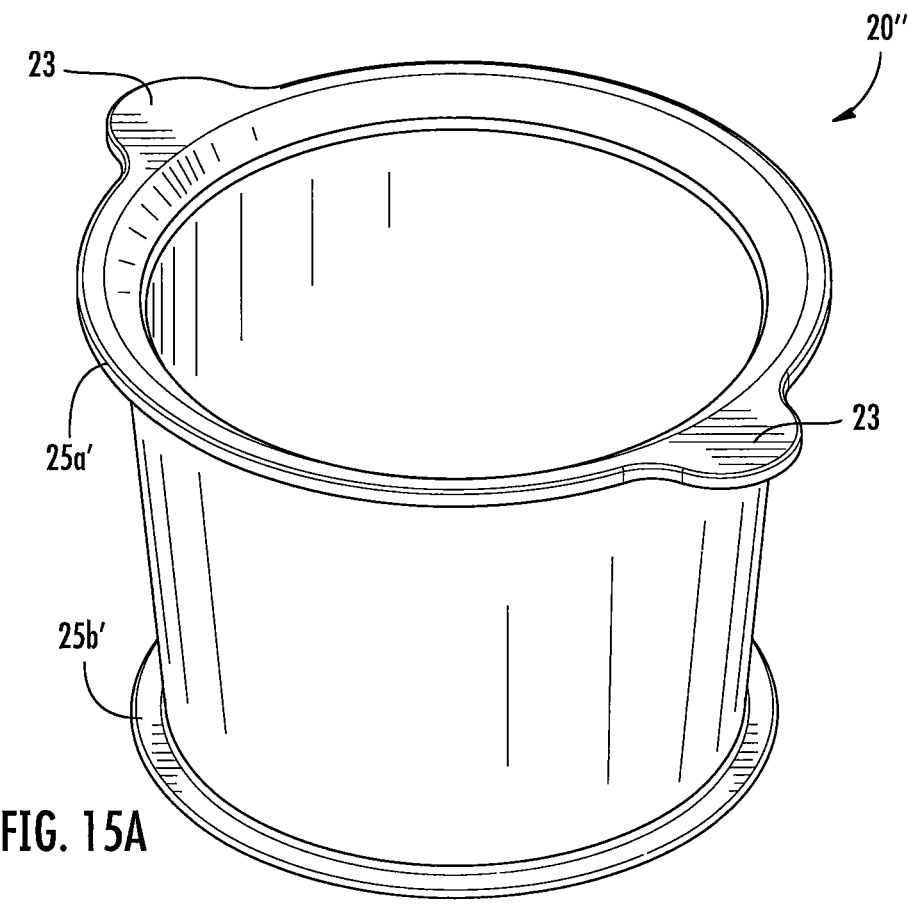
FIG. 15A is a perspective view of a first container of the stackable container system shown in FIGS. 13A and 14A.
Figure 15B:
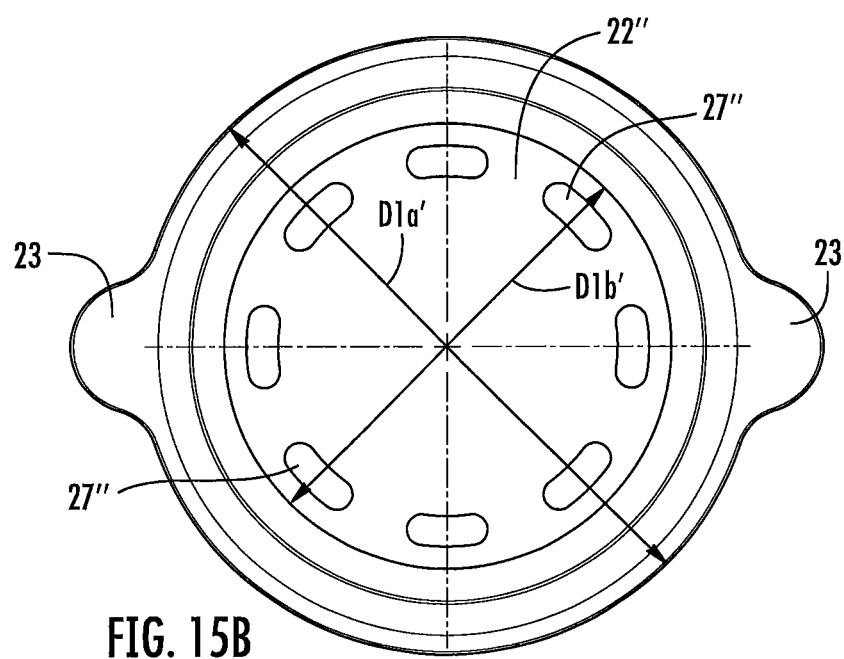
FIG. 15B is a top view of the first container of FIG. 15A.

Referring now to FIGS. 15A-15D, the first container 20" of the stackable infusion filtration and storage system 10" is illustrated. The first container 20" of the stackable system 10" may be a semi-rigid or rigid container. In some embodiments, the first container 20" may be formed of a polymeric material, for example, silicone. In some embodiments, the first container 20" may comprise a bottom 22", at least one sidewall 24", and an open interior chamber 26". The at least one sidewall 24" of the first container 20" extends upwardly from the bottom portion 22" of the first container 20". The bottom 22" of the first container 20" may comprise a plurality of spaced apart through apertures 27". For example, as shown in FIG. 15B, in some embodiments, the plurality of apertures 27" may reside circumferentially spaced apart around an outer periphery of the bottom 22" of the first container 20". In some embodiments, the plurality of apertures 27" may be elongate apertures (FIG. 15B). As discussed above, the shapes, sizes, and/or patterns of the apertures 27" may be chosen based on the flow properties (e.g., based on the viscosity) of the infused butter mixture 60. The shapes and locations of the apertures 27" may be chosen to achieve a targeted viscosity for the infused butter mixture 60.

Figure 15C:
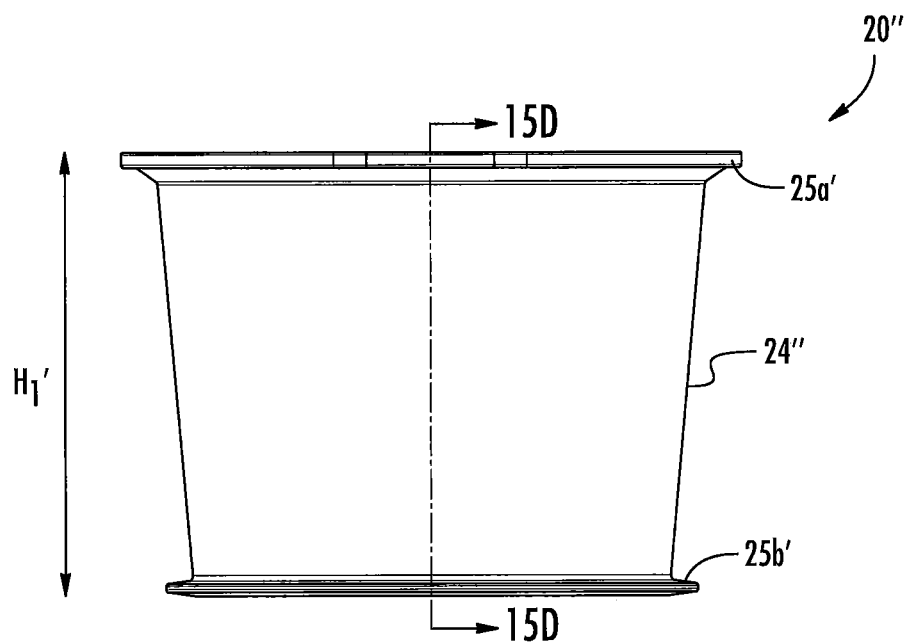
FIG. 15C is a side view of the first container of FIG. 15A.
Figure 15D:
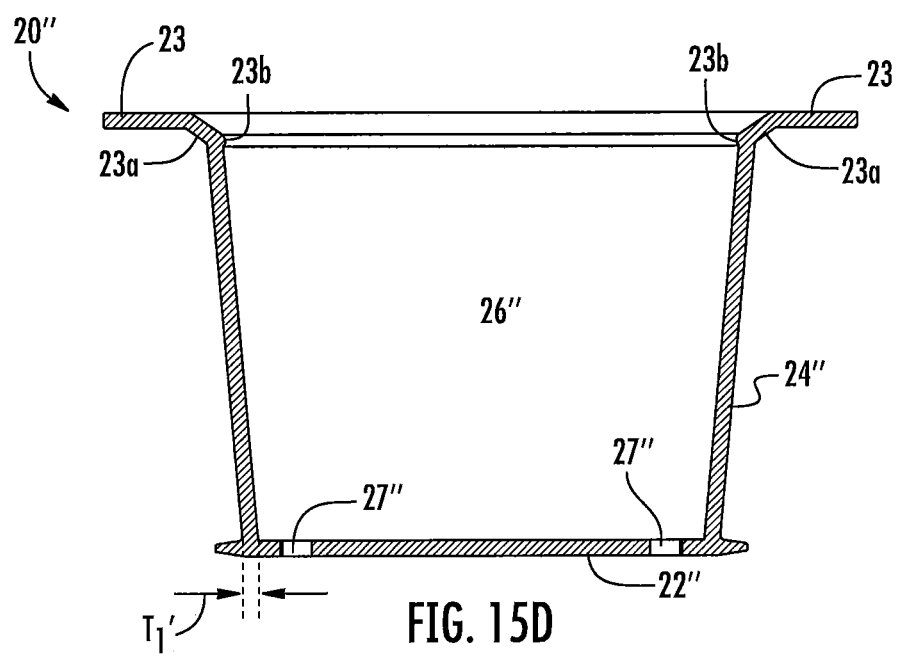
FIG. 15D is a cross-sectional view of the first container of FIG. 15A taken on line 15D-15D in FIG. 15C.

Referring to FIGS. 15B-15D, the sidewall 24" of the first container 20" has a height ($H_1$'), a diameter ($D_1$'), and a thickness ($T_1$'). In some embodiments, the sidewall 24" of the first container 20" may have a height ($H_1$') in a range of about 75 mm to about 90 mm. In some embodiments, the sidewall 24" of the first container 20" may have a thickness ($T_1$') in a range of about 2 mm to about 4 mm (on average). In some embodiments, the first container 20" may have a diameter ($D_1$') in the range of about 100 mm to 150 mm. In some embodiments, the first container 20" may have a top diameter ($D_{1a}$') and a bottom diameter ($D_{1b}$') (FIG. 15B). In some embodiments, the bottom diameter ($D_{1b}$') of the first container 20" is about equal to or less than the top diameter ($D_{1a}$') of the first container 20" such as, for example, when the first container 20" is tapered to a smaller bottom relative to the top.

Referring to FIGS. 15A and 15C, in some embodiments, the sidewall 24" of the first container 20" may comprise an upper annular flange (or rim) 25a' along a top edge portion of the sidewall 24". The upper flange 25a' may extend outwardly from the top edge portion of the sidewall 24" a sufficient length to engage a top portion of the second container 30" when the first container 20" is assembled together in a stacked and nested relationship $10s_2$' with the second container 30" (i.e., the first container 20" is held or suspended a distance ($H_A$') above the bottom 32" of the second container 30") (see also, e.g., FIGS. 13A and 13C).

Figure 14E:
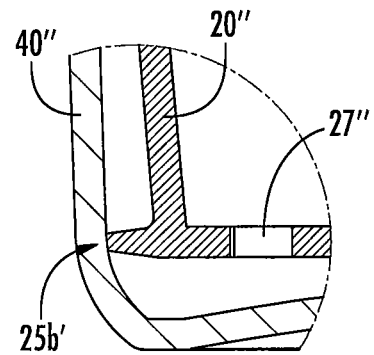
FIG. 14E is an enlarged view of the components of the second container assembly within circle 4E in FIG. 14C.

In some embodiments, the sidewall 24" of the first container 20" may further comprise a lower annular flange (or rim) 25b' along a bottom edge portion of the sidewall 24". The lower flange 25b' may extend outwardly from the bottom edge portion of the sidewall 24" a sufficient distance to make contact with an interior surface of the sidewall 34" of the second container 30" (see, e.g., FIGS. 13A, 13C, and 13E). In some embodiments, the lower flange 25b' may help to hold the first container 20" within the interior chamber 36" of the second container 30" (FIGS. 13C and 13E) or within the interior chamber 46" of the third container 40" (FIGS. 14C and 14E). For example, the lower flange 25b' may help to prevent the first container 20" from moving or swaying within the interior chambers 36", 46" of the second or third containers 30", 40". The lower flange 25b' also helps to prevent the at least one sidewall 24" of the first container 20" from making contact with the second container 30". This allows the liquid 64 to flow through the plurality of apertures 27" of the first container 20" more easily as it separates from the infused butter mixture 60 and collects in the open interior chamber 36" of the second container 30" (see, e.g., FIGS. 6E-6H). In addition, in some embodiments, the lower flange 25b' may also create a seal between the first container 20" and the second or third container 30", 40" when assembled together (i.e., in a stacked and nested relationship $10s_2$', $10s_3$'). In some embodiments, the proximity of the sidewalls 24", 34" is equal to the length of the lower annular flange 25b'.

As shown in FIG. 15D, in some embodiments, the sidewall 24" of the first container 20" may further comprise an annular shoulder 23a. In some embodiments, the shoulder 23a may be tapered. The annular shoulder 23a may be configured to support the first container 20" when the first container 20" is in a stacked and nested relationship $10s_2$' with the second container 30" (see also, e.g., FIG. 14D). For example, in some embodiments, when the first container 20" is placed (slid) within the second container 30", the annular shoulder 23a (and upper flange 25a') of the first container 20" may be stopped by an upper flange (or rim) 35" of the second container 30", thereby preventing the first container 20" from sliding entirely into the second container 30" and at the same time holding the first container 20" within the open interior 36" of the second container 30" (i.e., being held a distance $H_A$' above the bottom 32" of the second container 30") (see, e.g., FIGS. 13A, 13C, and 13D).

Figure 18A:
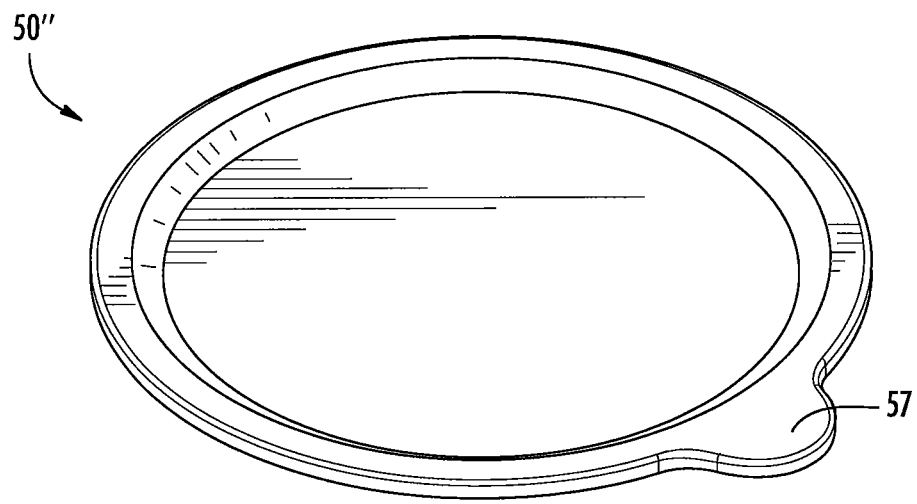
FIG. 18A is a perspective view of a lid of the system shown in FIG. 13A and FIG. 14A.
Figure 18B:
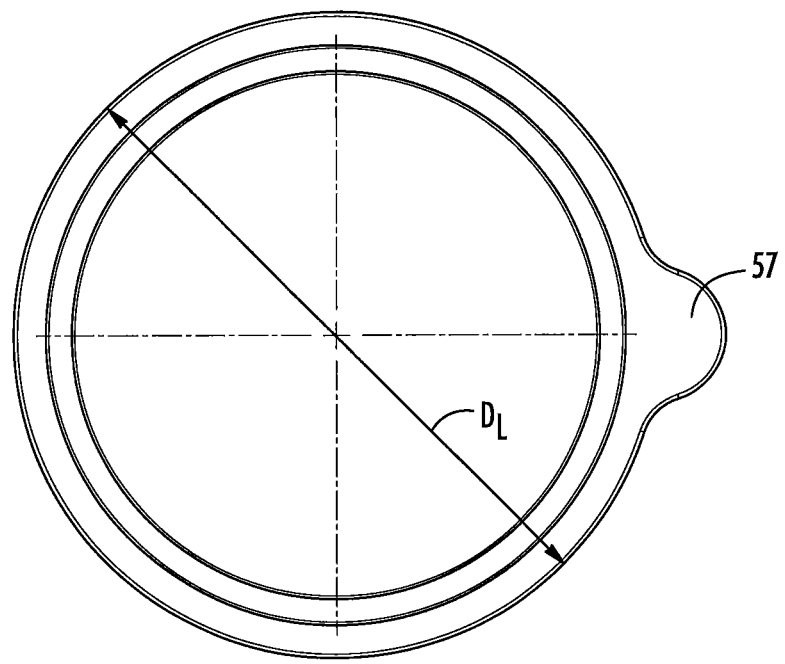
FIG. 18B is a top view of the lid of FIG. 18A.
Figure 18C:
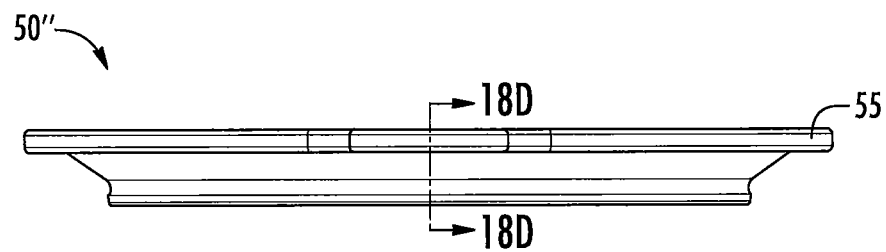
FIG. 18C is a side view of the lid of FIG. 18A.
Figure 18D:
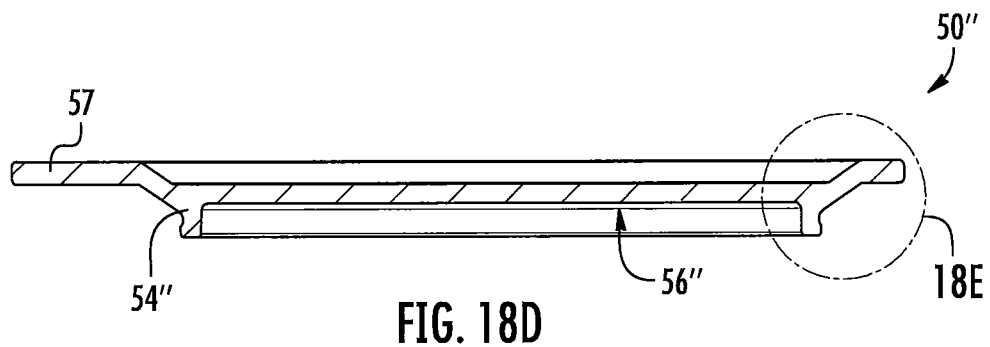
FIG. 18D is a cross-sectional view of the lid of FIG. 18A taken on line 18D-18D in FIG. 18C.
Figure 18E:
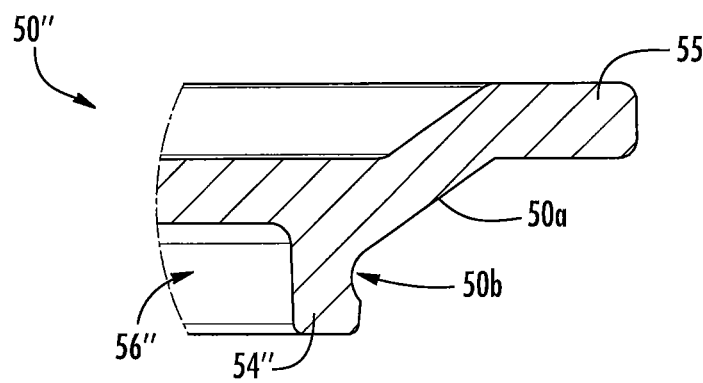
FIG. 18E is an enlarged view of components of the lid of FIG. 18A within circle 18E in FIG. 18D.

In some embodiments, the tapered annular shoulder 23a may cooperate with a tapered edge 50a of the lid 50" to seal the first container assembly $10s_2$' (see, e.g., FIG. 14D and FIG. 18E). In some embodiments, the first container 20" may be configured to releasably receive and engage the lid 50" to seal the first container assembly $10s_2$'.

In some embodiments, the sidewall 24" of the first container 20" may comprise a protruding portion 23b (FIG. 15D). The protruding portion 23b may be sized and configured to engage a recess (or indention) 50b in an outer wall 54" of the lid 50" (see also, e.g., FIG. 13D, FIG. 14D, and FIG. 18E). In some embodiments, the lid 50" may be configured to be press-fit onto the first or second container assembly $10s_2$', $10s_3$'. As shown in FIG. 13D and FIG. 14D, in some embodiments, the lid 50" may be secured to the first container 20" by aligning the tapered edge 50a of the lid 50" with the tapered shoulder 23a of the first container 20" and applying a downwardly force on the lid 50" until the lid 50" snaps or locks in place, thus forming a suitable seal. For example, in some embodiments, the lid 50" may be pressed onto the first container assembly $10s_2$' (or the second container assembly $10s_3$') until the protruding portion 23b on the sidewall 24" of the first container 20" engages with (or is received by) the recess 50b in the outer wall 54" of the lid 50", thereby securing the lid 50" and sealing the first or second container assembly $10s_2$', $10s_3$').

In some embodiments, the upper flange 25a' of the first container 20" may further comprise one or more tabs 23. The one or more tabs 23 provides a location that allows a user to easily grip and remove the first container 20" from the stackable system 10".

Figure 16A:
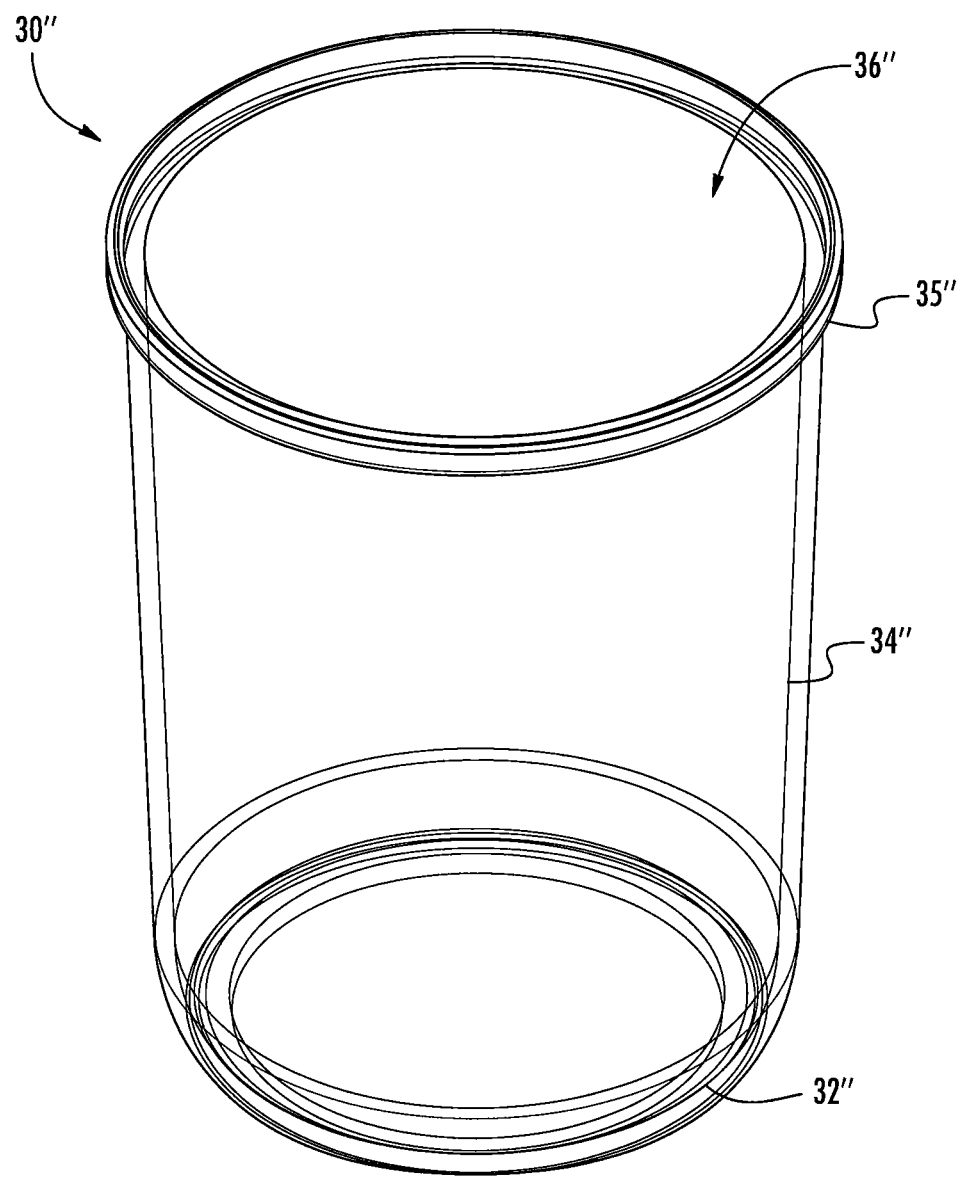
FIG. 16A is a perspective view of a second container of the system shown in FIGS. 13A and 14A.
Figure 16B:
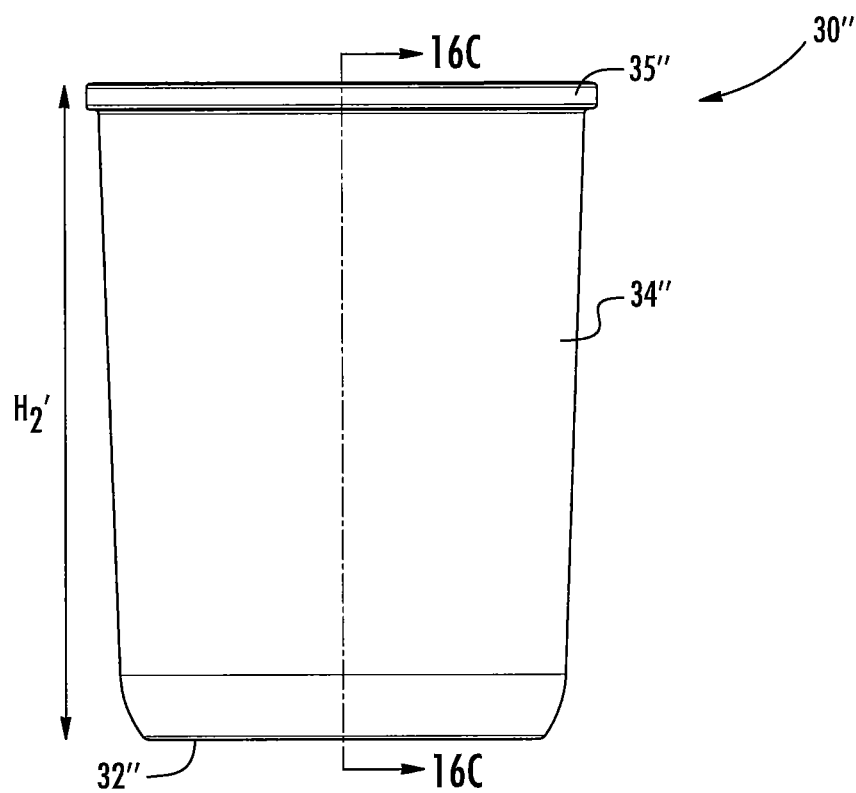
FIG. 16B is a side view of the second container of FIG. 16A.
Figure 16C:
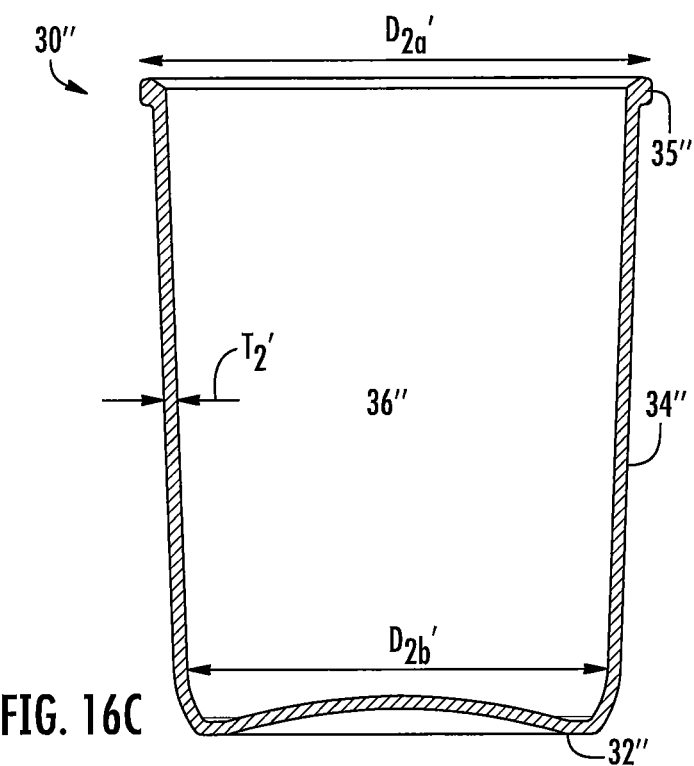
FIG. 16C is a cross-sectional view of the second container of FIG. 16A taken on line 16C-16C in FIG. 16B.

The second container 30" of the stackable infusion filtration and storage system 10" is illustrated in FIGS. 16A-16C. The second container 30" of the stackable system 10" may be semi-rigid or rigid. In some embodiments, the second container 30" may be formed from glass. In some embodiments, the second container 30" may comprise a closed bottom 32" and at least one sidewall 34". Together, the bottom 32" and the at least one sidewall 34" of the second container 30" form an interior chamber 36" with a closed bottom 32". The at least one sidewall 34" of the second container 30" extends upwardly from the closed bottom 32". In some embodiment, the sidewall 34" of the first container 30" may comprise an upper flange (or rim) 35" along a top edge portion of the sidewall 34".

Referring to FIGS. 16B and 16C, the sidewall 34" of the second container 30" has a height ($H_2'$) and a thickness ($T_2'$). The second container 30" is sized to receive the first container 20". In some embodiments, the sidewall 34" of the second container 30" may have a height ($H_2'$) in a range of about 150 mm to about 160 mm. In some embodiments, the sidewall 34" of the second container 30" may have a thickness ($T_2'$) in a range of about 2.5 mm to about 3.5 mm. In some embodiments, the second container 30" may have a top diameter ($D_{2a}'$) and a bottom diameter ($D_{2b}'$) (FIG. 16C).

Figure 17A:
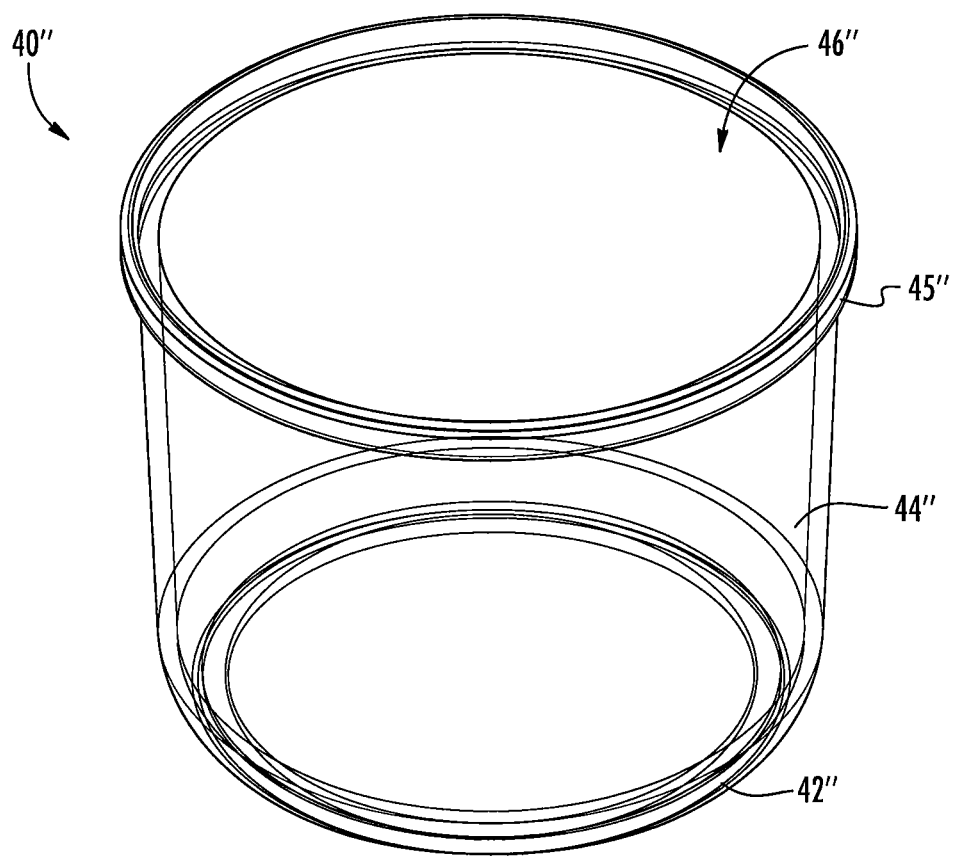
FIG. 17A is a perspective view of a third container of the system shown in FIG. 13A and FIG. 14A.
Figure 17B:
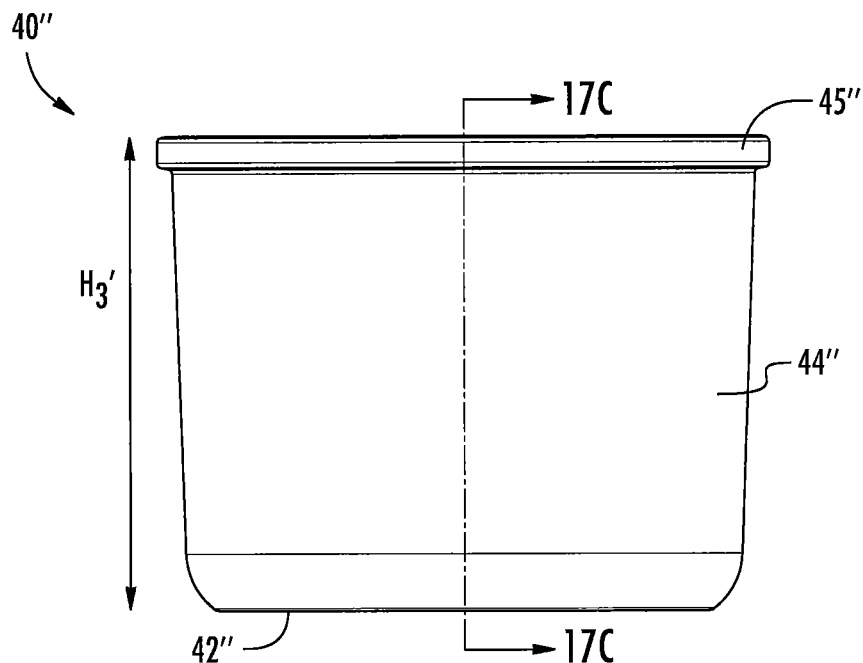
FIG. 17B is a side view of the third container of FIG. 17A.
Figure 17C:
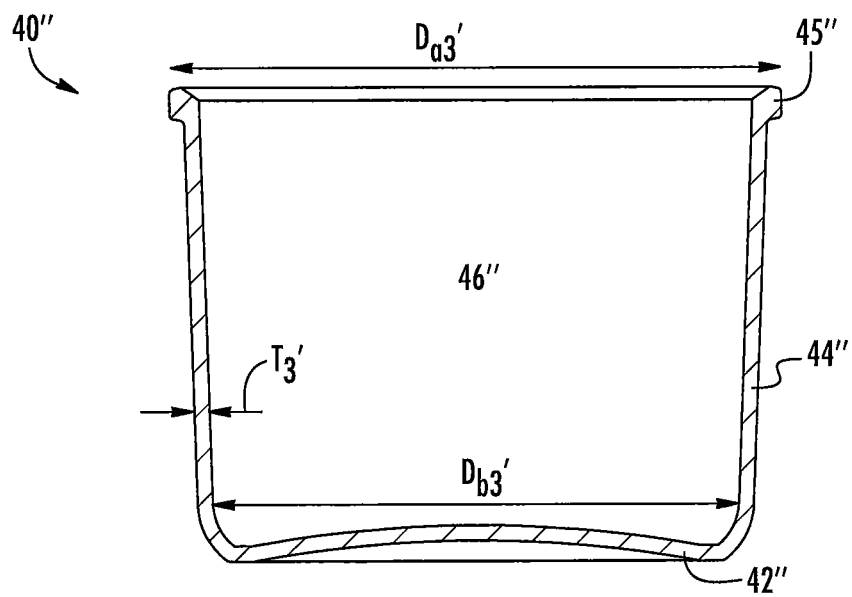
FIG. 17C is a cross-sectional view of the third container of FIG. 17A taken on line 17C-17C in FIG. 17B.

Referring now to FIGS. 17A-17C, the third container 40" of the second container assembly $10s_3'$ of the stackable infusion filtration and storage system 10" of the present invention is illustrated. The third container 40" may be a semi-rigid or rigid container that is sized to slidably receive the first container 20" (see also, e.g., FIGS. 14A-14E).

As shown in FIGS. 17A-17C, in some embodiments, the third container 40" may comprise a closed bottom 42" and at least one sidewall 44". The sidewall 44" of the third container 40" extends upwardly from the bottom 42". Together, the bottom 42" and the at least one sidewall 44" of the third container 40" may form an enclosed interior open chamber 46". The sidewall 44" of the third container 40" has a height ($H_3'$) and a thickness ($T_3'$). In some embodiments, the sidewall 44" of the third container 40" may have a height ($H_3'$) in the range of about 85 mm to about 100 mm. In some embodiments, the sidewall 44" of the third container 40" may have a thickness ($T_3'$) in a range of about 1.5 mm to about 5 mm (on average). In some embodiments, the third container 40" may have a top diameter ($D_{3a}'$) and a bottom diameter ($D_{3b}'$) (FIG. 17C).

The interior chamber 46" of the third container 40" may be used to slidably receive and hold/store the first container 20" with an infused butter 70 (see also, e.g., FIG. 6L). For example, in some embodiments, the first container 20'" may be slidably received into the third container 40" such that the first container 20" fits within the interior chamber 46'" of the third container 40" apart from the second container 30" (see, e.g., FIG. 14A). This stacked and nested relationship of containers 20", 40" (i.e., the secondary container assembly $10s_3'$) may be used, such as, for example, during storage of an infused butter 70 (see, e.g., FIG. 6L).

Referring now to FIGS. 18A-18E, the lid 50" of the first and second container assemblies $10s_2'$, $10s_3'$ of a stackable infusion filtration and storage system 10" of the present invention is illustrated. The lid 50" may be semi-rigid or rigid. In some embodiments, the lid 50" may be formed of a polymeric material, for example, silicone. The lid 50" may be sized to extend across and cover the open interior chamber 26" of the first container 20". The lid 50" is configured to sealably and releasably engage the first container 20" (e.g., FIG. 13D and FIG. 14D) of the stackable container system 10". In some embodiments, the lid 50" may have a diameter ($D_L$) in the range of about 100 mm to about 150 mm.

As shown in FIGS. 18C-18E, in some embodiments, the lid 50" may comprise an outer wall 54', interior cavity 56', and an annular flange (or rim) 55. In other embodiments, the lid 50" may be solid (i.e., no interior cavity 56'). In some embodiments, the lid 50" may further comprise a tapered edge 50a. As discussed above, in some embodiments, the tapered edge 50a may be sized and configured to cooperate with a tapered annular shoulder 23a of the first container 20" to seal the first or second container assembly $10s_2'$, $10s_3'$. In some embodiments, the lid 50" may further comprise one or more tabs 57. The one or more tabs 57 provide a location that allows a user to easily grip and remove the lid 50" from the stackable system 10".

Referring now to FIGS. 19A-28D, another example stackable infusion filtration and storage system 10'" according to embodiments of the present invention is illustrated. Properties and/or features of the stackable system 10'", such as, for example, height:diameter ratios, shapes/sizes of apertures, taper angles, volumetric capacity, and other dimensions, may be as described above in reference to corresponding containers in FIGS. 1-18E and duplicate discussion thereof may be omitted herein for the purposes of discussing FIGS. 19A-28D.

Figure 19A:
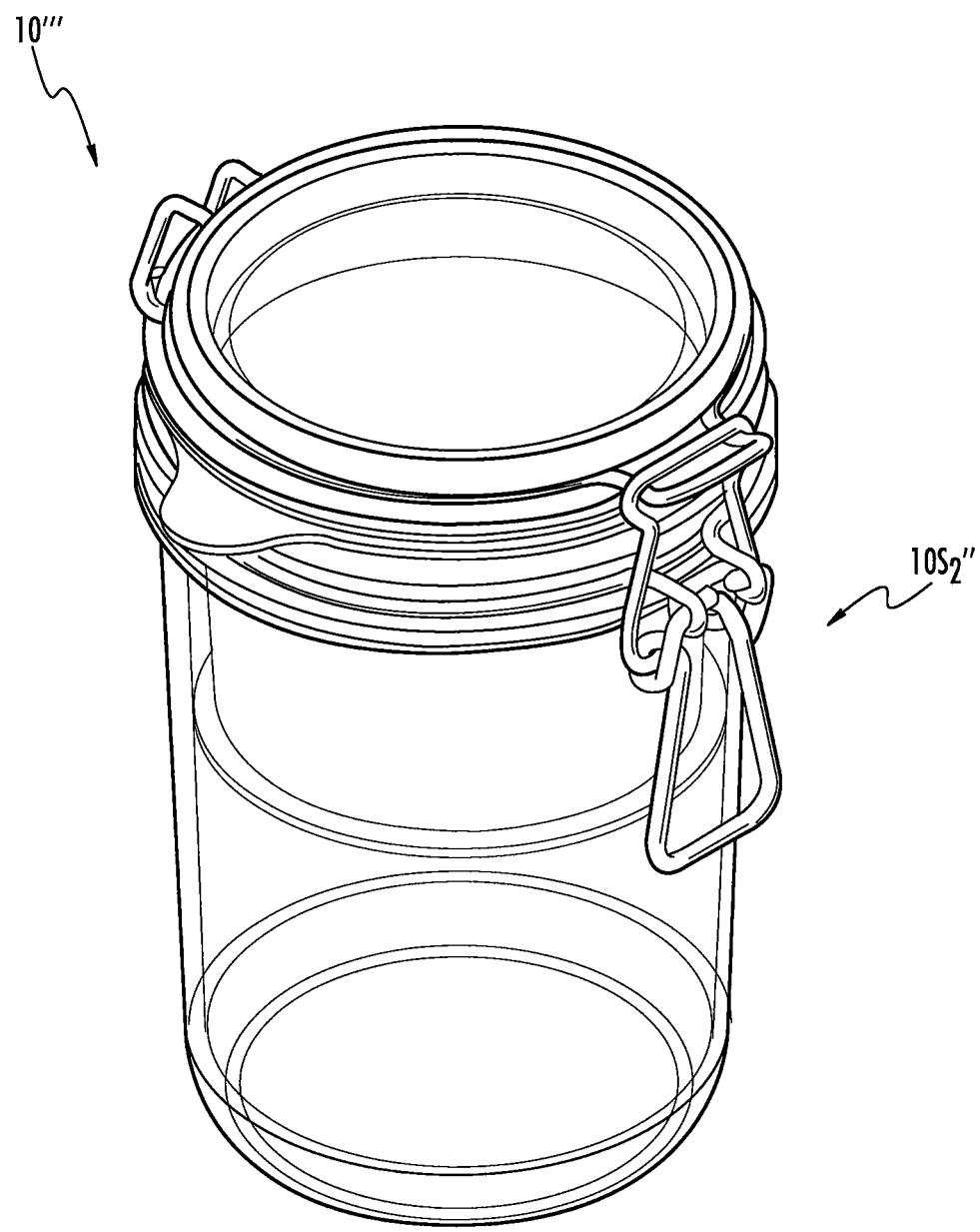
FIG. 19A is a perspective view of an example first container assembly of a stackable infusion filtration and storage system according to embodiments of the present invention.
Figures 19B, 19C:
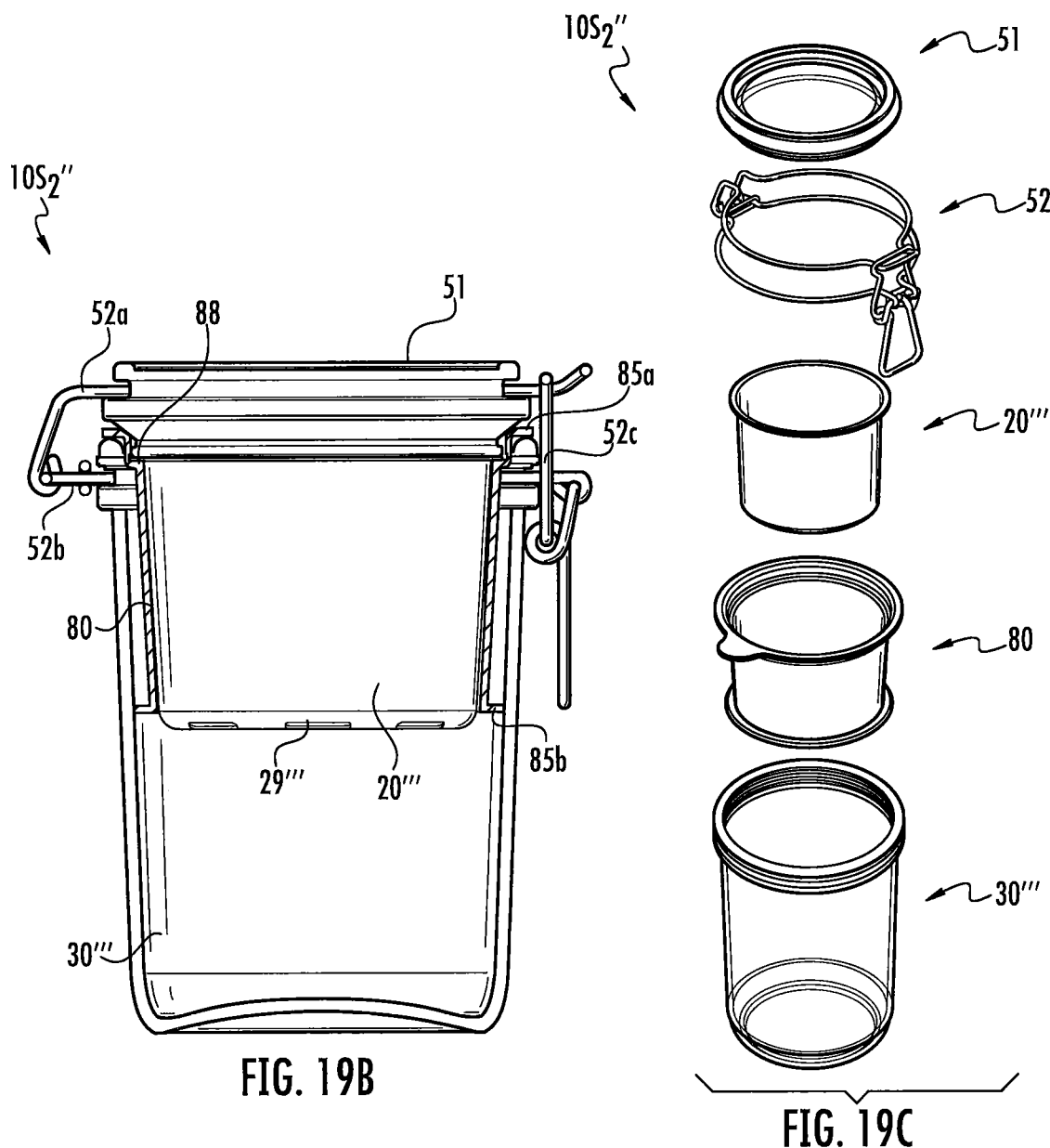
FIG. 19B is a side view of the first container assembly of FIG. 19A.
FIG. 19C is an exploded view of the first container assembly of FIG. 19A.

As shown in FIGS. 19A-19C, a stackable infusion filtration and storage system ("stackable container system," "stackable system," or "system") 10'" of the present invention may comprise a first container assembly (or nested, stacked set of containers) $10s_2''$ (see also, e.g., FIGS. 26A-26G). The first container assembly $10s_2''$ of the stackable system 10'" may comprise a plurality of stackable containers 20'", 30'". For example, in some embodiments, the first container assembly $10s_2''$ may comprise a first container 20'" and a second container 30'". In some embodiments, the first container 20'" may comprise apertures 29". In some embodiments, the first container assembly $10s_2''$ may further comprise a sleeve 80. The sleeve 80 may be configured to slidably receive and hold the first container 20". In some embodiments, the first container 20'" and the sleeve 80 of the stackable container system 10'" may be concurrently stackable with the second container 30'".

According to some embodiments, the first container assembly $10s_2''$ of the stackable system 10' may further comprise a first lid 51 (see, e.g., FIGS. 19A-19C). In some embodiments, the first lid 51 may be configured to sealably and releasably engage the second container 30'". In some embodiments, the first lid 51 may be secured to the second container 30'" by a clasping mechanism 52.

Figure 20A:
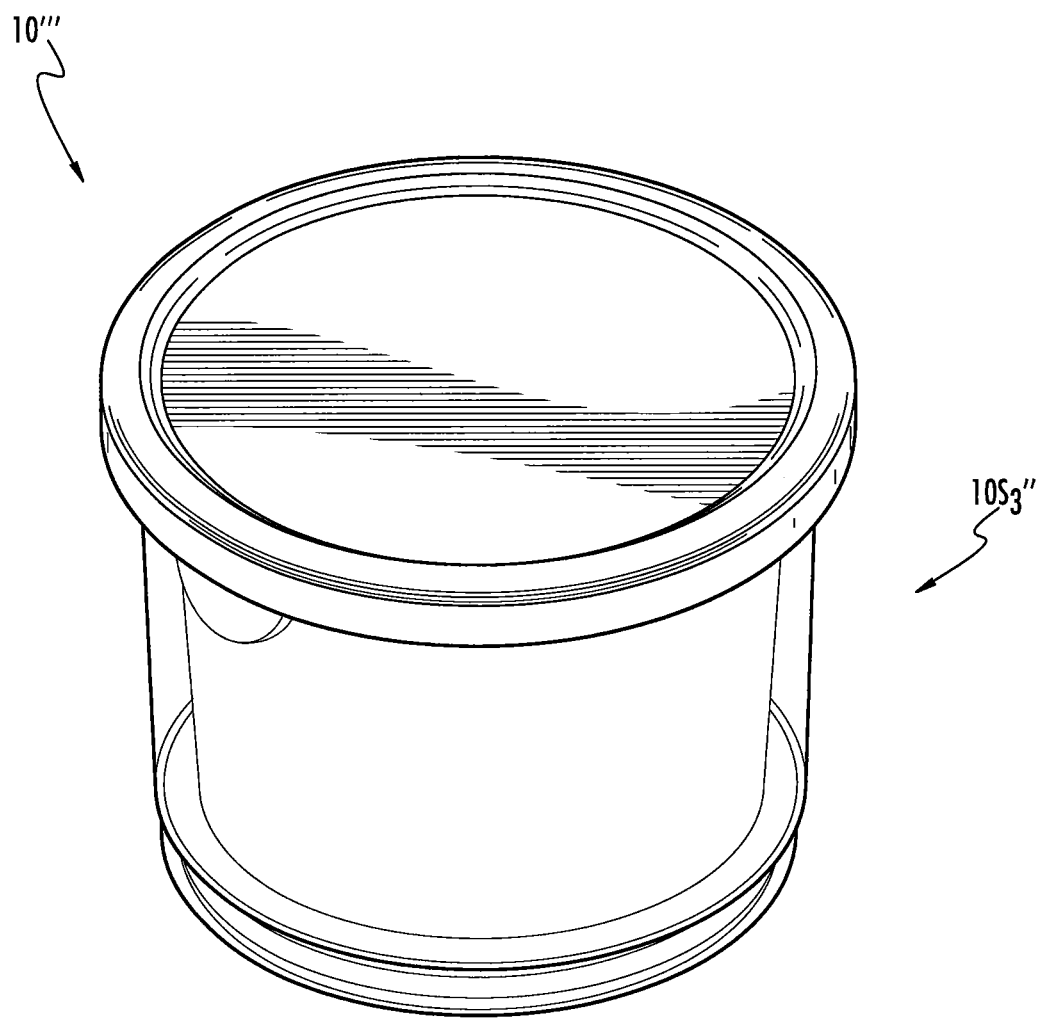
FIG. 20A is a perspective view of an example second container assembly of the system according to embodiments of the present invention.

Referring to FIGS. 20A-20C, in some embodiments, the stackable infusion filtration and storage system 10' of the present invention may further comprise a second container assembly (or nested, stacked set of containers) $10s_3''$. The second container assembly $10s_3''$ of the stackable container system 10'" may comprise a plurality of stackable containers 20'", 40'. For example, in some embodiments the second container assembly $10s_3''$ may comprise the first container 20'" and a third container 40' (and not the second container 30'"). In some embodiments the second container assembly $10s_3''$ may further comprise the sleeve 80. In some embodiments, the first container 20'" and the sleeve 80 of the stackable system 10'" may be concurrently stackable with the third container 40'".

As shown in FIGS. 20A-20C, according to some embodiments, the second container assembly $10s_3''$ of the stackable container system 10'" may further comprise a second lid 50'". In some embodiments, the second lid 50' may be configured to sealably and releasably engage the third container 40'".

Figure 21A:
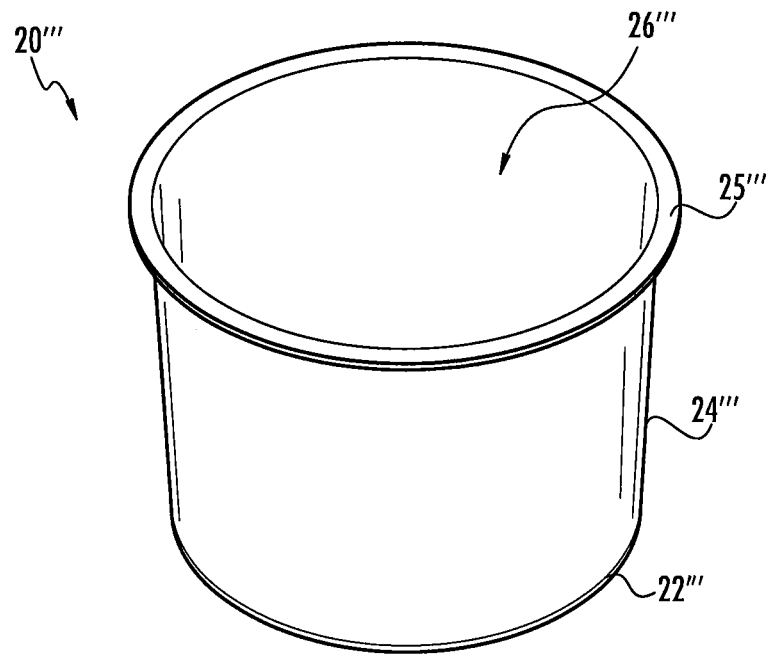
FIG. 21A is a top perspective view of a first container of the system shown in FIG. 19A and FIG. 20A.
Figure 21B:
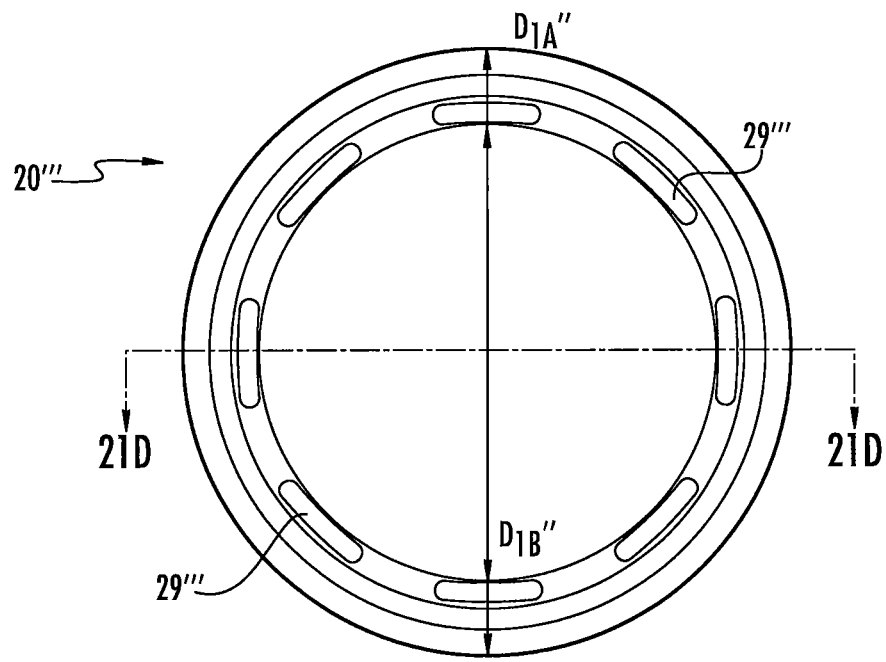
FIG. 21B is a top view of the first container of FIG. 21A.

Referring now to FIGS. 21A-21D, the first container 20'" of the stackable infusion filtration and storage system 10'" is illustrated. The first container 20'" of the stackable system 10'" may be a semi-rigid or rigid container. In some embodiments, the first container 20'" may be formed of stainless steel. In some embodiments, the first container 20'" may comprise a bottom portion 22'', at least one sidewall 24', and an open interior chamber 26''. The at least one sidewall 24''' of the first container 20''' extends upwardly from the bottom portion 22''' of the first container 20'''. The bottom portion 22''' of the first container 20''' may comprise a plurality of spaced apart through apertures 29'. For example, as shown in FIG. 21B, in some embodiments, the plurality of apertures 29'' may reside circumferentially spaced apart around an outer periphery of the bottom portion 22' (or adjacent to the bottom portion 22') of the first container 20'''. In some embodiments, the plurality of apertures 29'' may be horizontally-oriented elongate apertures (FIG. 21B). As discussed above, the shapes, sizes, and/or patterns of the apertures 29'' may be chosen based on the flow properties (e.g., based on the viscosity) of the infused butter mixture 60. The shapes and locations of the apertures 29'' may be chosen to achieve a targeted viscosity for the infused butter mixture 60.

Figure 21C:
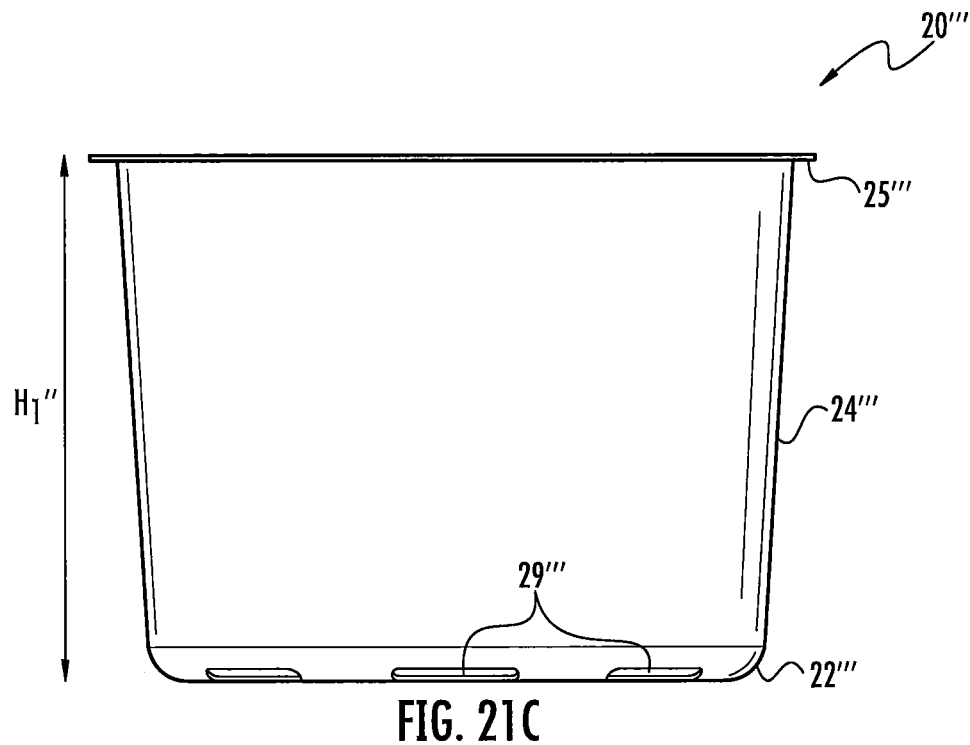
FIG. 21C is a side view of the first container of FIG. 21A.

Referring to FIG. 21C, the sidewall 24''' of the first container 20''' has a height ($H_1''$), a diameter ($D_1''$), and a thickness ($T_1''$). In some embodiments, the sidewall 24''' of the first container 20''' may have a height ($H_1''$) in a range of about 65 mm to about 75 mm. In some embodiments, the sidewall 24'' of the first container 20''' may have a thickness ($T_1''$) in a range of about 0.25 mm to about 1 mm (on average). In some embodiments, the first container 20''' may have a diameter ($D_1''$) in the range of about 75 mm to 100 mm. In some embodiments, the first container 20''' may have a top diameter ($D_{1A}''$) and a bottom diameter ($D_{1B}''$) (FIG. 21B). In some embodiments, the bottom diameter ($D_{1B}''$) of the first container 20''' is about equal to or less than the top diameter ($D_{1A}''$) of the first container 20'' such as, for example, when the first container 20''' is tapered to a smaller bottom relative to the top.

Figure 21D:
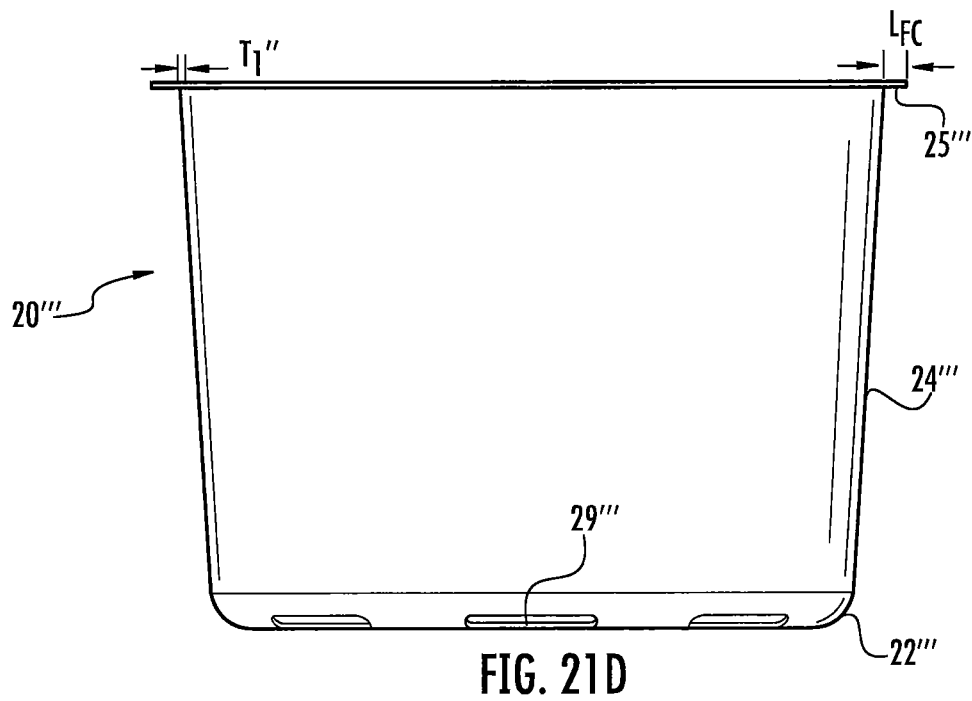
FIG. 21D is a cross-sectional view of the first container of FIG. 21A taken on line 21D-21D in FIG. 21B.

Referring to FIGS. 21A, 21B, and 21D, in some embodiments, the sidewall 24'' of the first container 20''' may comprise an upper flange (or rim) 25''' along a top edge portion of the sidewall 24'. The upper flange 25''' may extend outwardly from the top edge portion of the sidewall 24'' a length ($L_{FC}$) in the range of about 3 mm to about 5 mm.

Referring now to FIGS. 22A-22D, the sleeve 80 of the stackable infusion filtration and storage system 10''' is illustrated. The sleeve 80 of the stackable system 10''' may be semi-rigid or rigid. In some embodiments, the sleeve 80 may be formed of a polymeric material. For example, in some embodiments, the sleeve 80 may be formed of silicone. In some embodiments, the sleeve 80 may comprise at least one sidewall 84 surrounding an open interior 86. In some embodiments, the sidewall 84 of the sleeve 80 may comprise an upper flange (or rim) 85a along a top edge portion of the sidewall 84. The upper flange 85a may extend outwardly from the top edge portion of the sidewall 84 a sufficient length ($L_{GA}$) to engage the upper flange 35' of the second container 30''' when the sleeve 80 is in a stacked and nested relationship with the second container 30''' (i.e., the sleeve 80 is held or suspended a distance ($H_A''$) above the bottom 32'' of the second container 30''') (see also, e.g., FIGS. 26F and 26G). For example, in some embodiments, the upper flange 85a may extend outwardly a length ($L_{GA}$) in the range of about 7 mm to about 9 mm.

In some embodiments, the sidewall 84 of the sleeve 80 may further comprise a lower flange (or rim) 85b along a bottom edge portion of the sidewall 84. The lower flange 85b may extend outwardly from the bottom edge portion of the sidewall 84 a sufficient length ($L_{GB}$) to make contact with an interior surface of the sidewall 34 of the second container 30''. For example, in some embodiments, the lower flange 85b may extend outwardly a length ($L_{GB}$) in the range of about 7 mm to about 9 mm. The lower flange 85b may help to hold the sleeve 80 within the interior chamber 36''' of the second container 30'''. For example, the lower flange 85b may help to prevent the sleeve 80 (and first container 20''') from moving within the interior chambers 36''', 46''' of the second or third containers 30'', 40'''. The lower flange 85b also helps to prevent the at least one sidewall 84 of the sleeve 80 (and the at least one sidewall 24''' of the first container 20''') from making contact with the second container 30''. This allows the liquid 64 to flow through the plurality of apertures 27''' of the first container 20''' more easily as it separates from the infused butter mixture 60 and collects in the open interior chamber 36''' of the second container 30''' (see, e.g., FIGS. 6E-611). The lower flange 85b may also create a seal between the sleeve 80 and the second container 30'''. In some embodiments, the proximity of the sidewalls 84, 34''' is equal to the length ($L_{GB}$) of the lower flange 85b.

In some embodiments, the sidewall 84 of the sleeve 80 may further comprise an annular shoulder 88. The annular shoulder 88 may be configured to support the first container 20''' when the first container 20''' and the sleeve 80 are assembled together in a stacked and nested relationship. For example, in some embodiments, when the first container 20''' is placed (slid) within the sleeve 80, the upper flange 25''' of the first container 20''' may be stopped by the annular shoulder 88 of the sleeve 80, thereby preventing the first container 20''' from sliding through the sleeve 80 and at the same time holding the first container 20''' within the open interior 86 of the sleeve 80.

In some embodiments, the upper flange 85a of the sleeve 80 may further comprise one or more tabs 87. The one or more tabs 87 provides a location that allows a user to easily grip and remove the sleeve 80 (and the first container 20''' when in a stacked and nested relationship with the sleeve 80) from the stackable system 10'''.

Figure 22A:
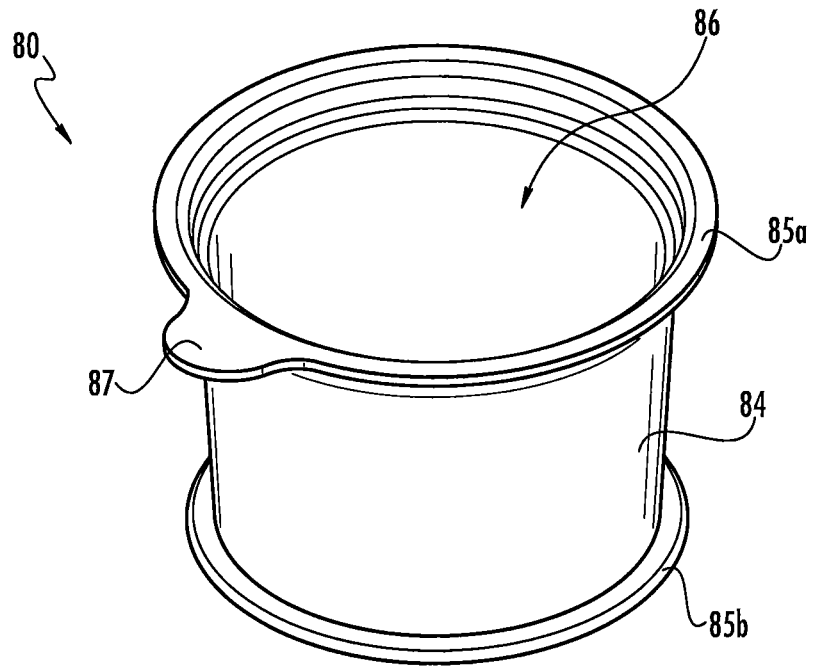
FIG. 22A is a top perspective view of a sleeve of the system shown in FIG. 19A and FIG. 20A.
Figure 22B:
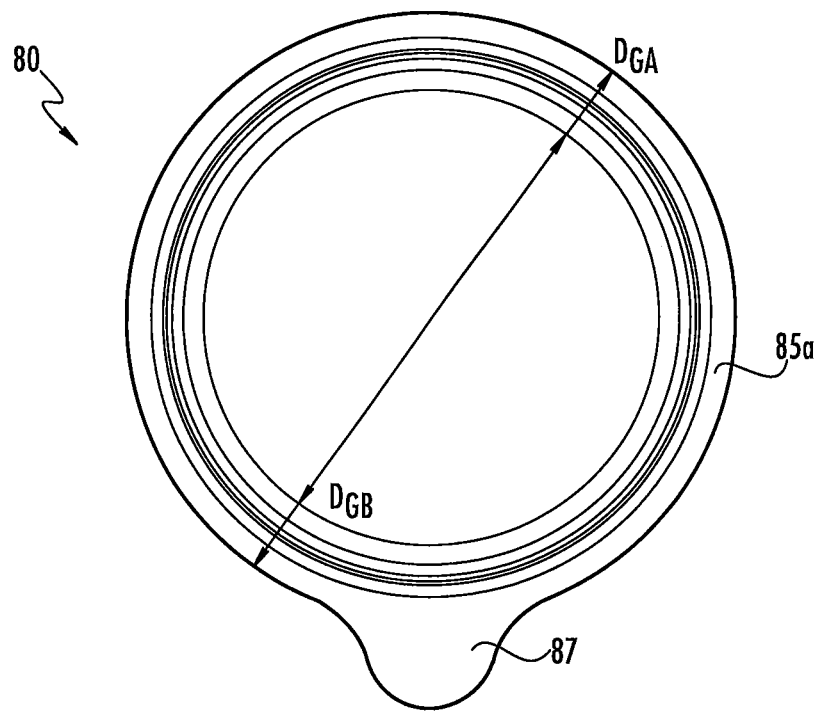
FIG. 22B is a top view of the sleeve of FIG. 22A.
Figure 22C:
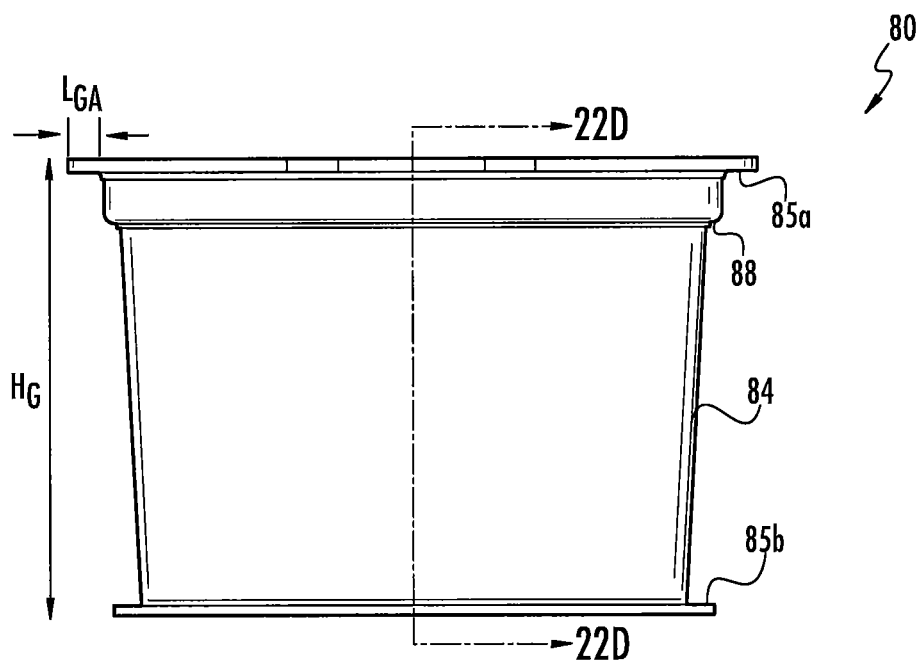
FIG. 22C is a side view of the sleeve of FIG. 22A.
Figure 22D:
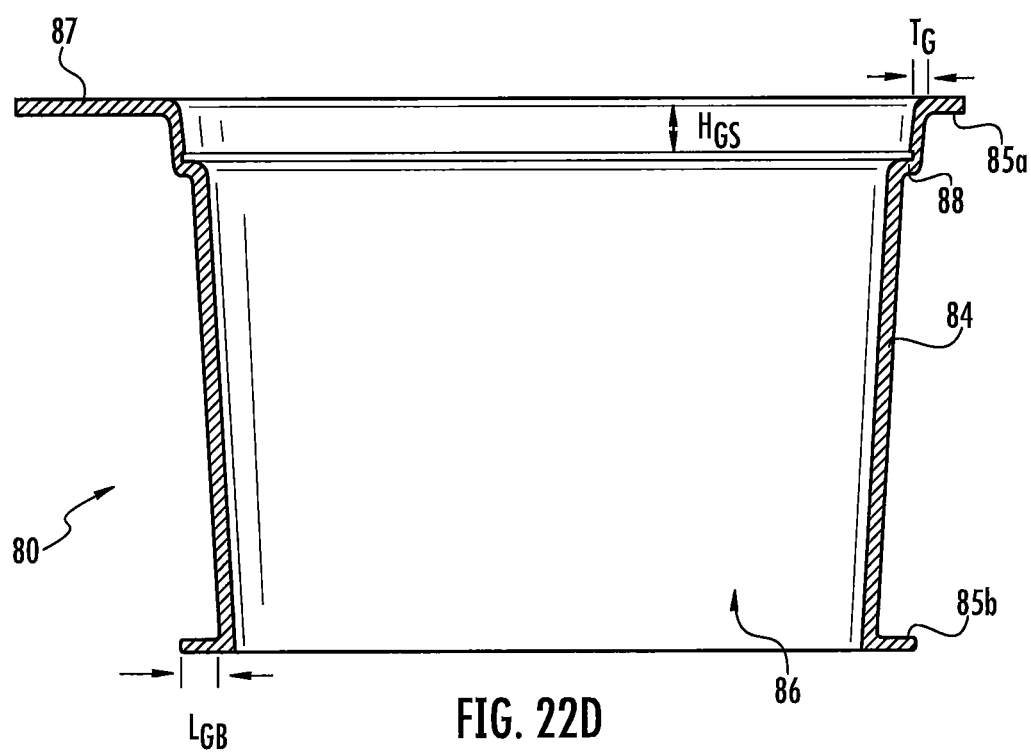
FIG. 22D is a cross-sectional view of the sleeve of FIG. 22A taken on line 22D-22D in FIG. 22C.

Referring to FIGS. 22C and 22D, the sidewall 84 of the sleeve 80 has a height ($H_G$) and a thickness ($T_G$). The height ($H_G$) and thickness ($H_G$) of the sidewall 84 of the sleeve 80 may vary or be constant. In some embodiments, the sidewall 84 of the sleeve 80 may have a height ($H_G$) in a range of about 70 mm to about 80 mm. In some embodiments, the sidewall 84 of the sleeve 80 may have a thickness ($T_G$) in a range of about 1 mm to about 2 mm (on average). In some embodiments, the sleeve 80 may have a diameter ($D_{GA}$, $D_{GB}$) in the range of about 75 mm to 120 mm. In some embodiments, the sleeve 80 may have a top diameter ($D_{GA}$) and a bottom diameter ($D_{GB}$). In some embodiments, the bottom diameter ($D_{GB}$) of the sleeve 80 is about equal to or less than the top diameter ($D_{GA}$) of the sleeve 80, such as, for example, when the sleeve 80 is tapered. In some embodiments, the shoulder 88 may be located a distance ($H_{Gs}$) of about 8 mm to about 10 mm below the top edge portion of the sidewall 84 (i.e., approximately the difference in height between the sleeve 80 and the first container 20''').

The second container 30' of the stackable system 10''' is illustrated in FIGS. 23A-23D. The second container 30''' of the stackable container system 10''' may be semi-rigid or rigid. In some embodiments, the second container 30''' may be formed from glass. In some embodiments, the second container 30''' may comprise a bottom 32'' and at least one sidewall 34'. Together, the bottom 32' and the at least one sidewall 34'' of the second container 30''' form an interior chamber 36'' with a closed bottom 32''. The at least one sidewall 34' of the second container 30''' extends upwardly from the closed bottom 32'.

Figure 23A:
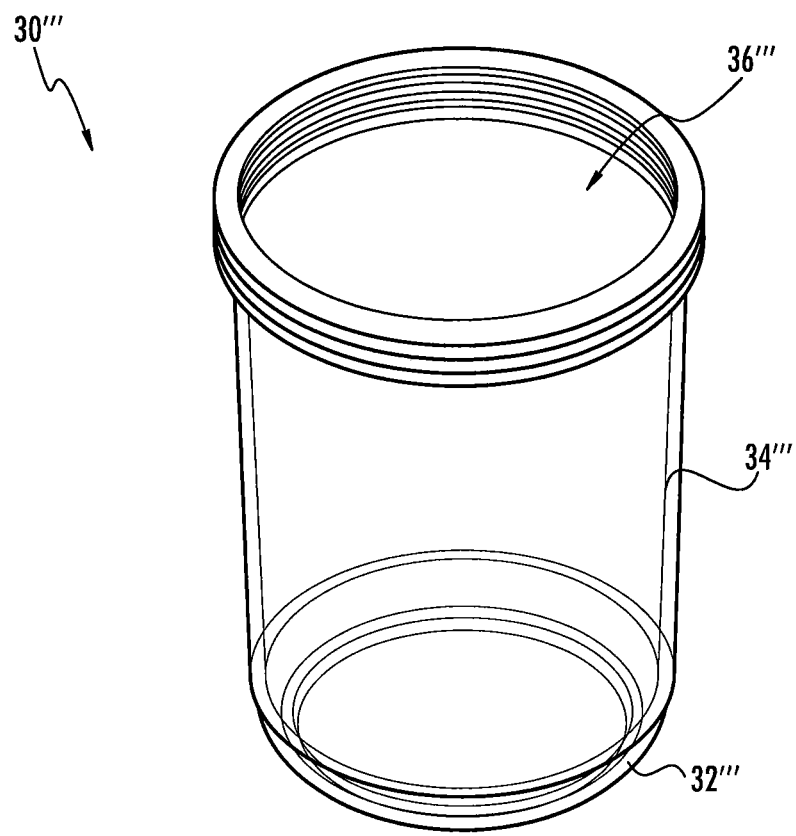
FIG. 23A is a top perspective view of a second container of the system shown in FIG. 19A.
Figure 23B:
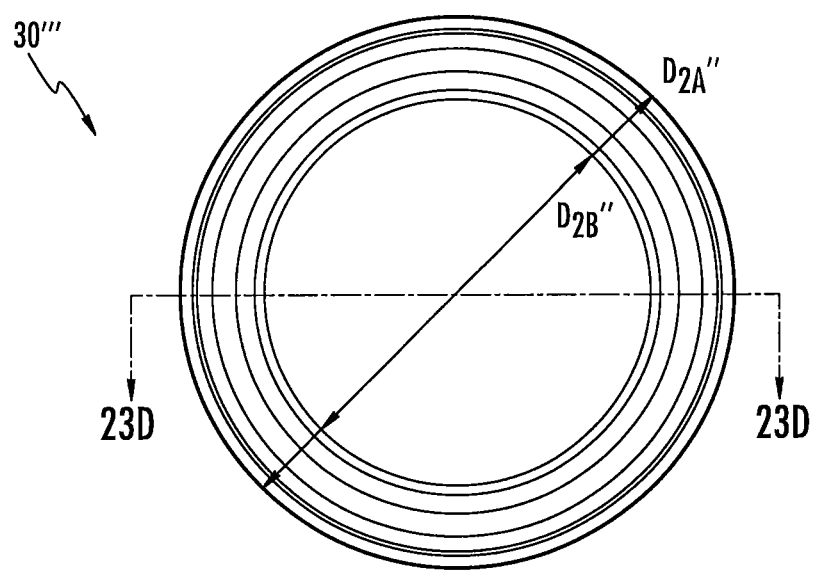
FIG. 23B is a top view of the second container of FIG. 23A.
Figure 23C:
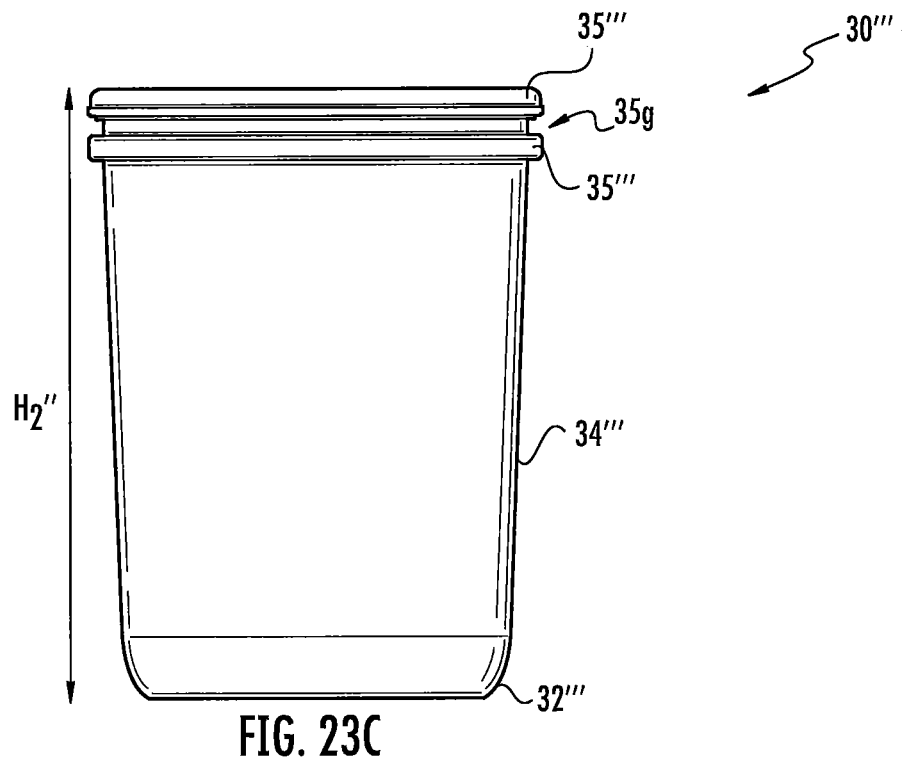
FIG. 23C is a side view of the second container of FIG. 23A.
Figure 23D:
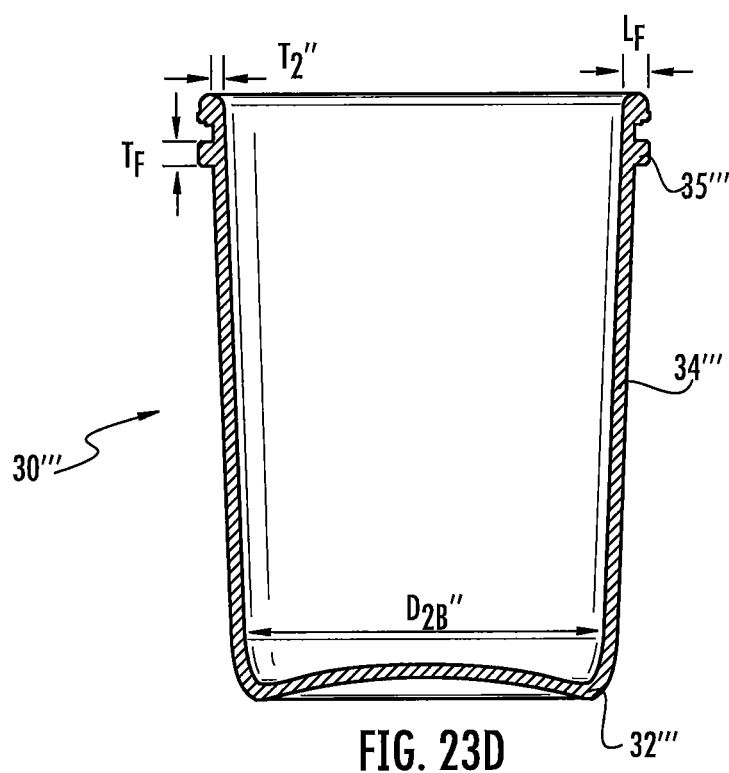
FIG. 23D is a cross-sectional view of the second container of FIG. 23A taken on line 23-23D in FIG. 23B.

Referring to FIGS. 23C and 23D, the sidewall 34" of the second container 30' has a height ($H_2$") and a thickness ($T_2$"). In some embodiments, the sidewall 34' of the second container 30''' may have a height ($H_2$") in a range of about 150 mm to about 160 mm. In some embodiments, the sidewall 34" of the second container 30''' may have a thickness ($T_2$") in a range of about 2.5 mm to about 3.5 mm. The second container 30''' may be sized to concurrently receive the sleeve 80 and the first container 20'''.

As shown in FIGS. 23B and 23D, in some embodiments, the second container 30''' may have a top diameter ($D_{2A}$") and a bottom diameter ($D_{2B}$"). In some embodiments, the top and bottom diameters ($D_{2A}$", $D_{2B}$") of the second container 30''' may be in the range of about 90 mm to about 120 mm.

Figure 26A:
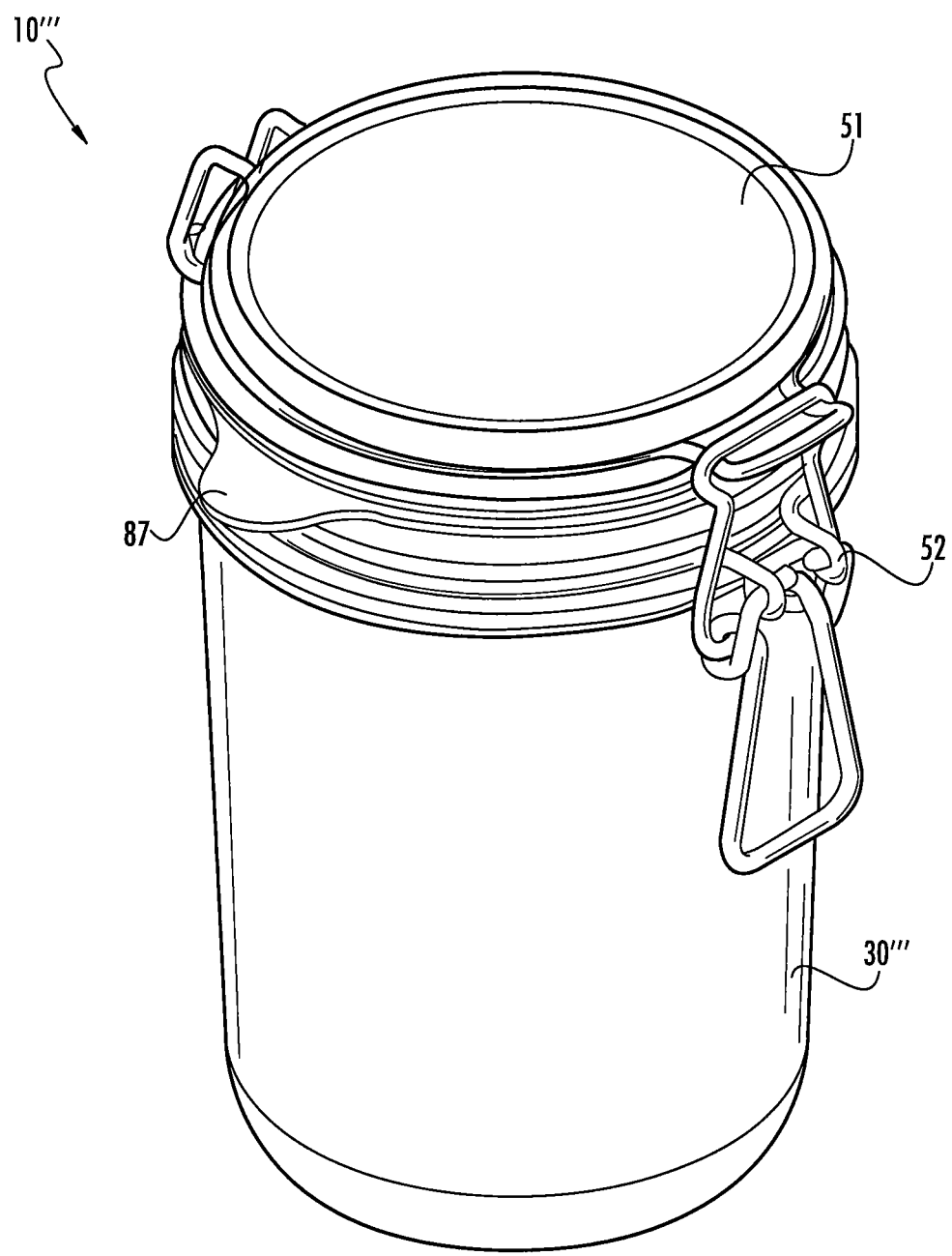
FIG. 26A is a perspective view of a stackable infusion filtration and storage system in a cooperating stacked and nested relationship according to embodiments of the present invention.
Figure 26B:
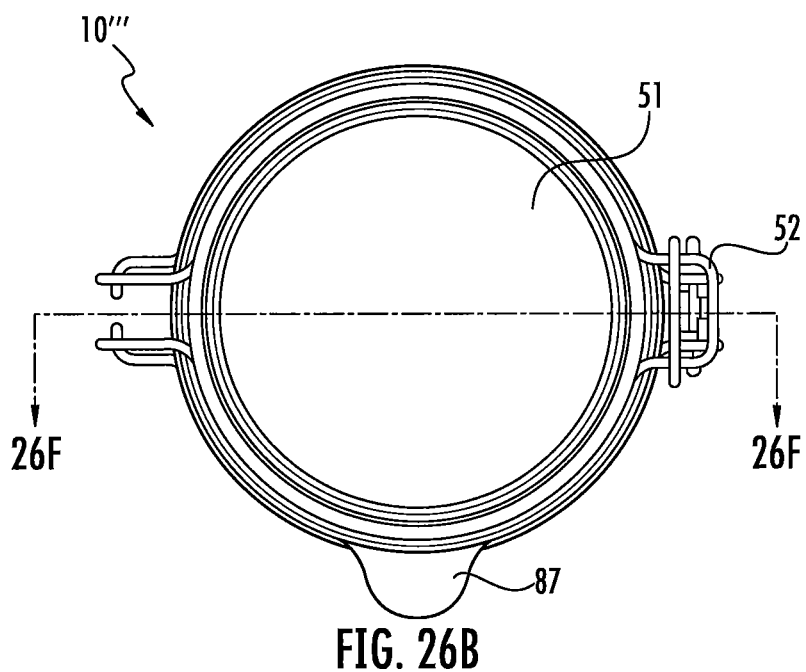
FIG. 26B is a top view of the system of FIG. 26A.
Figure 26C:
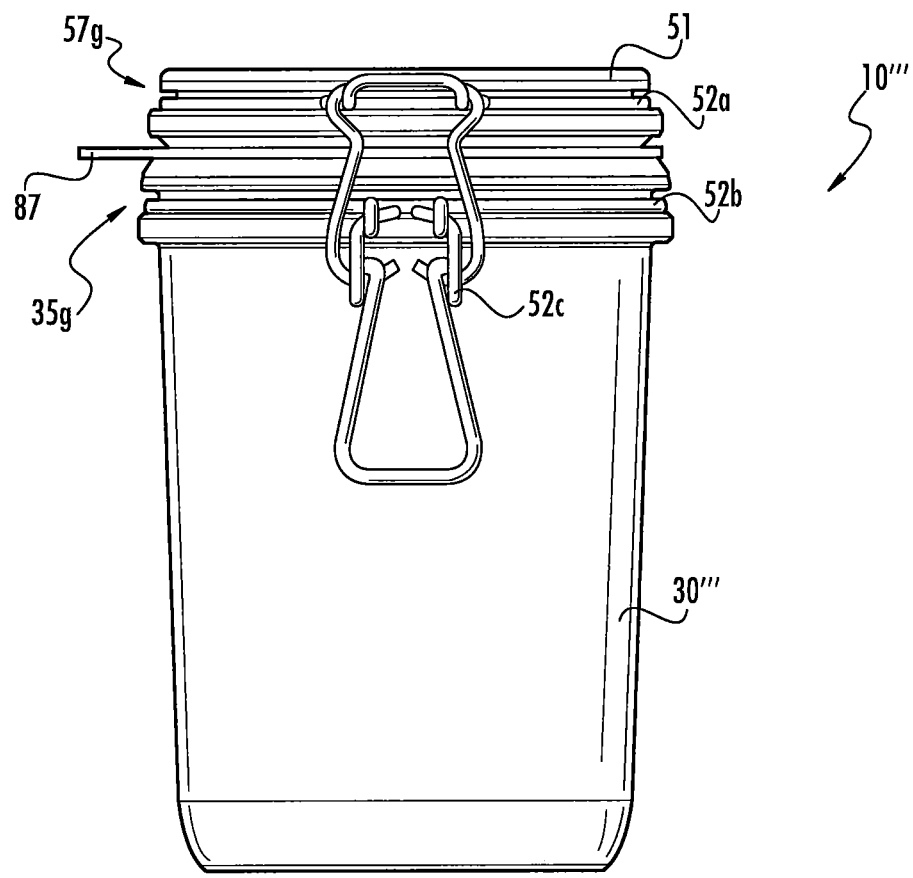
FIG. 26C is a front view of the system of FIG. 26A.
Figure 26D:
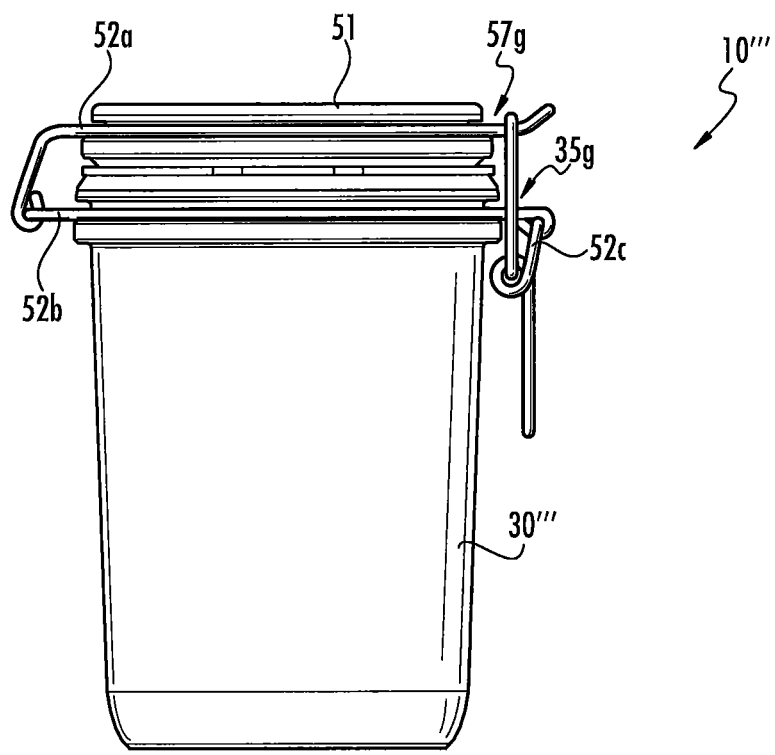
FIG. 26D is a side view of the system of FIG. 26A.
Figure 26E:
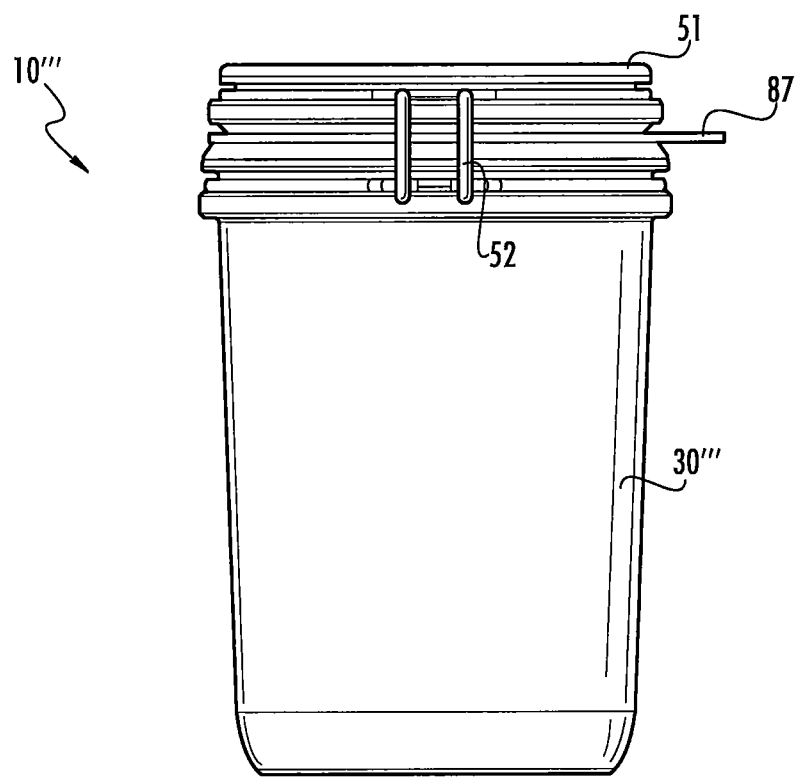
FIG. 26E is a back view of the system of FIG. 26A.
Figure 26F:
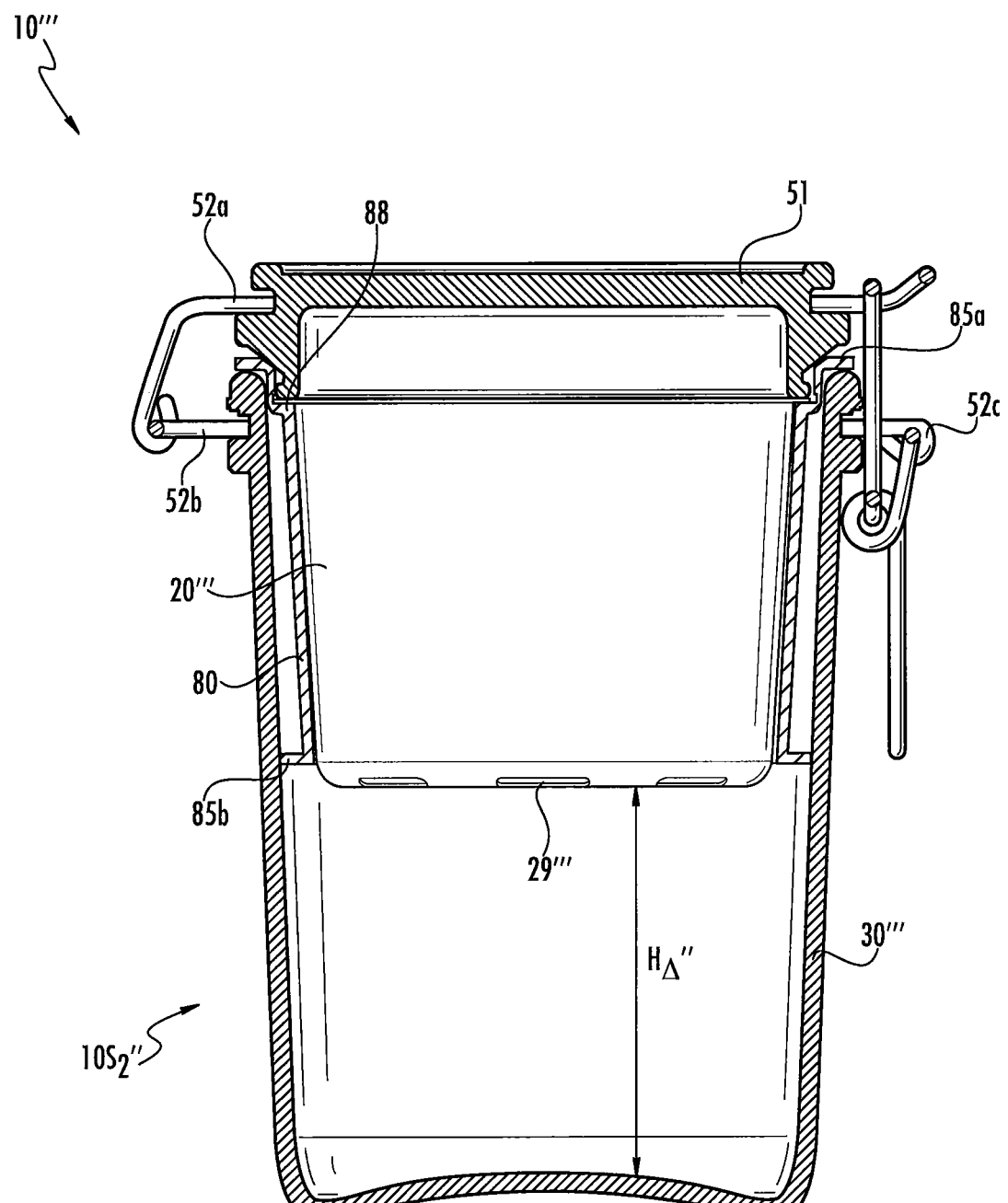
FIG. 26F is a cross-sectional view of the system of FIG. 26A taken on line 26F-26F in FIG. 26B.
Figure 26G:
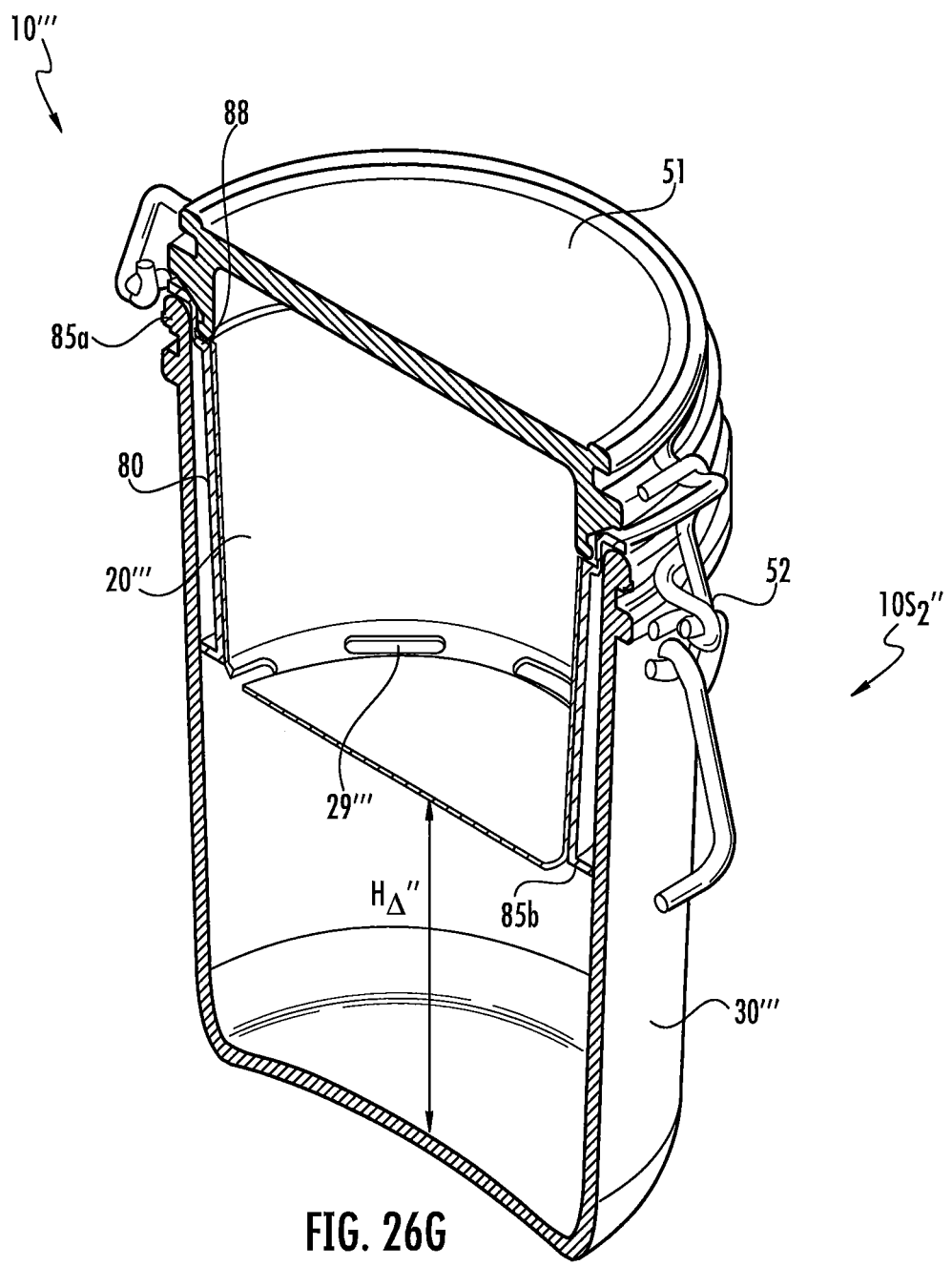
FIG. 26G is a perspective cross-sectional view of the system of FIG. 26A taken on line 26F-26F in FIG. 26B.
Figure 27A:
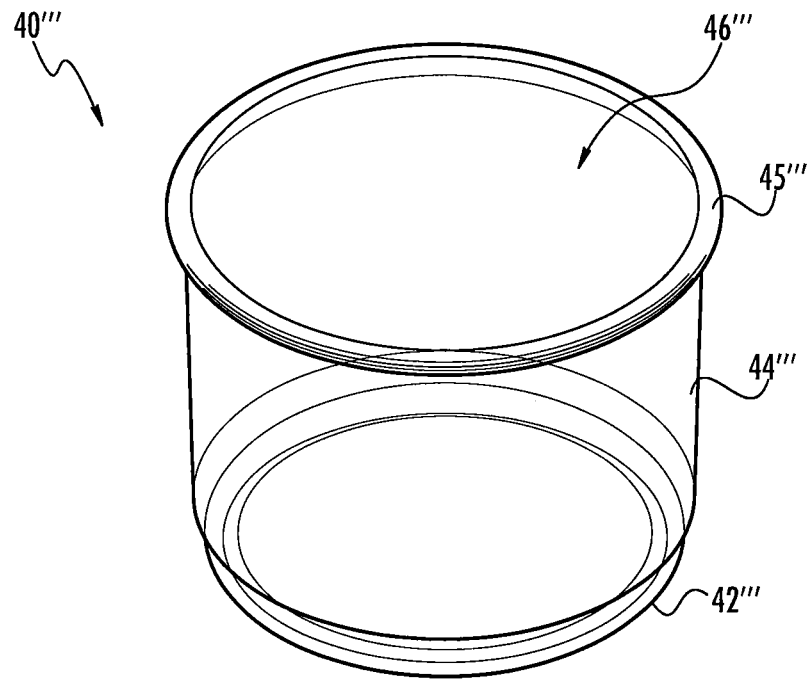
FIG. 27A is a top perspective view of a third container of the second container assembly of the system shown FIG. 20A.
Figure 27B:
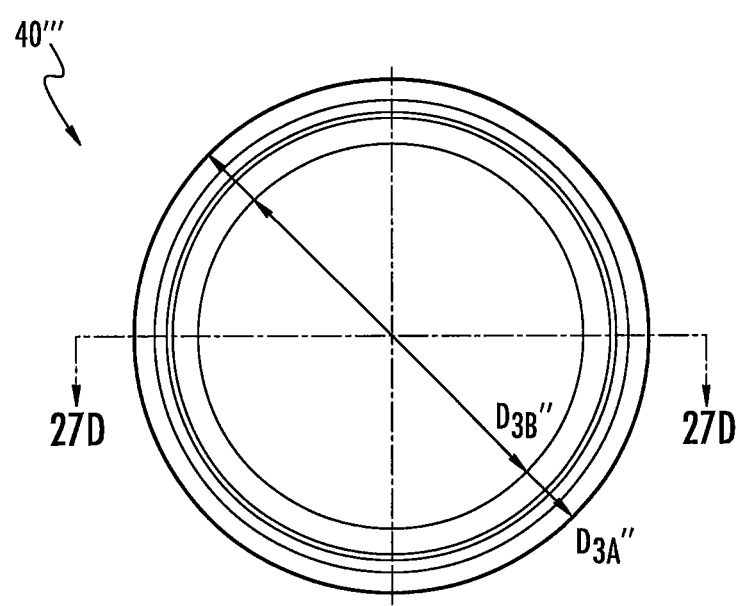
FIG. 27B is a top view of the third container of FIG. 27A.
Figure 27C:
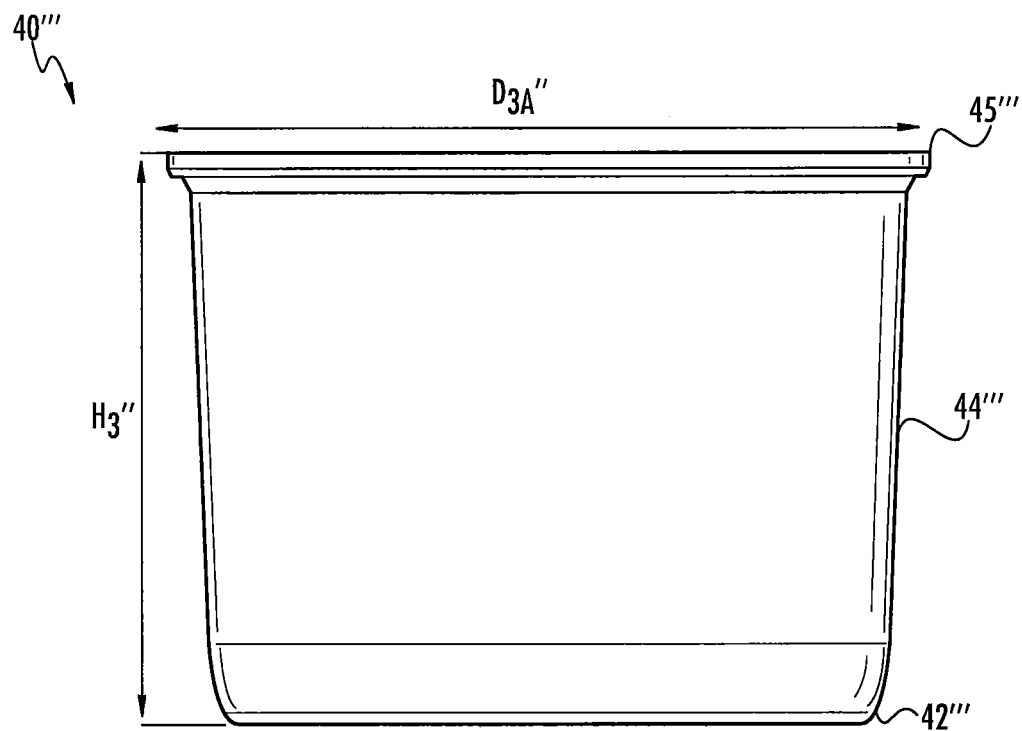
FIG. 27C is a side view of the third container of FIG. 27A.
Figure 27D:
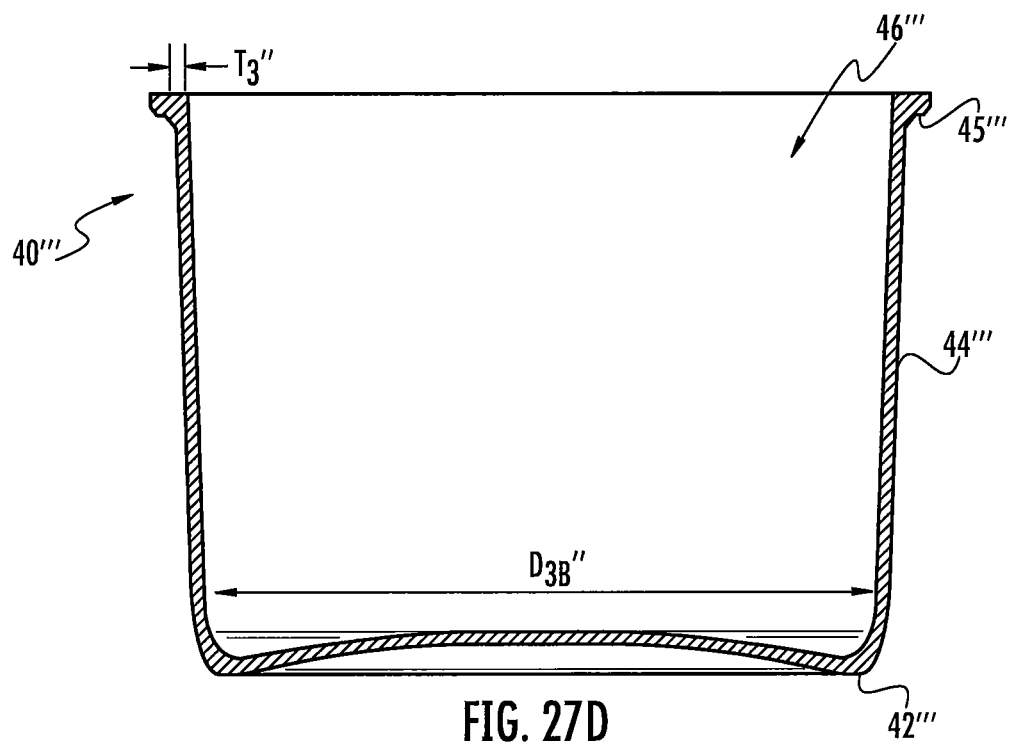
FIG. 27D is a cross-sectional view of the third container of FIG. 27A taken on line 27D-27D in FIG. 27B.
Figure 28A:
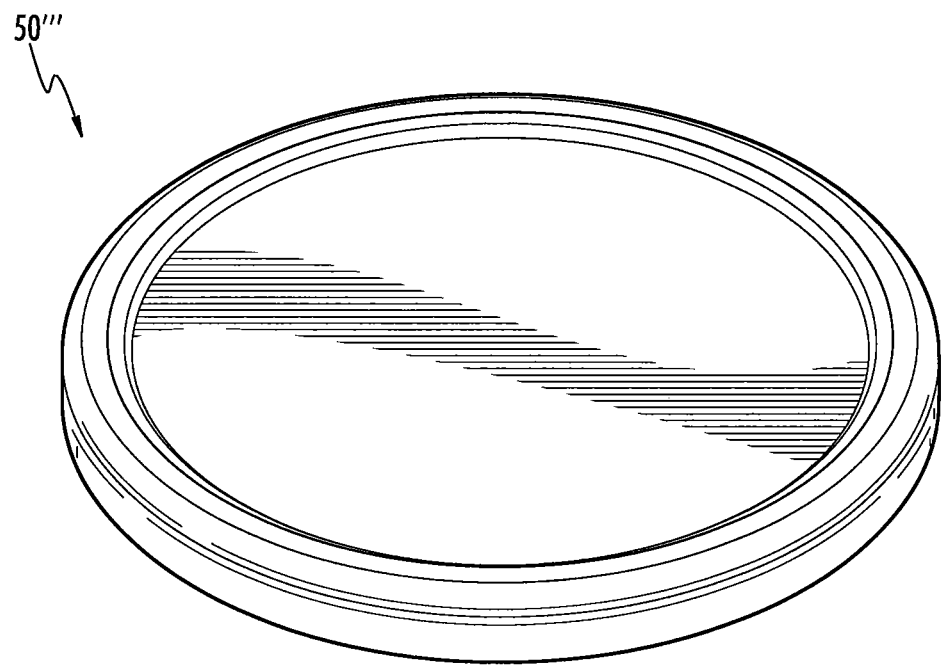
FIG. 28A is a top perspective view of a second lid of the secondary container assembly of the system shown FIG. 20A.
Figure 28B:
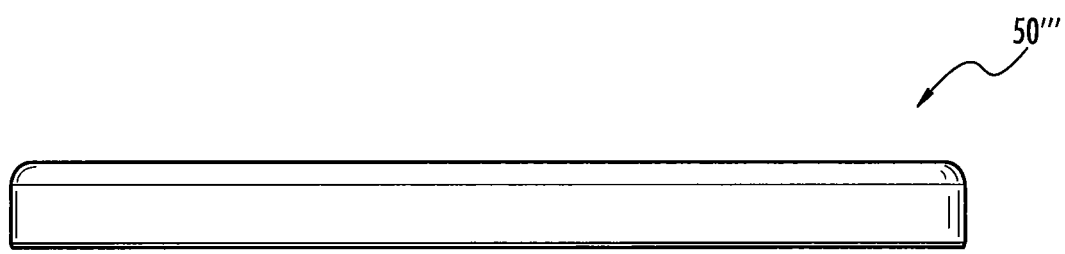
FIG. 28B is a side view of the second lid of FIG. 28A.
Figure 28C:
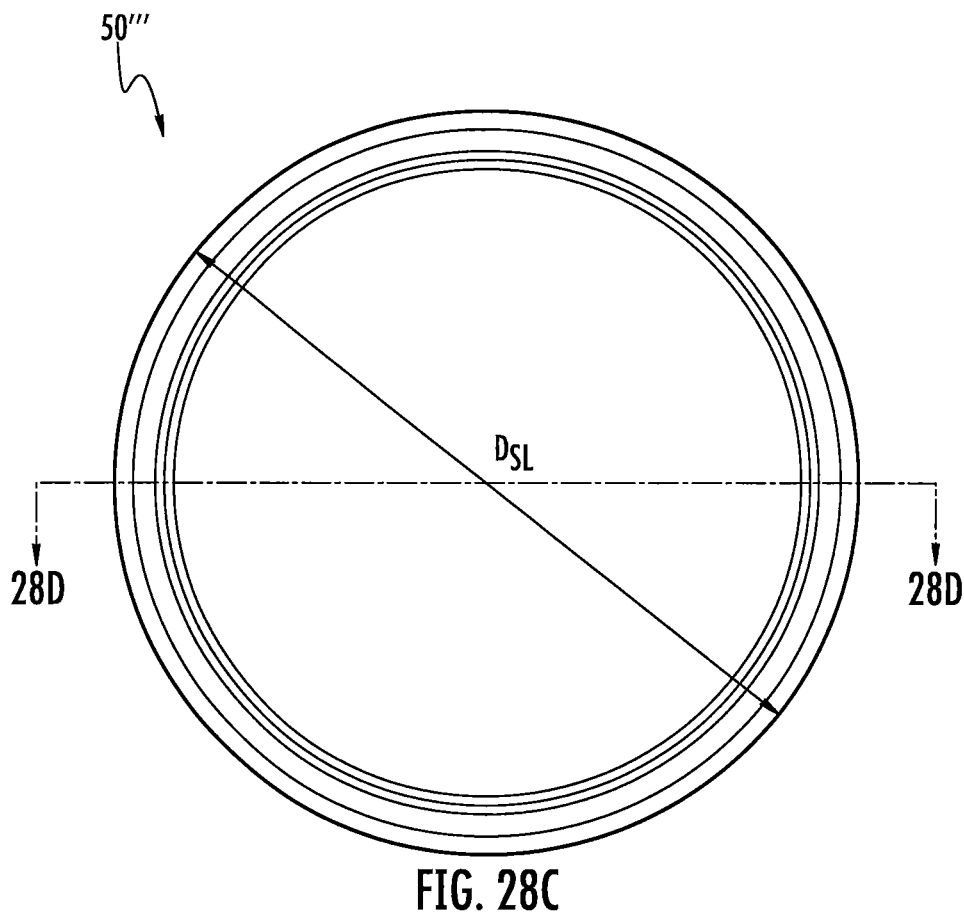
FIG. 28C is a top view of the second lid of FIG. 28A.
Figure 28D:
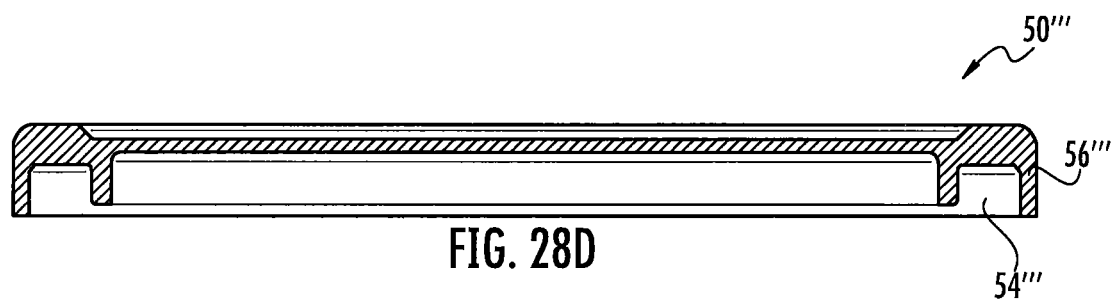
FIG. 28D is a cross-sectional view of the second lid of FIG. 28A taken on line 28D-28D of FIG. 28C.

As shown in FIGS. 23C and 23D, in some embodiments, the sidewall 34''' of the second container 30''' may comprise at least one upper flange (or rim) 35" along a top edge portion of the sidewall 34" of the second container 30'''. As shown in FIG. 23D, in some embodiments, the at least one upper flange 35''' may extend outwardly from the top edge portion of the sidewall 34". In some embodiments, the at least one upper flange 35' may comprise two spaced apart parallel flanges 35" that extend outwardly from the top edge portion of the sidewall 34" a distance ($L_F$) in the range of about 6 mm to about 7 mm. Each at least one upper flange 35' may have a thickness ($T_F$) in the range of about 6 mm to about 8 mm (on average). In some embodiments, the sidewall 34''' may comprise two vertically stacked upper flanges 35''' separated by a gap 35g (see, e.g., FIG. 23C). As discussed in further detail below, in some embodiments, the gap 35g may be configured to receive a portion of a clasping mechanism 52 (FIG. 26A).

Referring now to FIGS. 24A-24D, the first lid 51 of the first container assembly $10s_2$" of a stackable infusion filtration and storage system 10''' of the present invention is illustrated. The first lid 51 may be semi-rigid or rigid. In some embodiments, the first lid 51 may be formed from glass. The first lid 51 is configured to sealably and releasably engage the second container 30''' of the stackable system 10'''. In some embodiments, the first lid 51 may have a height ($H_{PL}$) in the range of about 20 mm to about 25 mm. In some embodiments, the first lid 51 may have a thickness ($T_{PL}$) in the range of about 5 mm to about 7 mm (on average). In some embodiments, the first lid 51 may have a diameter ($D_{PL1}/D_{PL2}$) in the range of about 85 mm to about 120 mm.

Figure 24A:
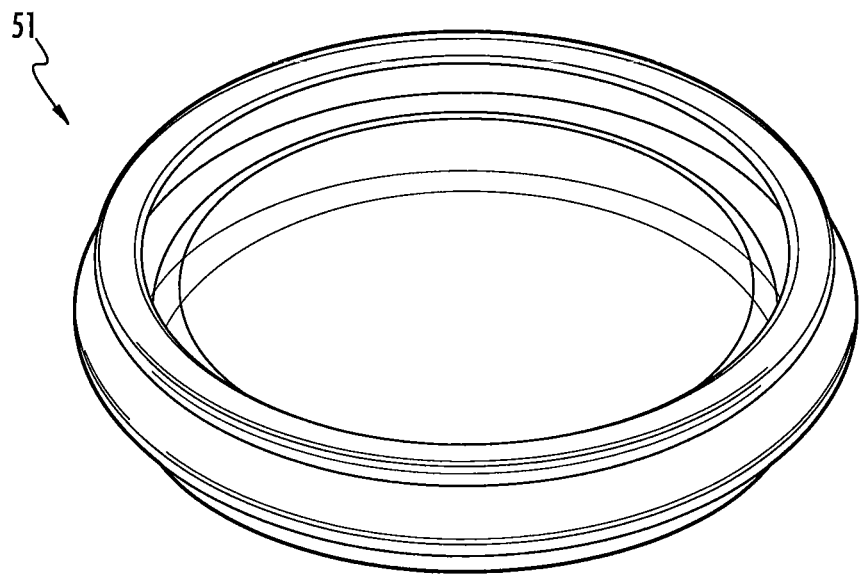
FIG. 24A is a top perspective view of a first lid of the system shown in FIG. 19A.
Figure 24B:
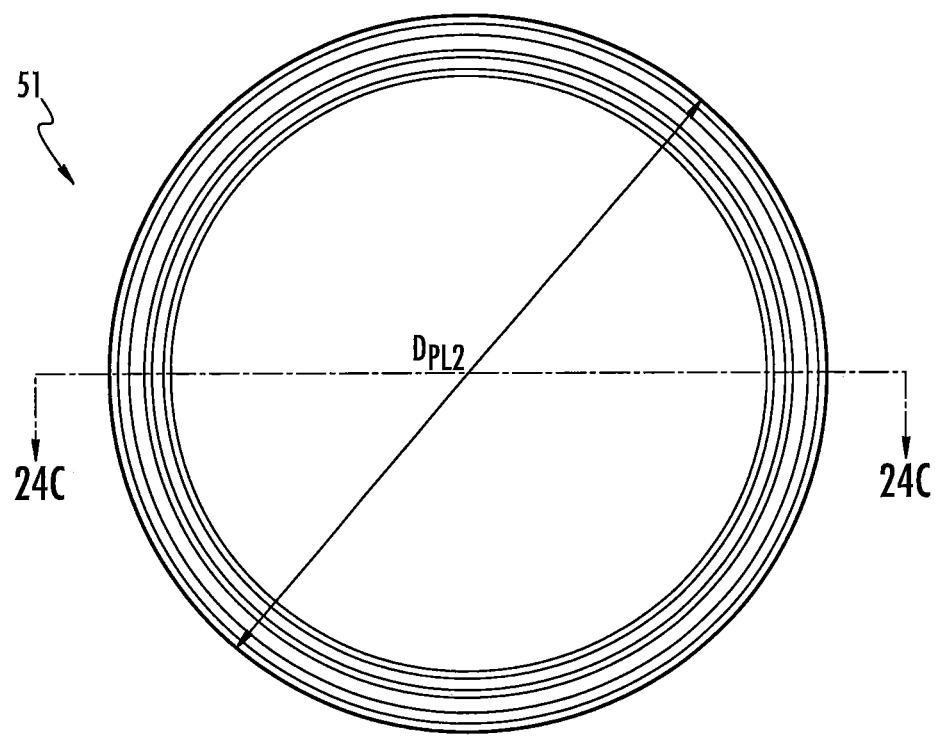
FIG. 24B is a top view of the first lid of FIG. 24A.
Figure 24C:
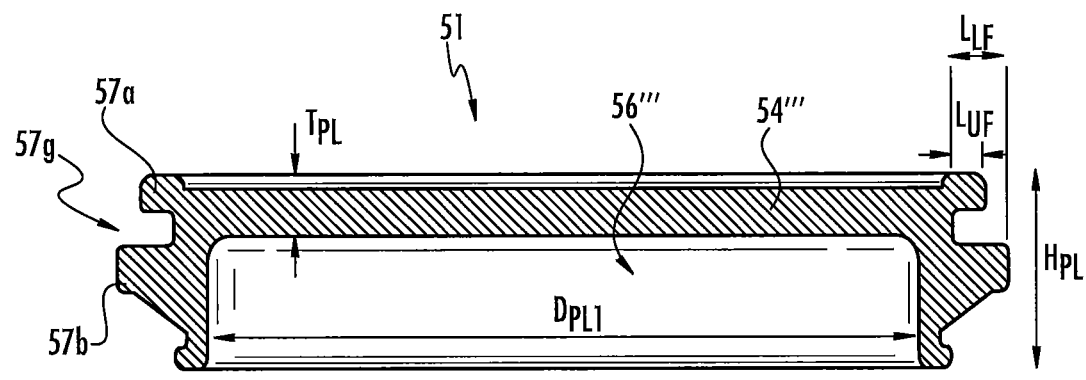
FIG. 24C is a cross-sectional view of the first lid of FIG. 24A taken on line 24C-24C in FIG. 24B.
Figure 24D:
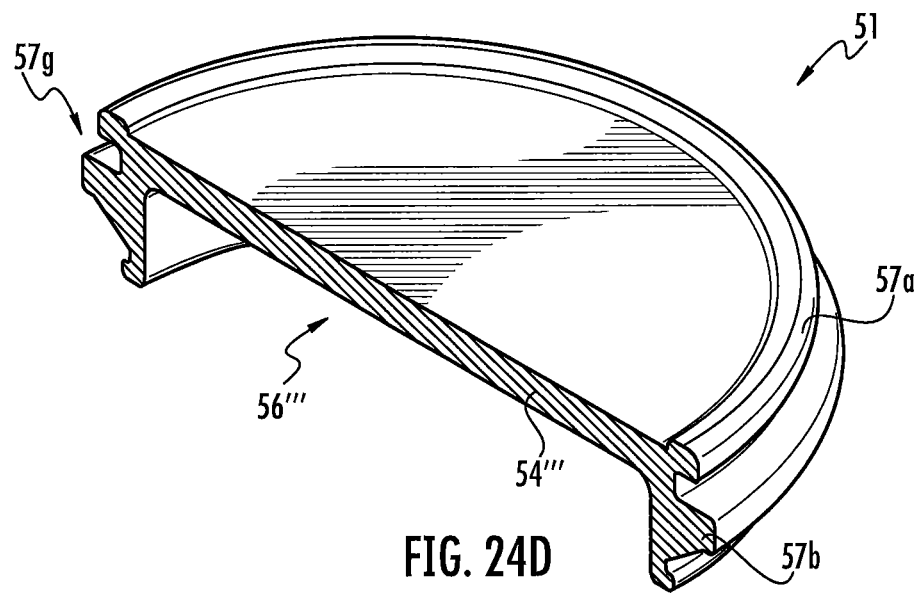
FIG. 24D is a perspective cross-sectional view of the first lid of FIG. 24A taken on line 24D-24D in FIG. 24B.

As shown in FIGS. 24C and 24D, in some embodiments, the first lid 51 may comprise an outer wall 54''' and interior cavity 56'''. In other embodiments, the first lid 51 may be solid (i.e., no interior cavity 56'''). The first lid 51 may further comprise one or more flanges 57a, 57b extending outwardly from the outer wall 54'''. As shown in FIG. 24C, in some embodiments, the first lid 51 may comprise two flanges 57a, 57b (e.g., an upper flange 57a and a lower flange 57b) separated by a gap 57g. In some embodiments, the gap 57g may be configured to receive a portion of a clasping mechanism 52. As shown in FIG. 24C, in some embodiments, the upper flange 57a may extend radially outward a distance ($L_{UF}$, $L_{LF}$) less than the lower flange 57b (i.e., $L_{LF}$<$L_{UF}$).

Figure 25A:
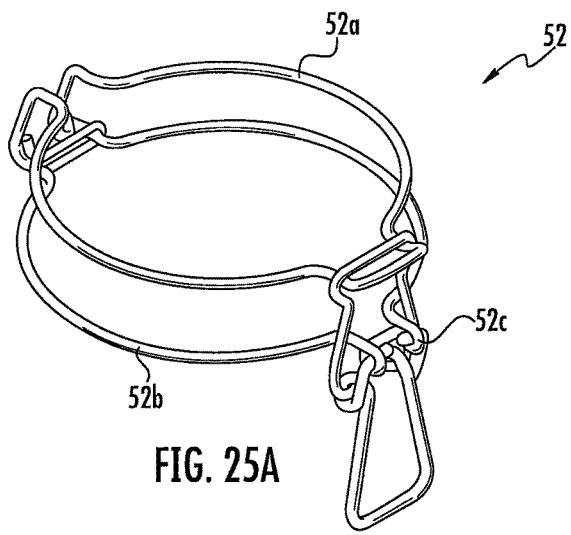
FIG. 25A is a perspective view of a clasp mechanism of the system shown FIG. 19A.
Figure 25B:
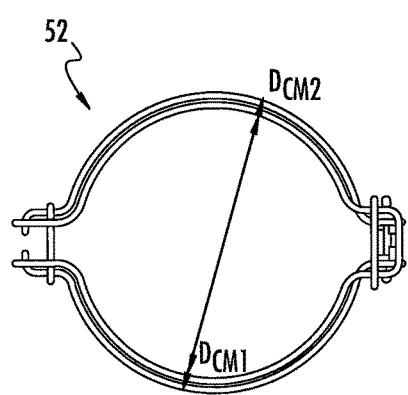
FIG. 25B is a top view of the clasp mechanism of FIG. 25A.
Figure 25C:
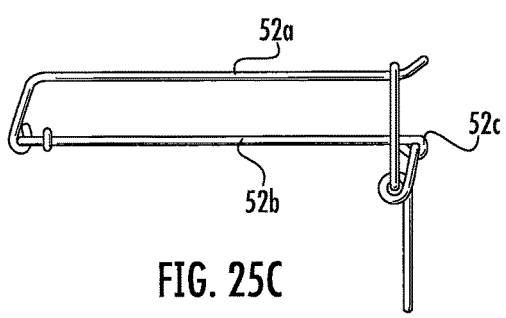
FIG. 25C is a side view of the clasp mechanism of FIG. 25A.

Referring to FIGS. 25A-25C, an exemplary clasping mechanism 52 that may be used with the stackable system 10''' of the present invention is illustrated. The clasping mechanism 52 may comprise an upper ring 52a, a lower ring 52b, and a securing member 52c. In some embodiments, the clasping mechanism 52 may be formed from steel. In some embodiments, the upper ring 52a may be configured to be received by the gap 57g in the first lid 51 and the lower ring 52b may be configured to be received by the gap 35g in the sidewall 34''' of the second container 30'''. Thus, in some embodiments, the upper ring 52a of the clasping mechanism may have a diameter ($D_{CM1}$) that is substantially equal to the diameter ($D_{PL2}$) of the first lid 51 and the lower ring 52b may have a diameter ($D_{CM2}$) that is substantially equal to the top diameter ($D_{2A}$") of the second container 30'''. After the upper ring 52a of the clasping mechanism 52 is secured in the gap 57g of the first lid 51 and the lower ring 52b of the clasping mechanism 52 is secured in the gap 35g of the second container 30''', the securing member 52c is engaged to releasably secure the first lid 51 to the second container 30" (see also, e.g., FIGS. 26A-26G). Other known securing mechanisms may be used to releasably engage and seal the first lid 51 to the second container 30'''.

Referring now to FIGS. 27A-27D, the third container 40''' of the second container assembly $10s_3$" of the stackable system 10''' of the present invention is illustrated. The third container 40''' may be a semi-rigid or rigid container that is sized to slidably receive the first container 20''' and sleeve 80 (see also, e.g., FIGS. 20A-20C). In some embodiments, the third container 40''' may be formed from polycarbonate.

As shown in FIGS. 27A-27D, in some embodiments, the third container 40''' may comprise a closed bottom 42" and at least one sidewall 44'. The sidewall 44' of the third container 40''' extends upwardly from the bottom 42'. Together, the bottom 42" and the at least one sidewall 44' of the third container 40''' may form an enclosed interior open chamber 46'. The sidewall 44' of the third container 40''' has a height ($H_3$") and a thickness ($T_3$"). In some embodiments, the sidewall 44' of the third container 40''' may have a height ($H_3$") in the range of about 75 mm to about 100 mm. In some embodiments, the sidewall 44''' of the third container 40''' may have a thickness ($T_3$") in a range of about 1.5 mm to about 5 mm (on average).

The interior chamber 46" of the third container 40''' may be used to slidably receive and hold/store the first container 20''' with an infused butter 70 (see also, e.g., FIG. 6L). As shown in FIG. 20A, in some embodiments, the third container 40''' may be sized to slidably receive the first container 20''' (and sleeve 80). For example, in some embodiments, the first container 20''' may be slidably received into the third container 40''' such that the first container 20''' fits within the interior chamber 46''' of the third container 40''' apart from the second container 30'''. This stacked and nested relationship of containers 20', 40' (and sleeve 80) (i.e., the secondary container assembly $10s_3$") may be used, such as, for example, during storage of an infused butter 70 (see, e.g., FIG. 6L).

Referring now to FIGS. 28A-28D, the second lid 50''' of the second container assembly $10s_3$" of a stackable infusion filtration and storage system 10''' of the present invention is illustrated. In some embodiments, the second lid 50" may be sized to extend across and cover (and seal) the interior chamber 46" of the third container 40'''. For example, in some embodiments, the second lid 50" has a diameter ($D_{SL}$) in a range of about 110 mm to about 120 mm.

In some embodiments, the second lid 50" may have a solid, closed surface (see, e.g., FIG. 22A). In some embodiments, the second lid 50''' may be configured to sealably engage a flange 45''' of the third container 40''', thereby securing the second lid 50''' to the third container 40'''. For example, the secondary lid 50''' may comprise an annular space 54''' with an outer wall 56''' (see, e.g., FIG. 28D). The annular space 54''' may be configured to receive the flange 45''' of the third container 40''' to form an airtight or suitable seal. In some embodiments, when the first container 20''' and the sleeve 80 are in a stacked and nested relationship with the third container 40''', the top edge of the sleeve 80 can reside under and adjacent to the second lid 50''' when the second lid 50''' is sealably engaged to the third container 40''' (see, e.g., FIG. 20B).

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the teachings and advantages of this invention. Accordingly, all such modifications are intended to be included within the scope of this invention as defined in the claims. The invention is defined by the following claims, with equivalents of the claims to be included therein.

That which is claimed is:

1. A stackable infusion filtration and storage system, the system comprising:
    a first container, the first container comprising a bottom, at least one sidewall, and an open interior chamber, wherein at least one of the bottom or the at least one sidewall of the first container comprises a plurality of apertures;
    a second container sized to receive the first container, the second container comprising a closed bottom, at least one sidewall, and an open interior chamber; and
    a third container comprising a closed bottom, at least one side wall, and an open interior chamber,
    wherein the bottom of the first container sits within the open interior chamber of the second container a distance above the bottom of the second container when the first container and the second container are assembled together in a stacked and nested relationship,
    wherein the bottom of the first container sits within the open interior chamber of the third container when the first container and the third container are assembled together in a stacked and nested relationship, and
    wherein the first container contains an infused butter mixture.

2. The system of claim 1, wherein the third container is sized to slidably receive the first container.

3. The system of claim 2, wherein the first container is configured to be received within the open interior chamber of the third container when the first container and the third container are assembled together in a stacked and nested relationship.

4. The system of claim 1, wherein a height of the first container is less than a height of the second container.

5. The system of claim 2, wherein a height of the third container is less than a height of the second container and about equal to a height of the first container.

6. The system of claim 1, wherein the first container further comprises a flange extending outward from a top edge portion of the at least one sidewall of the first container.

7. The system of claim 6, wherein the flange of the at least one sidewall of the first container is configured to engage a top edge portion of the at least one sidewall of the second container, thereby allowing the first container to sit within the open interior chamber of the second container when the first container and the second container are assembled together in the stacked and nested relationship.

8. The system of claim 7, wherein the second container further comprises a flange extending radially outwardly from the top edge portion of the at least one sidewall of the second container, and the flange of the first container is configured to engage the flange of the second container, thereby allowing the first container to sit within the open interior chamber of the second container a distance of about 2 inches to about 7 inches above the bottom of the second container when the first container and the second container are in the stacked and nested relationship.

9. The system of claim 6, further comprising a lid, the lid configured to releasably engage the first container, wherein the lid is sized to cover the open interior chamber of the first container.

10. The system of claim 9, wherein the lid comprises a recess configured to receive a protruding portion of the at least one sidewall of the first container to secure the lid to the system.

11. The system of claim 6, wherein the flange is an upper flange, and wherein the first container further comprises a lower flange extending outward from a bottom edge portion of the at least one sidewall of the first container.

12. The system of claim 1, wherein the plurality of apertures comprises a plurality of laterally and/or circumferentially spaced apart elongate apertures located in the bottom of the first container.

13. The system of claim 1, wherein the infused butter mixture comprises one or more infusion materials.

14. The system of claim 13, wherein the one or more infusion materials is selected from a group consisting of: tea leaves, cocoa, fruit, grains, herbs, spices, seasonings, botanicals, *cannabis*, vegetables, flavor additives, and/or sweeteners.

15. The system of claim 1, further comprising a sleeve between the first container and the second container, the sleeve residing a distance above the bottom of the second container.

16. A stackable infusion filtration and storage system, the system comprising:
    a first container, the first container comprising a bottom portion, at least one sidewall having at least one outwardly extending flange, and an open interior chamber, the bottom portion of the first container comprising a plurality of through apertures;
    a sleeve sized to receive the first container, the sleeve comprising at least one sidewall having an annular shoulder disposed along a top edge portion of the at least one sidewall of the sleeve, an open interior, and an open bottom;
    a second container sized to concurrently receive the sleeve and the first container, the second container comprising a bottom, at least one sidewall, and an open interior chamber,
    wherein the bottom portion of the first container sits within the open interior chamber of the second container a distance above the bottom of the second container when the first container, the sleeve, and the second container are assembled together in a stacked and nested relationship.

17. The system of claim 16, further comprising a third container, the third container comprising a bottom, at least one sidewall, and an open interior chamber, the third container sized to slidably receive the first container and the sleeve, and wherein a height of the third container is less than a height of the second container and about equal to a height of the first container.

18. The system of claim 16, further comprising a first lid and a clasping mechanism that is releasably coupled to the first lid and the second container.

* * * * *